(12) United States Patent
Mui

(10) Patent No.: US 6,690,739 B1
(45) Date of Patent: Feb. 10, 2004

(54) METHOD FOR INTERSYMBOL INTERFERENCE COMPENSATION

(76) Inventor: Shou Yee Mui, 46 Southwood Dr., Cherry Hill, NJ (US) 08003

( * ) Notice: Subject to any disclaimer, the term of this patent is extended or adjusted under 35 U.S.C. 154(b) by 611 days.

(21) Appl. No.: 09/748,619

(22) Filed: Dec. 26, 2000

Related U.S. Application Data

(60) Provisional application No. 60/176,162, filed on Jan. 14, 2000.

(51) Int. Cl.[7] .............................. H04L 23/02; H04L 5/12
(52) U.S. Cl. ........................ 375/265; 375/285; 375/348; 714/792
(58) Field of Search ................................ 375/229–234, 375/259, 260, 262, 265, 285, 341, 346, 348, 349, 350; 714/746, 786, 792, 796

(56) References Cited

U.S. PATENT DOCUMENTS

| | | | |
|---|---|---|---|
| 4,547,887 A | | 10/1985 | Mui |
| 5,031,195 A | | 7/1991 | Chevillat et al. |
| 5,052,000 A | * | 9/1991 | Wang et al. ................ 714/758 |
| 5,343,335 A | | 8/1994 | Hara |
| 5,488,633 A | | 1/1996 | Laroia |
| 5,513,216 A | | 4/1996 | Gadot et al. |
| 5,541,956 A | | 7/1996 | Ueda |
| 5,546,430 A | | 8/1996 | Liao et al. |
| 5,559,835 A | * | 9/1996 | Betts .......................... 375/265 |
| 5,581,568 A | | 12/1996 | Togami |

(List continued on next page.)

OTHER PUBLICATIONS

"GMSK Modulation for Digital Mobile Radio Telephony," by K. Murota and K. Hirade, IEEE Transactions on Communications, vol. COM–29, pp. 1044–1050, Jul. 1981.

(List continued on next page.)

Primary Examiner—Jean B. Corrielus

(57) ABSTRACT

The intersymbol interference compensation (ISIC) method of the invention comprises an encoding step performed by an encoder and a data estimating step performed a data estimator. The encoder performs at least a trellis encoding of a data sequence using a trellis forward-error-correction (FEC) code to provide an encoded sequence, which is supplied to a channel. The data estimator, which advantageously processes a channel output sequence to arrive at an estimate of the data sequence, comprises at least a template generator for generating templates, a partial equalizer for processing the channel output sequence to provide a partially equalized sequence that is substantially free of precursor ISI, and an ISIC decoder for trellis decoding and ISI compensation. The ISIC decoder computes the branch metric for each current branch based on a single-sided template $\hat{q}(x,y)$ that accounts for the postcursor ISI in the partially equalized sequence, where x is the vector of symbols associated with the past branch or branches that are connected to the current branch and y is the vector of symbols associated with the current branch. The number of states in the ISIC decoder is determined by the trellis code and is independent of the ISI span of the channel. The invention also provides for techniques for adapting the partial equalizer using the templates, estimating the ISI profile, and updating the templates. In one embodiment of the invention, concatenated coding is employed. In yet another embodiment of the invention, the data estimator employs a decision-directed-ISIC (DD-ISIC) decoder that computes the branch metric for each current branch based on a double-sided template $\hat{s}(x,y,z)$, where z is the vector of symbols associated with the future branch or branches connected to the current branch and is determined by an interim estimate of the data sequence. A double-sided partial equalizer that removes only some of the precursor and postcursor ISI provides the input to the DD-ISIC decoder, which compensates for the unequalized ISI and performs trellis decoding simultaneously.

28 Claims, 25 Drawing Sheets

U.S. PATENT DOCUMENTS

| | | | |
|---|---|---|---|
| 5,604,769 A | 2/1997 | Wang | |
| 5,606,464 A | 2/1997 | Agazzi | |
| 5,644,603 A | 7/1997 | Ushirokawa | |
| 5,668,833 A | 9/1997 | Kurokami et al. | |
| 5,673,291 A | 9/1997 | Dent | |
| 5,742,642 A | 4/1998 | Fertner | |
| 5,774,504 A | 6/1998 | Huszar et al. | |
| 5,825,832 A | 10/1998 | Benedetto | |
| 5,844,946 A | 12/1998 | Nagayasu | |
| 5,870,433 A | 2/1999 | Huber et al. | |
| 5,872,817 A | 2/1999 | Wei | |
| 5,889,823 A | 3/1999 | Agazzi | |
| 5,949,831 A | 9/1999 | Coker et al. | |
| 6,151,370 A * | 11/2000 | Wei | 375/341 |
| 6,233,286 B1 * | 5/2001 | Wei | 375/265 |
| 6,421,395 B1 * | 7/2002 | Wei | 375/265 |
| 6,449,002 B1 * | 9/2002 | Markman et al. | 348/21 |
| 2002/0152441 A1 * | 10/2002 | Senda et al. | 714/769 |

OTHER PUBLICATIONS

*Understanding Digital Subscriber Line Technology*, by T. Starr et al., Prentice Hall, 1999, pp. 183–186.

*Mobile Communications Engineering: Theory and Applications, Second Edition*, by W. Lee, McGraw–Hill, 1998, pp. 442–445.

*Electronics Engineers' Handbook, Fourth Edition*, by D. Christiansen, McGraw–Hill, 1997, pp. 27.49–27.54.

"Maximum–Likelihood Sequence Estimation of Digital Sequence in the Presence of Intersymbol Interference," by G. D. Forney, Jr., IEEE Transactions on Information Theory, vol. IT–18, pp. 363–378, May 1972.

"Adaptive Equalization," by S. Qureshi, IEEE Communications Magazine, Mar. 1982, pp. 9–16.

"Delayed Decision–Feedback Sequence Estimation," by A. Duel–Hallen and C. Heegard, IEEE Transactions on Communications, vol. 37, pp. 428–436, May 1989.

"Complex Noncoherent Receivers for GMSK Signals," by N. Benvenuto et al., IEEE Journal on Selected Areas in Communications, vol. 17, No. 11, pp. 1876–1885, Nov. 1999.

"Joint Coding and Decision Feedback Equalization for Broadband Wireless Channels," by S. Ariyavisitakul and Y. Li, IEEE Journal on Selected Areas in Communications, vol. 16, No. 9, pp. 1670–1678, Dec. 1998.

"Soft–Output Equalization and TCM for Wireless Personal Communications," by Y. Chen et al., IEEE Journal on Selected Areas in Communications, vol. 16, No. 9, pp. 1679–1690, Dec. 1998.

"Combined Equalization and Coding Using Precoding," by G. D. Forney, Jr. and M. V. Eyuboglu, IEEE Communications Magazine, Dec. 1991.

"Viterbi Detection of Class IV Partial Response on a Magnetic Recording Channel," by R. Wood and D. Petersen, IEEE Transactions on Communications, vol. COM–34, No. 5, pp. 454–461, May 1986.

"Trellis Coding for Partial–Response Channels," by J. Wolf and G. Ungerboeck, IEEE Transactions on Communications, vol. COM–34, No. 8, pp. 765–773, Aug. 1986.

"Continuous Phase Modulation," by C. Sundberg, IEEE Communications Magazine, vol. 24, No. 4, pp. 25–38, Apr. 1986.

"Multi–h Phase–Coded Modulation," by I. Sasase and S. Mori, IEEE Communications Magazine, pp. 46–56, Dec. 1991.

"Channel Coding with Multilevel/Phase Signals," by G. Ungerboeck, IEEE Transactions on Information Theory, vol. IT–28, No. 1, pp. 56–66, Jan. 1982.

"Fractionally–Spaced Equalization: An Improved Digital Transversal Equalizer," by R. Gitlin and S. Weinstein, The Bell System Technical Journal, vol. 60, No. 2, pp. 275–296, Feb. 1981.

*Adaptive Filter Theory, Third Edition*, by S. Haykin, Prentice–Hall, Inc., 1996, pp. 194–206.

*Digital Communications*, by J. Proakis, McGraw–Hill, 1983, pp. 410–412.

*Principles of Digital Communication and Coding*, by A. Viterbi and J. Omura, McGraw–Hill, 1979, p. 111 and pp. 114–116.

\* cited by examiner

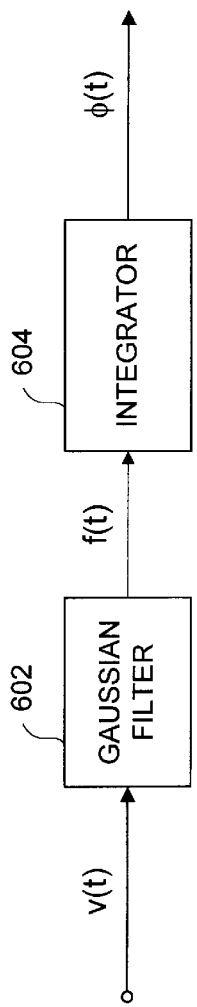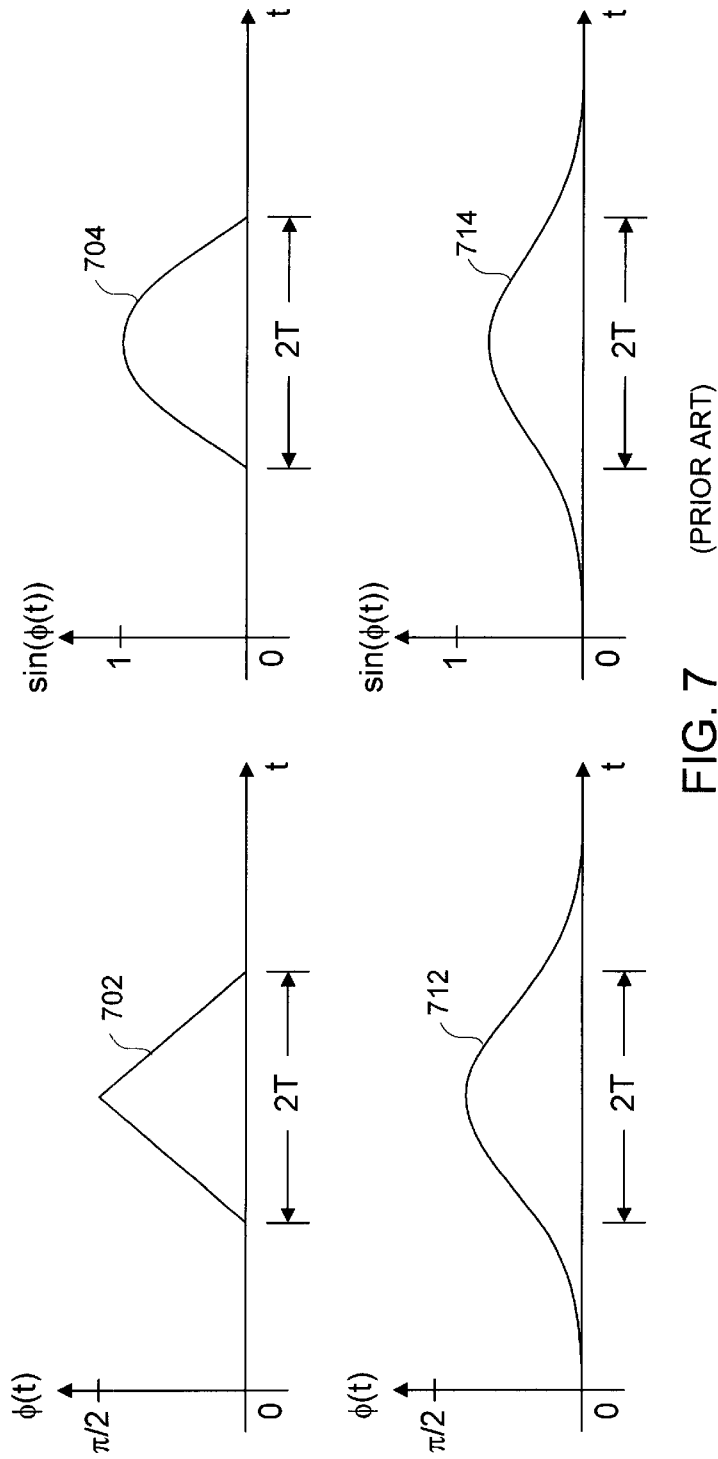
FIG. 6 (PRIOR ART)
FIG. 7 (PRIOR ART)

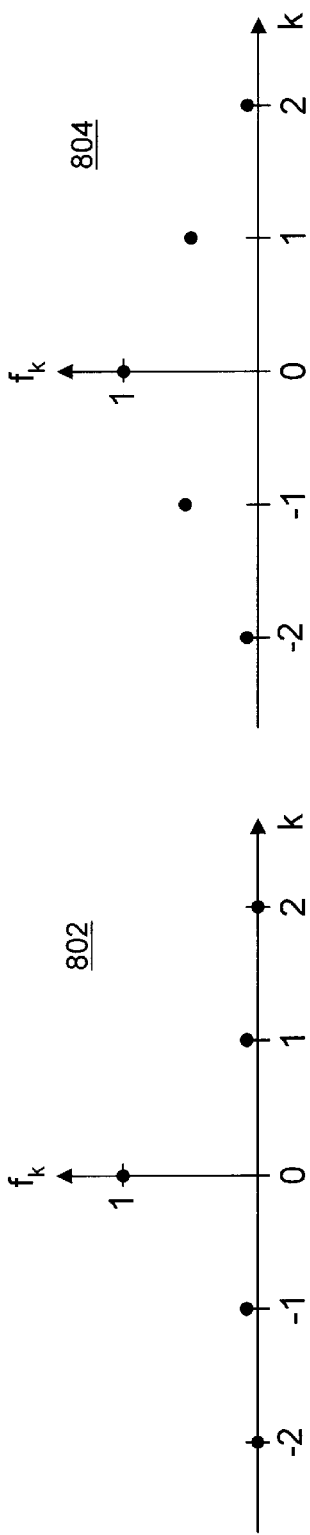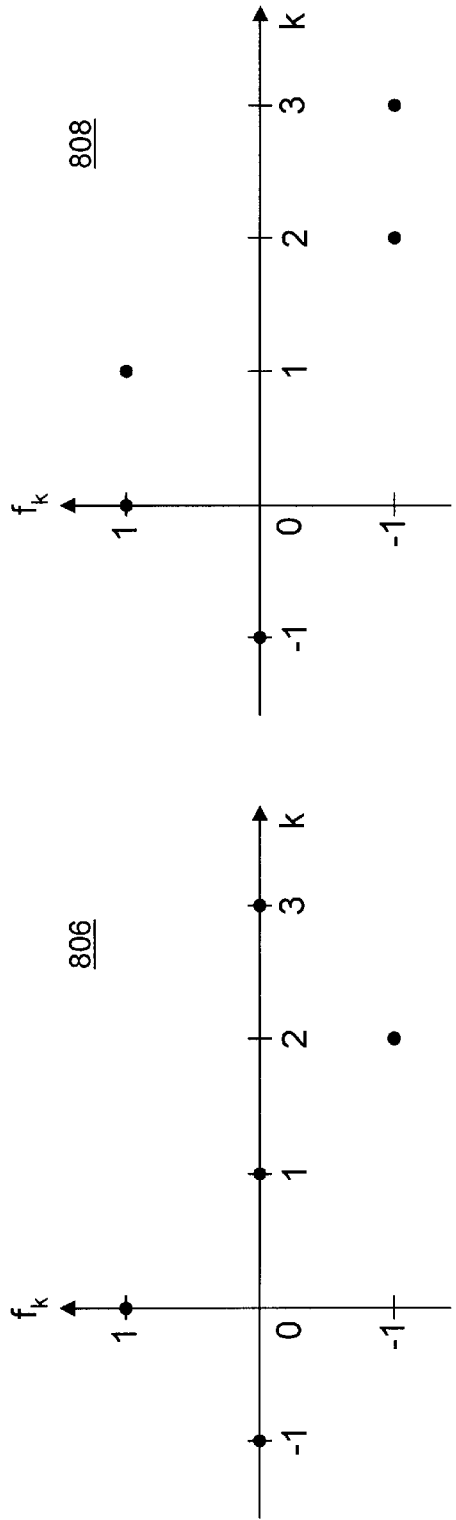
FIG. 8a (PRIOR ART)
FIG. 8b (PRIOR ART)

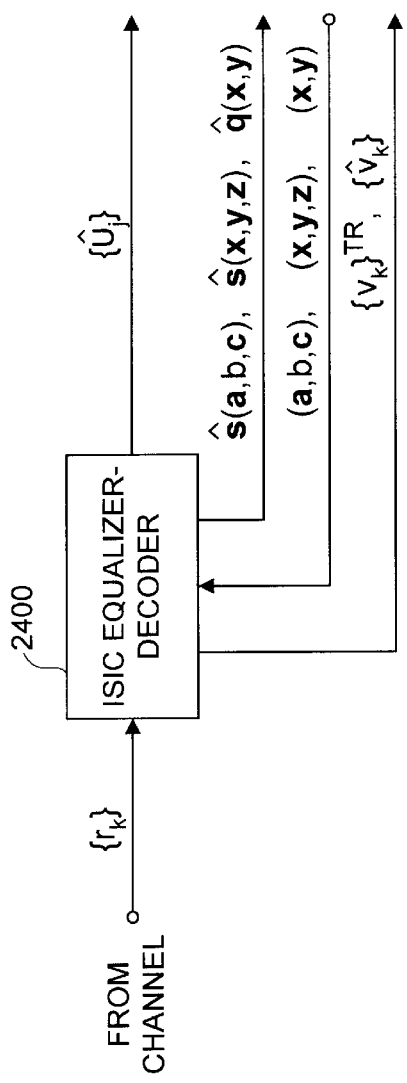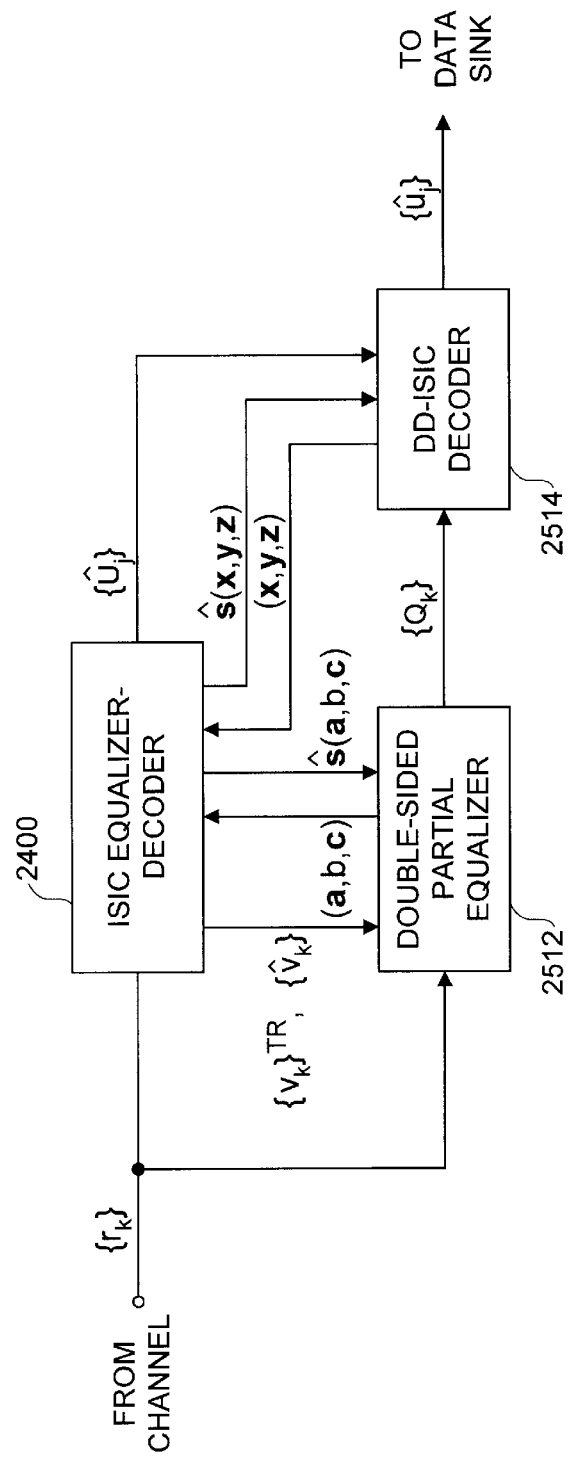

METHOD FOR INTERSYMBOL INTERFERENCE COMPENSATION

CROSS-REFERENCE TO RELATED APPLICATIONS

This application claims priority of Provisional Application Ser. No. 60/176162 which was filed on Jan. 14, 2000.

BACKGROUND OF THE INVENTION

This invention relates to methods for intersymbol interference compensation in data communications and data storage systems with the objective of improving the reliability of data recovery.

Intersymbol interference (ISI) is found in many communications and recording systems. In order to reduce the frequency spectrum of a modulated signal, ISI may be introduced deliberately at the modulator. An example of modulation schemes that introduce ISI is Gaussian minimum shift keying (GMSK) described in the article: "GMSK Modulation for Digital Mobile Radio Telephony," by K. Murota and K. Hirade, IEEE Transactions on Communications, vol. COM-29, pp. 1044–1050, July 1981. Filtering at the transmitter to control the signal spectrum can extend the basic modulation pulse beyond one signaling interval, thus introducing ISI. The communications medium is another potential source of ISI. In digital subscriber line (DSL) systems, which support high-rate data transmissions in addition to voice traffic, the severe line attenuation and delay variation with frequency of the telephone lines have been found to cause significant ISI in the received signal, as described in the book: *Understanding Digital Subscriber Line Technology*, by T. Starr et al., Prentice Hall, 1999, pp. 183–186. In mobile communications, ISI associated with multipath fading occurs when the direct-path signal combines with the reflected and delayed signals to form a composite signal at the receiver, as described in the book: *Mobile Communications Engineering: Theory and Applications, Second Edition*, by W. Lee, McGraw-Hill, 1998, pp. 442–445.

In reading data from a magnetic recording medium, a phenomenon referred to as bit crowding may occur if the bit packing density is high, as described in the book: *Electronics Engineers' Handbook, Fourth Edition*, by D. Christiansen, McGraw-Hill, 1997, pp. 27.49–27.54. Bit crowding leads to ISI since a read head, which is a transducer configured to provide an output in response to a change in the polarity of the magnetization pattern, has a limited bandwidth. The transducer output is a pulse whose width is inversely proportional to the transducer's bandwidth. When the bit packing density of the recording is sufficiently high, the response pulse will be become wide enough to have non-zero amplitude in the adjacent bit periods, resulting in ISI. There are precursor and postcursor ISI. Precursor ISI is caused by leading undershoots in the transducer response resulting from stray magnetic fields at the edges of the inductive read heads. Postcursor ISI is caused by trailing undershoots in the transducer response.

Modern high-end disk drive systems employ the partial response maximum likelihood (PRML) technology to achieve better performance. In this scheme a certain amount of ISI is deliberately introduced into the recorded signal in order to reduce constraints on the bandwidth of the electronic circuitry. During data recovery, the ISI is usually removed using a maximum likelihood detection scheme such as the Viterbi algorithm. A popular choice of partial response is the class IV partial response (PR4) characterized by the transfer function $1-D^2$, where D represents a symbol delay, i.e., the current output is equal to the current input minus the input two symbol periods ago.

The block diagrams of a data communications system and a data storage system presented in FIGS. 1 and 2, respectively, will be used to define the problem to be solved. In FIG. 1, data source 102 provides a data sequence $\{u_j\}$, which is advantageously processed by encoder 104 to provide an encoded sequence $\{v_k\}$. The data sequence is usually a binary digital stream but it could also have elements taken from an M-ary alphabet consisting of M values, where M is an integer. Likewise, the elements of the encoded sequence could be binary or M-ary. The term "symbol" will be used to refer to a binary or M-ary element taken from an alphabet of a set of predetermined values. For is example, a binary alphabet has two symbols, which may be 0 and 1, while an octal alphabet has eight symbols, which may be −7, −5, −3, −1, 1, 3, 5, and 7. Thus, a data sequence is made up of data symbols and an encoded sequence is made up of encoded symbols. With reference to FIGS. 1 and 2, the indices j and k may be different since the encoded sequence may have a length different from that of the data sequence. For example, if the encoder is a rate 1/2 error-correction encoder, then the encoded sequence is twice as long as the data sequence. Examples where the encoded sequence is the same length as the data sequence include: (i) the encoder is simply a one-to-one mapper such as mapping "0" to "−1" and "1" to "+1", as in antipodal signaling; and (ii) the encoder is a binary, rate 1/n error-correction encoder followed by a mapping of n bits to a symbol chosen from an alphabet of size $2^n$. With reference to FIG. 1, the encoded sequence is supplied to modulator 122, which converts the discrete-time sequence $\{v_k\}$ into a continuous-time modulated signal. The modulated signal is filtered, up-converted to a higher frequency, and amplified by transmitter 124 for transmission over communications medium 126. The transmitted signal is received by receiver 128, which usually performs the functions of amplification using a low-noise amplifier, down-conversion to a lower frequency, and filtering to reject out-of-band noise. The receiver output is sampled and digitized using analog-to-digital (A/D) converter 130 to provide a digitized signal, which is advantageously processed by matched filter 132. In this exemplary arrangement, matched filter 132 is a digital filter. In implementations where matched filter 132 is an analog filter, the positions of A/D converter 130 and matched filter 132 shown in FIG. 1 are interchanged. Communications channel 120 comprises modulator 122, transmitter 124, communications medium 126, receiver 128, A/D converter 130, and matched filter 132. The channel output sequence $\{r_k\}$ is the output of matched filter 132. Each element of the channel output sequence is represented by a digital word made up of a number of bits dependent on the implementation. The term "sample" will be used to refer to a quantity that is not taken from an alphabet. Thus, the number of possible values assumed by a sample is not predetermined but dependent in part on the length of the digital word representing the sample. With this convention, $r_k$ is a channel output sample and the channel output sequence $\{r_k\}$ is a collection of channel output samples arranged chronologically. In general, the channel generates one or more channel output samples $r_k$ in response to an encoded symbol $v_k$ presented to the channel input. To simplify the discussion, the indices of the encoded sequence $\{v_k\}$ and the channel output sequence $\{r_k\}$ are shown in FIG. 1 to be identical to signify that there is one channel output sample for each channel input symbol. The use of the same indices for these two sequences in FIG.

1 should be considered exemplary rather than restrictive. The channel output sequence is supplied to data estimator 106 to recover the data sequence. The output of data estimator 106 is an estimated data sequence $\{\hat{u}_j\}$, which is composed of estimated data symbols. The estimated data sequence is supplied to data sink 108.

FIG. 2, which is a block diagram of a data storage system, shows the encoded sequence being supplied to modulator 222, which converts the discrete-time sequence $\{v_k\}$ into a continuous-time modulated signal. The modulated signal is supplied to data recorder 224, which writes the modulated signal onto recording medium 226, which can represent a magnetic tape or disk. Data reader 228 reads recording medium 226 to provide an analog signal, which is sampled and digitized using A/D converter 230. Recording channel 220 comprises modulator 222, data recorder 224, recording medium 226, data reader 228, and A/D converter 230.

FIGS. 1 and 2 use the same reference numerals for data source 102, encoder 104, data estimator 106, and data sink 108 to show the similarities between the data communications and data storage problems to be solved. Such a convention in notation should be considered exemplary rather than restrictive. FIG. 3 shows a block diagram that could represent either a data communications or a data storage system. Channel 300 could be communications channel 120 or recording channel 220.

The intersymbol interference found in a channel output sample is usually made up of precursor and postcursor portions. The precursor ISI is defined as the interference on the current sample from the future symbols while postcursor ISI is the interference from the past symbols. The channel output sample for the k'th symbol interval, in response to the application of the encoded sequence $\{v_k\}$ to the channel input, may be represented as $$r_k = \sum_{i=-L_1}^{-1} h_i v_{k-i} + h_0 v_k + \sum_{i=1}^{L_2} h_i v_{k-i} + n_k \quad (1)$$

where $h_i$, $i=-L_1, \ldots, 0, L_2$ are the coefficients the channel impulse response (CIR) and $n_k$ is a noise term. In general, these quantities are complex, having real and imaginary parts. The quantity $h_0$ is the channel gain on the desired symbol and the quantities $h_i$, $i \neq 0$, are the gains of the ISI components. The term "ISI profile" will be used to mean a set of channel gain coefficients such as $\{h_i\}$. The first term on the right-hand side of the above equation is the precursor ISI, which has a span of $L_1$ symbols, the second term is the desired signal, and the third is the postcursor ISI, which has a span of $L_2$ symbols. It can be seen from the above equation that, depending on the CIR and the encoded symbols, the ISI can result in a reduction of the signal amplitude, leading to degradation in the reliability with which data can be recovered. For example, if the CIR parameters are $L_1=L_2=1$, $h_{-1}=h_1=0.5$, and $h_0=1$, and the encoded sequence is such that $v_{k-1}=v_{k+1}=-1$, $v_k=1$, then from equation (1), $r_k=n_k$, which contains no desired signal component.

The problem to be solved is to estimate the data sequence $\{u_j\}$ based on having observed the channel output sequence $\{r_k\}$, which contains ISI. I will review the prior art on solving the problem of data recovery in the face of ISI and discuss areas where improvements may be desirable.

It is well known to those skilled in the art that the optimum estimator, in terms of providing the lowest probability of estimation error in the presence of additive white Gaussian noise (AWGN), is the maximum likelihood sequence estimator (MLSE). The Viterbi algorithm (VA) has been demonstrated to be an efficient implementation of MLSE in the article: "Maximum-Likelihood Sequence Estimation of Digital Sequence in the Presence of Intersymbol Interference," by G. D. Forney, Jr., IEEE Transactions on Information Theory, vol. IT-18, pp. 363–378, May 1972. In MLSE, the channel is modeled as a linear transversal filter equivalent to a convolutional encoder operating on the data sequence. The MLSE implemented using the Viterbi algorithm, referred to here as the VA-MLSE, has $M^{L_1+L_2}$ states, where M is the alphabet size of the symbols $v_k$, i.e., $v_k$ can take on one of M values. Therefore, the complexity of the MLSE estimator grows exponentially with the ISI span, $L_1+L_2$. Even for a moderately small alphabet size of 4, and fairly small ISI span $L_1=L_2=2$, the number of states needed in the MLSE estimator is $4^4=256$, which is considered a large number of states to implement for a Viterbi algorithm.

The high complexity of the VA-MLSE has an impact on the power consumption of the circuitry implementing the estimator. Keeping the power consumption to the minimum is critical in some applications, such as hand-held and mobile communications terminals. U.S. Pat. No. 5,644,603, "Maximum-Likelihood Sequence Estimator with Variable Number of States," issued to A. Ushirokawa on Jul. 1, 1997, discloses a means for estimating the ISI span and selecting from a group of VA-MLSEs of different number of states to match the estimated ISI span. This approach may ease the power consumption but does not reduce the hardware/software complexity.

The use of MLSE in conjunction with forward-error-correction (FEC) coding has been suggested. For example, U.S. Pat. No. 5,673,291, "Simultaneous Demodulation and Decoding of a Digitally Modulated Radio Signal using Known Symbols," issued to P. Dent on Sep. 30, 1997 discloses an apparatus for performing demodulation and decoding simultaneously using a VA-MLSE. In this approach, a data sequence to be transmitted is encoded using a block or convolutional code. Symbols known to the receiver are inserted into the encoded sequence and the composite sequence is interleaved. The known symbols are used to aid the decoding for recovery of the data sequence. A drawback of this approach is that the known symbol represent an overhead in the channel, thus reducing the bandwidth efficiency of the system.

Another example of the use MLSE in conjunction with FEC coding is U.S. Pat. No. 5,844,946, "Soft-Decision Receiver and Decoder for Digital Communication," issued to T. Nagayasu on Dec. 1, 1998. In the first step, the invention of Nagayasu employs a VA-MLSE to process the received signal to estimate the transmitted symbols. In the second step, a maximum a posteriori (MAP) algorithm is used to calculate the soft-decision reliability values for the estimated symbols. In the last step, the soft-decision values are applied to a Viterbi decoder for the convolutional code. A drawback of this approach is its high complexity, particularly the complexity of the MAP algorithm.

A technique simpler than the MLSE for processing signals with ISI is linear equalization. The theory of linear equalizers is well known to those skilled in the art, see the article: "Adaptive Equalization," by S. Qureshi, IEEE Communications Magazine, March 1982, pp. 9–16. One implementation of a linear equalizer employs a transversal filter, also referred to as a tapped-delay line filter, which is made up of delay elements, multipliers, and adders. The output of a transversal filter whose input is the channel output sequence $\{r_k\}$ may be expressed as $$q_k = \sum_{i=-N_1}^{N_2} w_i^* r_{k-i} \qquad (2)$$

where $w_i$, $i=-N_1, \ldots, 0, \ldots, N_2$, are the tap weights, the asterisk denotes complex conjugation, and the parameters $N_1$ and $N_2$ are the number of precursor and postcursor equalizer taps, respectively, so that the total number of taps or multipliers is $N_1+N_2+1$. Equation (2) is called a finite convolution in light of the fact that it convolves the finite-duration impulse response of the filter, $\{w_i\}$, with the filter input, $\{r_k\}$, to provide the filter output $q_k$. The tap weights are selected according to criterion such as the zero-forcing or minimum mean-square-error (MMSE) criterion. In the zero-forcing algorithm, the tap weights are selected such that the filter output $q_k$ contains as little ISI as possible. The zero-forcing algorithm leads to a filter with a transfer function, w(z), in z-transform notation, that approximates the inverse of the transfer function of the channel, h(z), i.e., w(z)≈1/h(z). In the MMSE criterion, the tap weights are set to minimize the statistical mean value of the square of the error signal $v_k-q_k$, where $v_k$ is the k'th transmitted symbol. When the noise power is small compared to the signal power, the MMSE criterion leads to a filter that approximates a zero-forcing filter. In general, the output of a linear equalizer will contain noise and some residual ISI. In fact, in removing ISI, a linear equalizer increases the amount of noise in the signal, a phenomenon known as noise enhancement. This phenomenon can be understood by realizing that the transfer function of a channel that exhibits ISI has smaller amplitudes at some frequencies. In fact, ISI can lead to one or more nulls in the channel transfer function. As pointed out above, the removal of ISI requires that the transfer function of the equalizer to approach the inverse of the transfer function of the channel. At frequencies where the channel transfer function has small amplitudes, the equalizer transfer function will have large gains. The large gains amplify the noise, resulting in a reduction of the signal-to-noise ratio at the output of the equalizer. Another effect of equalization is that the equalized noise spectrum is not flat and hence the noise samples are correlated. This effect is called noise colorization. The noise-enhancement and noise-colorization effects degrade the reliability with which the data sequence can be recovered. As a consequence, a linear equalizer does not provide as reliable an estimate of the data sequence as a MLSE.

An equalizer with the capability to adjust its tap weights in response to variations in the channel characteristics is called an adaptive equalizer. The theory of adaptive equalizers is well known to those skilled in the art, see the article by S. Qureshi referenced above. A commonly used technique for adaptively adjusting the tap weights is the least mean square (LMS) algorithm. In describing the LMS algorithm it proves convenient to represent the tap weights as a column vector with $(N_1+N_2+1)$ elements: $w=(w_{-N_1}, \ldots, w_0, \ldots, w_{N_2})^T$, where the superscript T stands for the transpose operation. Let $w_k$ denote the tap weight vector at time k. A similar notation is used on the equalizer input, thus $r_k=(r_{k+N_1}, \ldots, r_k, \ldots, r_{k-N_2})^T$. Note that the vector $r_k$ has the elements written in the reverse time order, with the newest channel output sample listed first. With this representation, the equalizer output can be written as $$q_k = w_k^H r_k \qquad (3)$$

where the superscript H represents Hermitian transposition, i.e., complex conjugation and transposition combined. Let $d_k$ be the desired equalizer output for the k'th symbol interval, then the error signal is $$e_k = d_k - q_k. \qquad (4)$$

In the LMS algorithm, the equalizer tap weight vector $w_{k+1}$ for use in the next symbol interval to process the input signal is computed from the current tap weight vector $w_k$ according to $$w_{k+1} = w_k + \mu r_k e_k^* \qquad (5)$$

where $\mu$ is an adaptation time constant that controls the rate of adaptation and affects how closely the tap weights can be adjusted to the optimum values in response to variations in the channel characteristics.

As mentioned earlier, a drawback of a linear equalizer is the noise-enhancement effect. To reduce the amount of noise enhancement, a decision feedback equalizer, also well known to those skilled in the art, can be used instead of a linear equalizer. A decision feedback equalizer has a feedforward section that is identical to the transversal filter, with the channel output sequence $\{r_k\}$ as its input, and a feedback section with estimates of past symbols, denoted as $\{\hat{v}_i\}$, as its input. The output of a decision feedback equalizer may be written as $$q_k = \sum_{i=-N_1}^{0} w_i^* r_{k-i} + \sum_{i=1}^{N_2} w_i^* \hat{v}_{k-i} \qquad (6)$$

where $N_1+1$ and $N_2$ are the number of taps in the feedforward and feedback sections, respectively, of the equalizer. A comparison of equations (2) and (6) shows that for the decision feedback equalizer a tap weight with a subscript of 1 or higher multiplies a past symbol decision rather than a channel output sample. If the past symbol decisions are correct, then a decision feedback equalizer will have less noise enhancement than a linear equalizer. If an error occurs in the estimated symbols $\{\hat{v}_i\}$, the error would propagate down the feedback section and affect the output for multiple symbols. This phenomenon is called the error-propagation effect of decision feedback equalizers and can degrade the reliability of the data recovery. This effect is particularly noticeable for systems using forward-error correction coding. Since the decoding delay is usually too big for the decoder output to be used as an input to the feedback section, the symbol decisions supplied to the equalizer must be the less-reliable decisions obtained prior to decoding.

A number of techniques have been suggested to overcome the error-propagation effects in decision feedback equalizers. U.S. Pat. No. 5,541,956, "Adaptive Equalizer and Adaptive Diversity Equalizer," issued to K. Ueda on Jul. 30, 1996, discloses a system with a decision feedback adaptive equalizer, a linear equalizer, a comparing circuit, and a selecting circuit. The selecting circuit chooses the equalizer that has the better performance as determined by the comparing circuit, which compares the integrated estimation error value of the decision feedback equalizer with the integrated estimation error value of the linear equalizer. Another technique for dealing with error-propagation effects in decision feedback equalizers is disclosed in U.S. Pat. No. 5,668,833, "Decision-Feedback Type Equalizer," issued to Y. Kurokami et al. on Sep. 16, 1997. The Kurokami invention provides a means for detecting an abnormal state and a selection circuit used for selecting either equalization signals or symbol decisions for supplying them as input signals to the backward equalizer, in order to reduce propagation or magnification of errors caused by noise. U.S. Pat. No. 5,742,642, "Signal Processing Method and Apparatus for Reducing Equalizer Error," issued to A. Fertner on Apr. 21, 1998, presents a method for detecting incorrect symbol decisions and correcting the errors to prevent propagation of the error with possible adverse effects on subsequent equalizer decisions. U.S. Pat. No. 5,774,504, "Equalization and Decoding for Digital Communication Channel," issued to S. R. Huszar et al. on Jun. 30, 1998, discloses a multiple sub-channel decision feedback equalizer/decoder which samples the received signal at an integer multiple of the symbol rate, creating multiple sub-channels. Estimates of each of the sub-channels are updated using a locally best estimate in the equalizer/decoder processing, thereby avoiding delay in updating channel estimates in a rapidly changing channel such as a digital cellular communications channels. The techniques proposed by these patents employ various arrangements to ease the error-propagation effects of decision feedback equalizers at the expense of an increase in complexity of hardware and software. Furthermore, the error-propagation effects are only reduced, not completely eliminated.

The article: "Delayed Decision-Feedback Sequence Estimation," by A. Duel-Hallen and C. Heegard, IEEE Transactions on Communications, vol. 37, pp. 428–436, May 1989, proposed the use of decision feedback to reduce the number of states in MLSE. The number of states in a delayed decision feedback sequence estimator is $M^{L-K}$, where M is the alphabet size, L is the ISI span of the channel, and K is an integer greater than one. The estimator complexity is still an exponential function of the alphabet size but is reduced by including in the estimator a number of symbols less than the ISI span. The article: "Complex Noncoherent Receivers for GMSK Signals," by N. Benvenuto et al., IEEE Journal on Selected Areas in Communications, vol. 17, No. 11, pp. 1876–1885, November 1999, describes the use of a delayed decision feedback sequence estimator to demodulate a GMSK signal transmitted over a fading channel. U.S. Pat. No. 5,870,433, "Method of Processing Signals in a Viterbi Decoder According to Delayed Decision Feedback Sequence Estimation (DDFSE) Algorithm," issued to J. Huber et al. on Feb. 9, 1999, discloses a Viterbi decoder which uses a number of feedback filters to determine branch or path metrics in the trellis diagram, where this number is a function of the number of states in the trellis diagram. In the disclosed arrangement, each of the feedback filters being used is split into two parts. The first part contains the portion of the branch metrics that can be different for each path in the trellis diagram. The second part is only determined once for all paths along the path with the smallest path metrics at the end of the first part of the feedback filters. A drawback of these techniques is that the number decoder states is equal to $M^n$ where M is the alphabet size and n is an integer smaller than the ISI span. This exponential dependence of the number of decoder states on the alphabet size makes the implementation feasible only for small alphabets or when the parameter n can be chosen to be small.

The journal articles and U.S. patents on equalization cited above consider systems without the use of error-correction coding. Equalizers, linear or decision feedback, have been used in conjunction with error-correction decoders. U.S. Pat. No. 5,872,817, "Joint Viterbi Decoder and Decision Feedback Equalizer," issued to L. Wei on Feb. 16, 1999, discloses a system which employs trellis coded modulation and a bank of decision feedback equalizers, one for each state in the decoder. The arrangement is intended to provide symbol decisions to the decision feedback equalizers without excessive delay due to decoder by making use of the tentative decisions associated with each state in the decoding trellis. The equalized signal is used to update the decoder path metrics. The article: "Joint Coding and Decision Feedback Equalization for Broadband Wireless Channels," by S. Ariyavisitakul and Y. Li, IEEE Journal on Selected Areas in Communications, vol. 16, No. 9, pp. 1670–1678, December 1998, describes an approach for joint convolutional coding and decision feedback equalization based on the use of both soft decisions and delayed tentative decisions. Soft decisions are obtained by passing the real and imaginary parts of the equalizer output through a hyperbolic tangent function. Tentative decisions from the Viterbi decoder are used both to cancel ISI caused by multipath with large delays and to adapt the equalizer. The article states that a tentative decoding delay approximately equal to the constraint length of the code is found to be provide near-optimum performance. U.S. Pat. No. 5,546,430, "Detector for Demodulating a Received Signal and Producing an Information Data Signal with Reduced Intersymbol Interference," issued to K. Liao et al. on Aug. 13, 1996 discloses a detector for decoded trellis-coded modulation signal corrupted by ISI. The detector comprises a predictor, a feedforward filter, and a trellis coded modulation estimator with a feedback filter that is adjusted with respect to the feedforward filter to form a decision feedback equalizer. A general approach of this group of techniques is to remove the ISI using a decision feedback equalizer, aided by arrangements that help to reduce the error propagation, and then decode the ISI-free signal. Such a cascade of two operations is sub-optimum since it yields less reliable data recovery than a technique, such as MLSE, that simultaneously removes the ISI and decodes the signal.

The article: "Soft-Output Equalization and TCM for Wireless Personal Communications," by Y. Chen et al., IEEE Journal on Selected Areas in Communications, vol. 16, No. 9, pp. 1679–1690, December 1998, describes the use of a maximum a posteriori probability (MAP) algorithm to realize soft-output equalization in a concatenated equalization and trellis coded modulation (TCM) decoding system. MAP algorithms compute the conditional probabilities of symbols. The computation involves a nonlinear function and requires knowledge of the noise variance. The article proposes a modified MAP algorithm that does not require knowledge of the noise variance and computes the probabilities in the logarithmic domain to avoid the need to calculate a nonlinear function. U.S. Pat. No. 5,825,832, "Method and Device for the Reception of Signals Affected by Inter-Symbol Interface," issued to V. Benedetto on Oct. 20, 1998, discloses a receiver for a trellis-code modulated signal comprising two cascaded Viterbi decoders. The first decoder is intended essentially to take into account the memory effects of the channel. The output of the first decoder, which comprises a hard decision on the transmitted symbols as well as a reliability parameter, is supplied, possibly after a de-interleaving action, to the second Viterbi decoder that carries out the actual decision. The use of the first decoder instead of an equalizer to handle ISI reduces the noise enhancement and noise correlation effects. Like the techniques discussed in the preceding paragraph, this set of techniques employs a cascade of ISI equalization and FEC decoding operations and hence yields a sub-optimum performance when compared to a technique that simultaneously removes the ISI and decodes the signal.

U.S. Pat. No. 5,031,195, "Fully Adaptive Modem Receiver using Whitening Matched Filtering," issued to P.

R. Chevillat et al. on Jul. 9, 1991, discloses a technique for combining equalization and decoding of trellis-coded modulation using a decoder with combined ISI-and-code states. The number of states, which is the product of the number of code states and the number of ISI states, can be too large for practice. The Chevillat invention also discloses a decoder that ignores some ISI so as to reduce the complexity.

The use of an encoder that includes precoding has been employed to pre-distort the signal in order to compensate for the distortion that the channel is expected to introduce. A commonly used precoding technique is the Tomlinson-Harashima precoding algorithm described in the article: "Combined Equalization and Coding Using Precoding," by G. D. Forney, Jr. and M. V. Eyuboglu, IEEE Communications Magazine, December 1991. Suppose the alphabet of the data is a set with M points: $A=\{\pm 1, \pm 3, \ldots ,(M-1)\}$. Suppose that $u_k$ is the k'th data symbol taken from the signal set A and that the channel impulse response $\{h_i\}$ is assumed to have only postcursor ISI and is known at the transmitter. The data symbol $u_k$ is precoded into symbol $v_k$ according to the following:

$$v_k = u_k + 2Mz_k - \sum_{j\geq 1} h_j v_{k-j} \qquad (7)$$

where the value of $z_k$ is selected such that $v_k$ lies in the interval (−M,M]. The calculation of $z_k$ and the addition of the term $2Mz_k$ are called a modulo-2M operation. The last term in the above equation removes the ISI caused by the previous symbols. The channel output sample is $$r_k = u_k + 2Mz_k + n_k. \qquad (8)$$

It can be seen that the channel output has no ISI. To recover the transmitted symbol $u_k$, the receiver could first performs a modulo-2M operation to yield $\tilde{r}_k$ and then selects from the signal set A the point that is closest to $\tilde{r}_k$ as the estimated data symbol $\hat{u}_k$.

The use of precoding raises the average transmit power since the maximum precoded symbol amplitude is M, which can be contrasted with the maximum uncoded data symbol amplitude of M−1. The increase in the average transmit power is shown in the article by Forney and Eyuboglu to be $M^2/(M^2-1)$, which can be significant if M is small. U.S. Pat. No. 5,488,633, "Intersymbol Interference Channel Coding Scheme," issued to R. Laroia on Jan. 30, 1996, discloses a technique for combining precoding and trellis coding. An intersymbol interference coder uses a feedback loop to apply a dither sequence to a sequence of input signal points. The dither signal applied to each input signal point is a function of the previous signal points in the sequence. It is stated in the patent specification that the precoding loss is independent of the number of coset partitions used to generate the trellis code, thus the precoding loss is reduced compared to prior art.

U.S. Pat. No. 5,513,216, "Hybrid Equalizer Arrangement for Use in Data Communications Equipment," issued to S. Gadot et al. on Apr. 30, 1996 and U.S. Pat. No. 5,604,769, "Hybrid Equalizer Arrangement for Use in Data Communications Equipment," issued to J. Wang on Feb. 18, 1997 disclose techniques for setting the precoder coefficients based on measurements made at the receiver using a hybrid intersymbol interference decision feedback equalizer (ISI-DFE) and a noise predictive decision feedback equalizer (NP-DFE). In particular, a hybrid DFE is designed so that the I(z) coefficient values dominate over the N(z) coefficient values. In the first patent, a respective Tomlinson precoding scheme in the transmitter uses only the I(z) values. In the second patent, the precoding coefficients are set to be (1+I(z)) (1+N(z))−1.

In certain applications, it is desirable to transmit a constant-envelope signal. Such applications include transmitters that operate the power amplifier at saturation to achieve higher power efficiency. A constant-envelope signal has the desirable property that it is not degraded by a saturating amplifier. Clearly, precoding cannot be used if a constant-envelope signal is desired. Another drawback of precoding is that the channel impulse response must be known at the transmitter.

I will now discuss prior art in ISI compensation in magnetic storage systems. The use of an equalizer followed by a Viterbi decoder has been proposed for combating ISI in magnetic storage devices. Here, the Viterbi decoder is used to perform maximum likelihood estimation of the read-back data corrupted by ISI by treating the ISI channel as an encoder. U.S. Pat. No. 5,343,335, "Signal Processing System Having Intersymbol-Interference Canceling Means and Method of Same," issued to M. Hara on Aug. 30, 1994, discloses a reproduction equalizer comprising a linear equalization means, a nonlinear cancellation means for canceling the intersymbol interference included in the linearly equalized signal, a decoding means for decoding the ISI-free signal. U.S. Pat. No. 5,581,568, "Data Detection Apparatus," issued to M. Togami on Dec. 3, 1996, discloses an arrangement that uses an integral equalizer for low-frequency-emphasizing-type equalization to provide a larger margin in detection timing and a higher signal-to-noise ratio. The arrangement uses a Viterbi decoder to process the equalized signal. U.S. Pat. No. 5,606,464, "Cancellation of Precursor Intersymbol Interference in Magnetic Recording Channels," issued to O. Agazzi et al. on Feb. 25, 1997 discloses a technique in which an adaptive filter is used to provide a replica of the precursor ISI, which is then subtracted from a delayed version of the data signal. The signal provided to the adaptive filter (to provide the precursor ISI replica) may be based on tentative decisions generated by a symbol-by-symbol detector. The equalized signal is then supplied to a Viterbi decoder. The invention does not specifically deal with postcursor ISI. It is mentioned in the specification of the patent that postcursor ISI can be compensated for using a conventional technique known as decision-feedback equalization. U.S. Pat. No. 5,889,823, "Method and Apparatus for Compensation of Linear or Nonlinear Intersymbol Interference and Noise Correlation in Magnetic Recording Channels," issued to O. Agazzi et al. on Mar. 30, 1999, discloses an arrangement which employs a Viterbi decoder concatenated with a postprocessor. The Viterbi decoder generates N most likely paths. The postprocessor computes metrics for each of these paths. The path with the best metric is selected as the concatenated decoder output. For simplicity of implementation, the Viterbi decoder neglects some of the components of the channel impulse response that result in linear or nonlinear intersymbol interference. It may also neglect noise correlation. The postprocessor computes metrics taking into account the channel components and noise correlation neglected by the Viterbi decoder. The postprocessor can afford to carry out this more detailed analysis because it restricts its search to a small number of paths. The article: "Viterbi Detection of Class IV Partial Response on a Magnetic Recording Channel," by R. Wood and D. Petersen, IEEE Transactions on Communications, vol. COM-34, No. 5, pp. 454–461, May 1986, proposes a Viterbi decoder for a partial-response signaling with a discrete-time transfer function of $(1-D^2)$, which is referred to as a class IV partial response (PR4) signaling. In the proposed arrangement, a filtered, equalized, and sampled signal is supplied to a Viterbi decoder. U.S. Pat. No. 5,949,831, "Method and Apparatus for Data Detection for PRML Data Channels," issued to J. Coker et al. on Sep. 7, 1999, discloses an arrangement that supplies a sampled and filtered signal simultaneously to a Viterbi detector to provide a Viterbi output and to a matching delay circuit to provide a delayed signal. The Viterbi output is subtracted from the delayed signal and the resulting signal is applied to a filter to provide an output that is used correct the Viterbi output to generate the final decoder output. In these techniques, the Viterbi algorithm is used to decode the ISI. Joint ISI compensation and FEC decoding is not considered.

The article: "Trellis Coding for Partial-Response Channels," by J. Wolf and G. Ungerboeck, IEEE Transactions on Communications, vol. COM-34, No. 8, pp. 765–773, August 1986, proposes the use of trellis coding to provide a coding gain over partial-response signaling with a discrete-time transfer function of (1–D), which is referred to as a dicode signaling. The proposed arrangement employs a binary convolutional encoder, a precoder, and at the receiver, a Viterbi decoder with twice as many states as the convolutional encoder. The extra decoder states are to accommodate the states introduced by the partial-response channel. A drawback of this arrangement is that the extra decoder states for accommodating the ISI increase the complexity of the decoder.

In summary, the prior art on intersymbol interference compensation using a maximum likelihood sequence estimator (MLSE) yields the best reliability in data recovery. The MLSE, however, is very complex. The number of estimator states required is $M^{L-1}$ where M is the alphabet size of the channel input symbols and L is the length of the ISI span of the channel. Use of delayed decision feedback sequence estimation reduces the number of estimator states to $M^{L-K}$, where K is an integer greater than one. But the complexity is still an exponential function of the ISI span. Furthermore, the estimator now must deal with decision errors in the feedback path. Simpler ISI compensation techniques such as linear equalizers, which have a complexity linearly proportional to the ISI span, have inferior performance due to noise enhancement and noise colorization. Decision feedback equalizers improve performance over linear equalizers by reducing the amount of noise enhancement and noise colorization but suffer from error-propagation effects. Techniques to address the error-propagation lead to added complexity. Precoding, such as the Tomlinson-Harashima algorithm, introduces a loss at the transmitter since precoding increases the maximum amplitude of the transmitted symbols. In addition, precoding cannot be used if a constant-envelope signal is to be transmitted. In systems where FEC coding is used, the general prior art has been to compensate for the ISI and then FEC decode the ISI-free signal. Techniques to generate soft-decision for the FEC decoder tend to be complex.

BRIEF SUMMARY OF THE INVENTION

The object of the present invention is to provide a method for intersymbol interference compensation that meets these goals: (i) a method that is less complex than maximum likelihood sequence estimation and delayed decision feedback sequence estimation; (ii) a method that performs better than the linear equalizer in terms of less noise enhancement and noise colorization; (iii) a method that is substantially free of the error-propagation effects of decision feedback equalizers; and (iv) a method that supports constant-envelope signaling as well as non-constant envelope signaling.

According to one embodiment of the present invention, the intersymbol interference compensation (ISIC) method comprises an encoding step performed by an encoder and a data estimating step performed by a data estimator. The encoder performs at least a trellis encoding of a data sequence using a trellis forward-error-correction (FEC) code such as a binary convolutional code or trellis coded modulation (TCM) code to provide a sequence of symbols for use as the input sequence to a channel. The output of the channel, referred to as the channel output sequence, comprises of samples represented as digital words. The data estimator advantageously processes the channel output sequence to provide an estimated data sequence. The data estimator comprises at least a partial equalizer, a template generator, and an ISIC decoder. The channel output sequence is supplied to the partial equalizer to provide a partially equalized sequence that is substantially free of the precursor ISI but contains at least some of the postcursor ISI of the channel output samples. The partially equalized sequence is applied to the ISIC decoder, which performs trellis decoding and ISI compensation simultaneously. The ISIC decoder implements a trellis decoding algorithm that computes branch metrics for a decoding trellis based on a set of templates $\hat{q}(\cdot,\cdot)$. The templates are computed by taking into account the unequalized postcursor ISI and represent the statistical average values of the partially a equalized samples. The template generator supplies the template $\hat{q}(x,y)$ in response to a pair of vectors (x,y) provided by the ISIC decoder, where x is the vector of symbols associated with the past branch or branches connected to a current branch in the decoding trellis, and y is the vector of symbols associated with the current branch. The number of states in the ISIC decoder is determined by the trellis code and is independent of the ISI span of the channel. The output of the ISIC decoder is the estimated data sequence for use by the data sink.

In one embodiment of the present invention, the equalizer tap weights are pre-computed and preloaded into the partial equalizer. The templates are either preloaded into the template generator or computed when needed by the template generator using a set of preloaded coefficients representing the ISI profile at the output of the partial equalizer. This is the preferred embodiment when the ISI profile of the channel is time-invariant and known a priori.

In another embodiment of the present invention, the equalizer tap weights are adaptive, adjusted in response to variations in the ISI profile of the channel. This is the preferred embodiment when the channel is time varying or when the channel ISI profile is not known a priori with sufficient accuracy. The invention provides for methods for partial equalizer adaptation based on known symbols called training symbols and adaptation based on estimated symbols. The desired output of the partial equalizer is the template $\hat{q}(a,b)$, where a is a vector of past encoded symbols and b is the current encoded symbol. Subtracting the partial equalizer output from the desired output $\hat{q}(a,b)$ yields an error signal that is used to adapt the equalizer tap weights. In yet another embodiment of the present invention, an ISI profile estimator is employed to estimate the impulse response of the channel. The estimated ISI profile is used to update the templates.

In yet another embodiment of the present invention, the channel output sequence is supplied to a double-sided partial equalizer, which leaves some of the precursor and postcursor ISI unequalized. In particular, the double-sided partial equalizer removes only the ISI not accounted for by the double-sided templates $\hat{s}(a,b,c)$, where a, b, and c represent the past, current, and future encoded symbols. (The term "double-sided template" is chosen to signify that $\hat{s}(\bullet,\bullet,\bullet)$ depends on both past and future symbols. In contrast, the template $\hat{q}(\bullet,\bullet)$ does not depend on future symbols and will be referred to as a single-sided template. The term "template" will be used to refer to either $\hat{q}(\bullet,\bullet)$ or $\hat{s}(\bullet,\bullet,\bullet)$ when its meaning is clear.) Thus, the desired output of the double-sided partial equalizer is $\hat{s}(a,b,c)$. The output of the double-sided partial equalizer is supplied to a decision-directed-ISIC (DD-ISIC) decoder. In this embodiment of the present invention, the output of the ISIC decoder is not supplied to the data sink but is supplied instead to the DD-ISIC decoder for use as interim data decisions. The DD-ISIC decoder computes the branch metrics using the templates $\hat{s}(x,y,z)$ with z representing the vector of symbols associated with the future branch or branches in the decoding trellis as determined by the interim data decisions. The output of the DD-ISIC decoder is the estimated data sequence for use by the data sink.

In yet another embodiment of the present invention, concatenated coding is employed wherein the data sequence is applied to a cascade of an outer FEC encoder, an interleaver and at least a trellis encoder to provide an encoded sequence for use as the channel input. At the data estimator, the channel output samples are advantageously processed by a partial equalizer and an ISIC decoder to provide a sequence that is further advantageously processed by a cascade of a deinterleaver and an outer FEC decoder to provide an estimated data sequence for use by the data sink.

In yet another embodiment of the data estimator for use with concatenated coding, the ISIC decoder output is supplied to a cascade of a first deinterleaver, a first outer FEC decoder, an outer FEC encoder, and an interleaver to provide an outer-FEC-decoded sequence for use by a DD-ISIC decoder as interim data decisions. The DD-ISIC decoder output is supplied to a cascade of a second deinterleaver and a second outer FEC decoder to provide an estimated data sequence for the data sink.

In yet another embodiment of the present invention, an error-detection code is employed to detect errors in the outer-FEC-decoded sequence. A selector is used to select the interim data decisions for use by the DD-ISIC decoder. If errors are detected in the outer-FEC-decoded sequence, the interim data decisions are set to be the output of the ISIC decoder; otherwise, they are set to be the outer-FEC-decoded sequence.

BRIEF DESCRIPTION OF THE DRAWINGS

FIG. 6 is a block diagram showing a method for generating the phase signal $\phi(t)$ for Gaussian minimum shift keying (GMSK) modulation;

FIG. 7 shows the phase signal $\phi(t)$ and the quadrature baseband signal $\sin(\phi(t))$ for minimum shift keying (MSK) (top two graphs) and GMSK (bottom two graphs);

FIG. 8a shows the normalized autocorrelation values representing the ISI profile of the baseband modulated signal for GMSK with BT=0.3 (left graph) and GMSK with BT=0.1 (right graph);

FIG. 8b shows the normalized autocorrelation values representing the ISI profile of the baseband modulated signal for class IV partial response (PR4) (left graph) and extended class IV partial response (EPR4) (right graph);

FIG. 24 shows an ISIC equalizer-decoder representing one of the six ISIC equalizer-decoder embodiments depicted in FIGS. 16, 17, 18, 21, 22, and 23;

FIG. 25 is a block diagram of one embodiment of a data estimator of the present invention comprising an ISIC equalizer-decoder, a double-sided partial equalizer, and a decision-directed-ISIC (DD-ISIC) decoder;

DETAILED DESCRIPTION OF THE INVENTION

Figure 1:
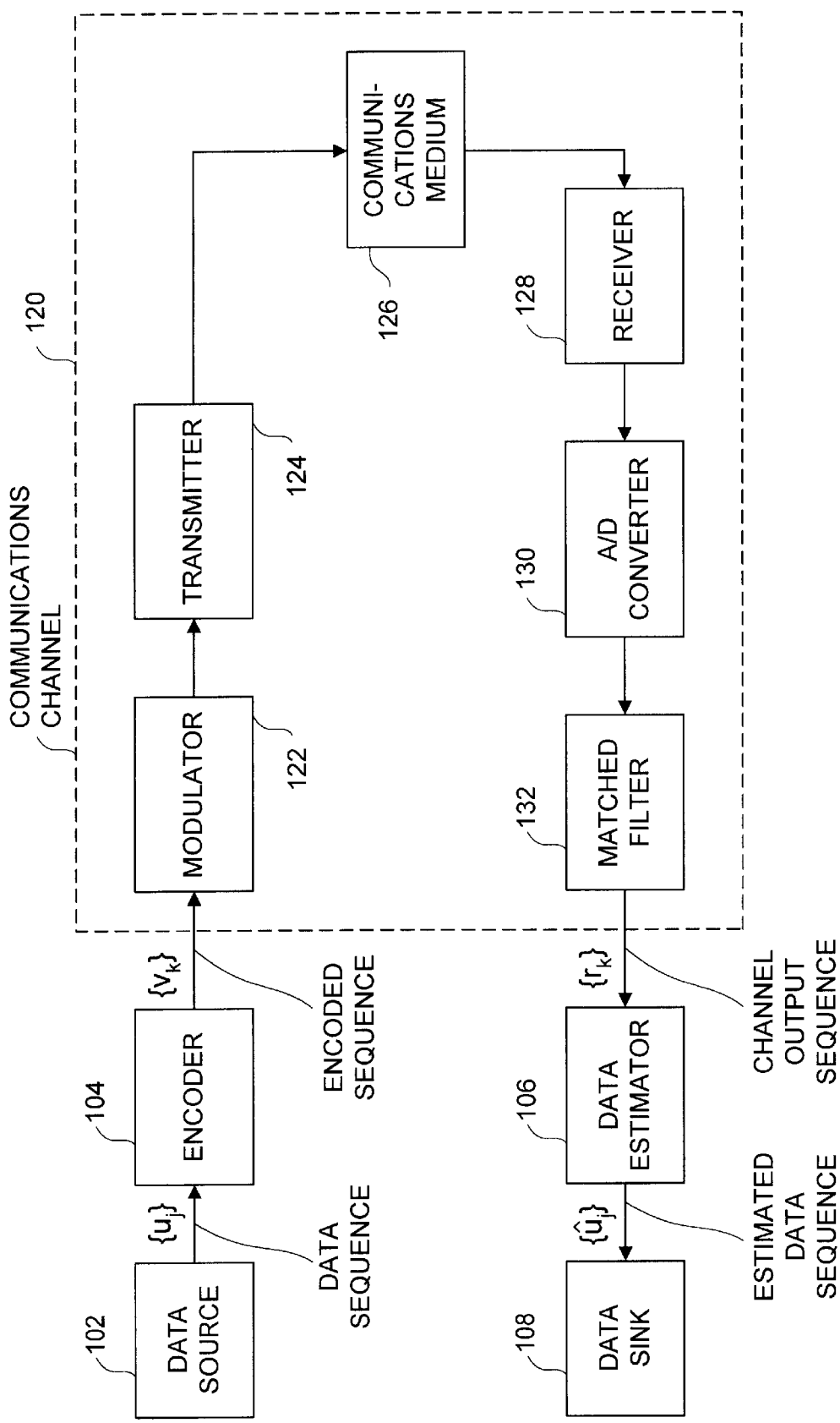
FIG. 1 is a block diagram of a data communications system.
Figure 2:
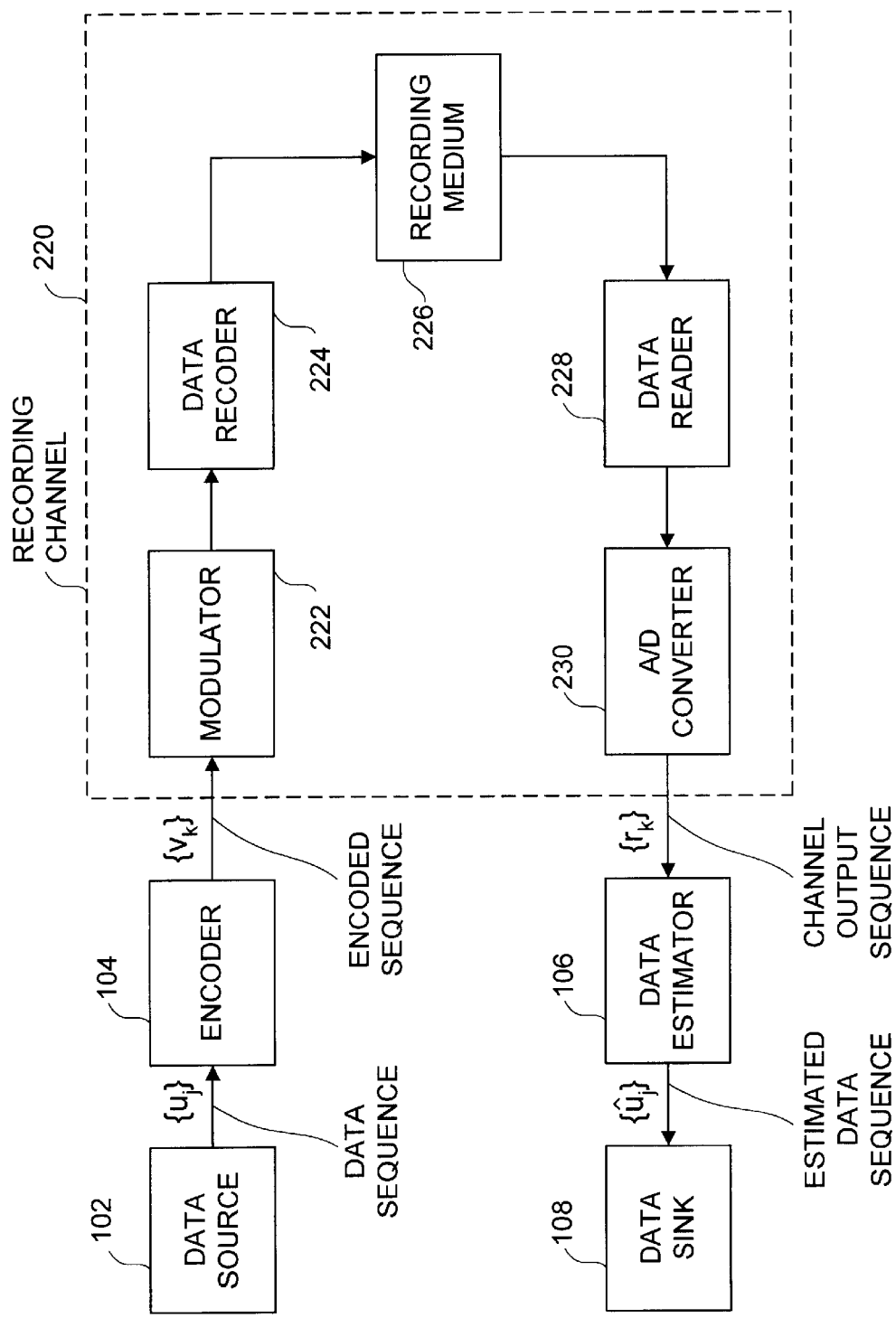
FIG. 2 is a block diagram of a data storage system.
Figure 3:
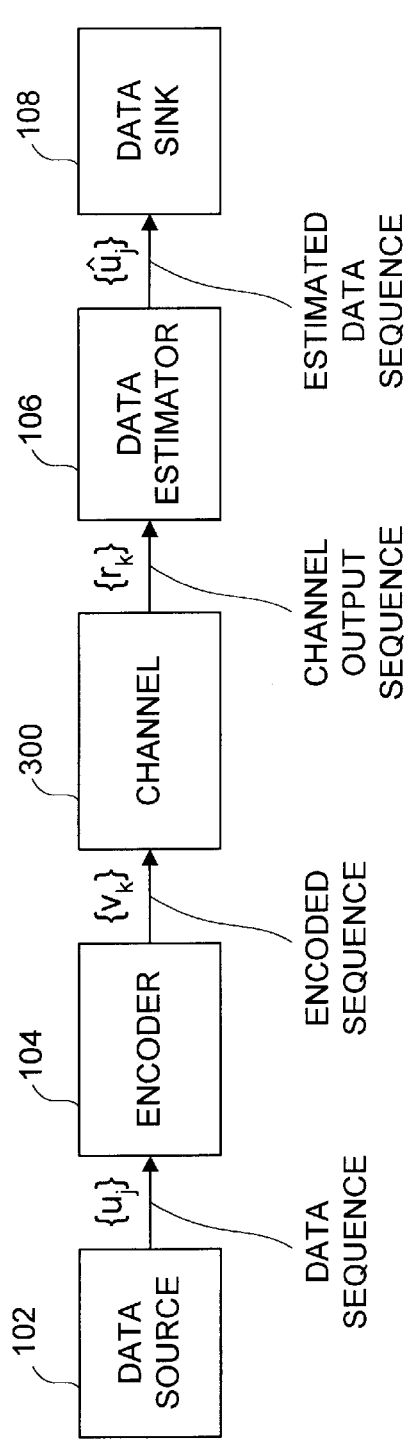
FIG. 3 is a block diagram representing either a data communications system or a data storage system, depending on whether channel 300 is a communications channel or a recording channel.

FIGS. 1 and 2, which have been described in the "Background of the Invention" section, are block diagrams depicting a data communications system and a data storage system, respectively. FIG. 3 is a block diagram that includes data source 102, encoder 104, channel 300, data estimator 106, and data sink 108. The block diagram represents a data communications system when channel 300 is a communications channel and a data storage system when channel 300 is a recording channel. Encoder 104 and data estimator 106 are the subjects of the present invention. Encoder 104 advantageously processes the data sequence $\{u_j\}$ of data symbols to provide an encoded sequence $\{v_k\}$ of encoded symbols. An element of the encoded sequence $\{v_k\}$ can assume a value from an alphabet $A_v$ of symbols, which may be real or complex. Data estimator 106 advantageously processes the channel output sequence $\{r_k\}$ of channel output samples to provide an estimated data sequence $\{\hat{u}_j\}$ of estimate data symbols, where $\hat{u}_j$ represents an estimate of $u_j$.

Figure 4:
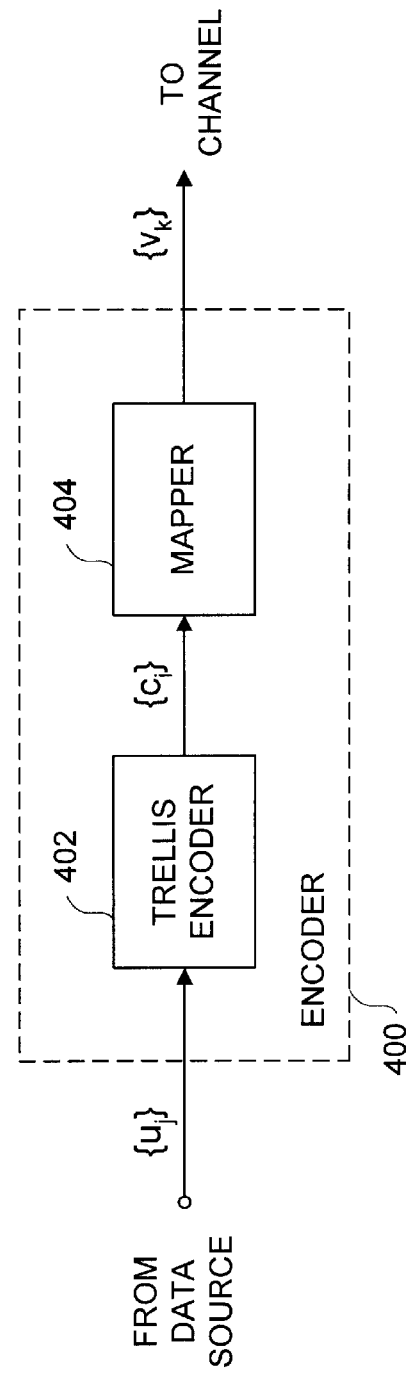
FIG. 4 is a block diagram depicting the encoding block in one embodiment of the present invention.

FIG. 4 shows a block diagram of encoder 400 in one embodiment of the present invention. Encoder 400 comprises trellis encoder 402 and mapper 404. In one embodiment of the present invention, trellis encoder 402 is a binary convolutional encoder. To describe convolutional encoders, which are well known to those skilled in the art, suppose the binary convolutional code has a rate of $n_u/n_c$ and a constraint length K, where K, $n_u$ and $n_c$ are integers such that $n_u$ is less than $n_c$. The data sequence $\{u_j\}$, which is the input to trellis encoder 402, is a binary sequence of ones and zeroes. The output of trellis encoder 402 is denoted as the trellis-encoded sequence $\{c_i\}$. Different indices are used for the sequences $\{u_j\}$ and $\{c_i\}$ to signify that they are, in general, of different lengths. Trellis encoder 402 divides the data sequence $\{u_j\}$ into groups of $n_u$ bits. For each group of $n_u$ bits, trellis encoder 402 generates $n_c$ bits. The $n_c$ output bits depend on the current $n_u$ data bits as well as the preceding (K−$n_u$) data bits, as defined by the code generators $g^{(n)}$, n=1,2, . . . ,$n_c$. A code generator is a vector of K elements each assuming a value of either 0 or 1. Suppose a code generator is represented as $$g^{(n)}=(g_0^{(n)},g_1^{(n)}, \ldots ,g_{K-1}^{(n)}) \quad (9)$$

where $g_l^{(n)} \in \{0,1\}$, l=0,1, . . . ,K−1. Suppose the K data bits being advantageously processed by trellis encoder 402 at bit time m is represented by the vector of length K:

$$u_m=(u_{m-K+1},u_{m-K+2}, \ldots ,u_{m-1},u_m). \quad (10)$$

Since trellis encoder 402 processes the data sequence in groups of $n_u$ bits, the index m in the above equation must be a multiple of $n_u$, i.e., m=$n_u$,2$n_u$, . . . . It is assumed that trellis encoder 402 is preloaded with zeroes so that in the above equation, $u_j$=0 if j<1. As the name "convolutional code" implies, the $n_c$ output bits are computed by convolving $u_m$ with $g^{(n)}$ for n=1,2, . . . ,$n_c$:

$$\begin{aligned} b_m^{(n)} &= u_m \otimes g^{(n)} \\ &= \sum_{l=0}^{K-1} u_{m-l} g_l^{(n)} \\ &= u_m g_0^{(n)} \oplus u_{m-1} g_1^{(n)} \oplus \ldots \oplus u_{m-K+1} g_{K-1}^{(n)} \end{aligned} \quad (11)$$

where $\otimes$ stands for convolution operation and $\oplus$ stands for the modulo-2 operation, which is defined by the following set of equations: 0⊕0=0, 1⊕1=0, 1⊕0=1, and 0⊕1=1. The trellis-encoded sequence $\{c_i\}$ is given in terms of $b_m^{(n)}$ according to $$c_{(l-1)n_c+n}=b_{ln_u}^{(n)} \quad (12)$$

for l=1,2, . . . and n=1,2, . . . , $n_c$.

As an example of the trellis encoding algorithm suppose the data sequence is $\{u_j\}$=(1,1,0,1,1,0,0) and the code is the well-known constraint length 3, rate 1/2 binary convolutional code with code generators $g^{(n)}$=(1,1,1) and $g^{(2)}$=(1,0,1). The output sequence can be shown to be $\{c_j\}$=(11,01, 01,00,01,01,11), which is twice as long as the input sequence. The expression for $\{c_i\}$ shows the output sequence in pairs of bits to signify the fact that, for rate 1/2 code, trellis encoder 402 generates two bits for every input bit.

It is customary to think of a trellis encoder as comprising a shift register with K stages, with the data sequence being supplied to the shift register from the left. The content of the shift register at time m is equal to the right hand side of equation (10) written in the reverse order: ($u_m$,$u_{m-1}$, . . . ,$u_{m-K+2}$,$u_{m-K+1}$). It is also customary to define the encoder state as the oldest K−$n_u$ bits in the shift register. The number of encoder states is equal to $2^{K-n_u}$. For a K=3, rate 1/2 code, there are four states: 00, 01, 10, and 11. In a binary representation of a state, the leftmost bit is the most recent bit.

Figure 5:
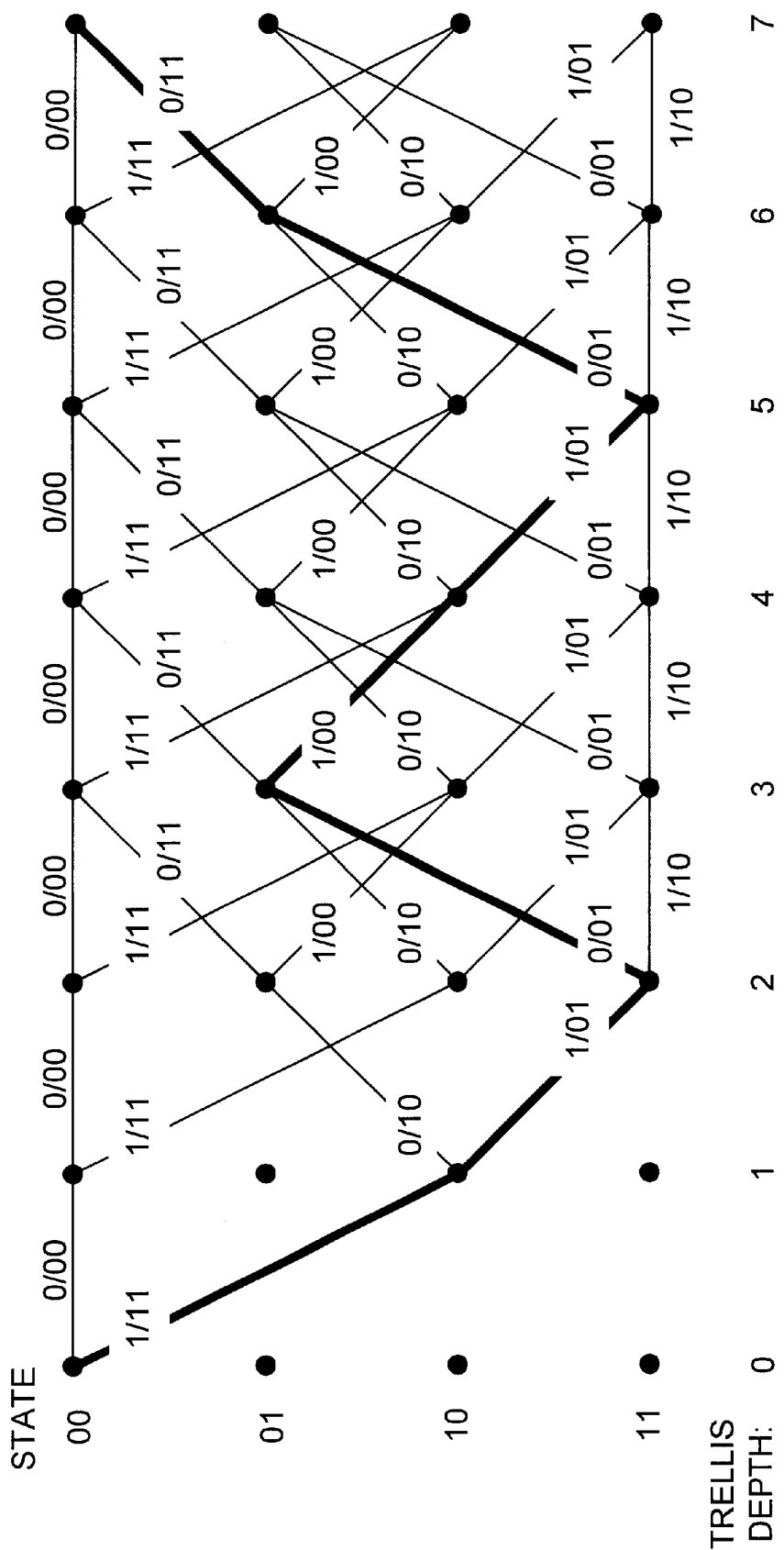
FIG. 5 is a trellis diagram of a constraint length 3, rate 1/2 convolutional code with code generators $g^{(1)}=(1,1,1)$ and $g^{(2)}=(1,0,1)$ used as an exemplary embodiment of the present invention, showing the input/output of the trellis branches and, with darken line segments, showing the encoded path for a data sequence of $\{u_j\}=(1,1,0,1,1,0,0)$.

The trellis encoding process can be displayed in the form of a trellis. A trellis diagram for the K=3, rate 1/2 code is depicted in FIG. 5. A state is shown in the figure as a dot. All of the dots on the top row of the figure are state 00, all of the dots on the second row are state 01, and so on. A state is connected to another state by a branch. Each branch in the figure is labeled as data-input/encoded-output. The darkened path in the figure shows the encoding of the data sequence $\{u_j\}=(1,1,0,1,1,0,0)$. The trellis encoding starts at trellis depth 0 at the all-zero state. The first data bit, which is 1, takes the encoder state from 00 to 10 and the trellis encoder outputs the pair 11. The second data bit, which is also 1, takes the encoder from state 10 to state 11 and the trellis encoder outputs the pair 01. And the process continues until the entire data sequence has been encoded. With reference to FIG. 5, there are two branches emanating from each state. This is due to the fact that the trellis diagram is for a rate 1/2 code. In general, for a rate $n_u/n_c$ binary convolutional code, there will be $2^{n_u}$ branches emanating from each state; and the branch label will be of the form $a_{n_u} \ldots a_1/b_1 \ldots b_{n_c}$, where $a_{n_u}$ is the most recent input data bit and $b_{n_c}$ is the most recent trellis encoder output bit.

Referring back to FIG. 4, trellis encoder 402 provides the output sequence $\{c_i\}$, which is supplied to mapper 404 to provide the encoded sequence $\{v_k\}$. The values assumed by the encoded symbols are taken from an alphabet acceptable to the channel as a valid input. In particular, the processing performed by mapper 404 is determined by the modulation scheme of modulator 122 for the case of a communications channel and of modulator 222 for the case of a data storage channel. I will now describe the mapping for four modulation schemes used in data communications systems: binary phase shift keying (BPSK), quadrature phase shift keying (QPSK), minimum shift keying (MSK), and Gaussian minimum shift keying (GMSK), which are well known to those skilled in the art. I will use the signal space representation in which a member of the sequence $\{v_k\}$ is of the form $v_k=a+jb$, where a and b are real numbers and $j=\sqrt{-1}$. (Note that j is an integer when it is used an index as in $\{u_j\}$.) For BPSK, mapper 404 maps an input bit $c_k$ into an output symbol $v_k$ according to $$v_k = \begin{cases} +1; & \text{if } c_k = 1 \\ -1; & \text{if } c_k = 0 \end{cases}. \quad (13)$$

I will refer to the above mapping as antipodal mapping. For BPSK, the output of modulator 122 is the modulated signal:

$$s(t)=v_k \cos(2\pi f_c t); \quad (k-1)T<t\leq kT \quad (14)$$

where $f_c$ is the carrier frequency and T is the duration of an encoded symbol so that 1/T is the encoded symbol rate. The quantity $f_c$ is sometimes referred to as the radio frequency (RF) and the quantity s(t) as the modulated RF signal.

For QPSK, mapper 404 maps a pair of input bits into an output symbol according to $$v_k = \begin{cases} +1+j; & \text{if } (c_{2k-1}, c_{2k}) = (1, 1) \\ +1-j; & \text{if } (c_{2k-1}, c_{2k}) = (1, 0) \\ -1+j; & \text{if } (c_{2k-1}, c_{2k}) = (0, 1) \\ -1-j; & \text{if } (c_{2k-1}, c_{2k}) = (0, 0) \end{cases} \quad (15)$$

For QPSK, the output of modulator 122 is the modulated signal:

$$s(t)=Re\{v_k \exp\{2\pi f_c t\}\}; \quad (k-1)T<t\leq kT \quad (16)$$

where Re stands for "the real part of" and exp is the exponential function.

It proves convenient to express the modulated RF signal in terms of the complex baseband modulated signal $p_M(t)$:

$$s(t)=Re\{p_M(t)\exp\{2\pi f_c t\}\}. \quad (17)$$

For BPSK and QPSK, the complex baseband modulated signal is $$p_M(t)=v_k; \quad (k-1)T<t\leq kT. \quad (18)$$

In one embodiment of the present invention for MSK and GMSK modulation, the mapping of trellis-encoded sequence $\{c_k\}$ into the encoded sequence $\{v_k\}$ includes three steps. In the first mapping step, the trellis-encoded sequence $\{c_k\}$ is mapped into a sequence $\{V_k\}$ using antipodal mapping, i.e., set $V_k=+1$ if $c_k=1$, and set $V_k=-1$ if $c_k=0$. In the second mapping step, beginning with the second pair of symbols in the sequence $\{V_k\}$, every other pair of symbols is inverted to provide an inverted sequence, denoted as $\{\bar{v}_k\}$. In particular, $$\bar{v}_k = \begin{cases} V_k; & \text{if } k = 1, 2, 5, 6, 9, 10, \ldots \\ -V_k; & \text{if } k = 3, 4, 7, 8, 11, 12, \ldots \end{cases} \quad (19)$$

For example, if $\{V_k\}=(1,-1; 1,1; 1,1; -1,1; -1,-1)$, then the inverted sequence is $\{\bar{v}_k\}=(1,-1; -1,-1; -1,1; 1,-1; -1,-1)$. In the third mapping step, the inverted sequence is differentially encoded to provide the encoded sequence $\{v_k\}$ according to $$v_k=\bar{v}_k \bar{v}_{k-1}. \quad (20)$$

To explain the rationale behind these mapping steps, I will express the complex baseband modulated signal for MSK and GMSK as $$p_M(t)=\cos(\phi(t))+j \sin(\phi(t))=\exp\{j\phi(t)\} \quad (21)$$

where $\phi(t)$ is the phase of the modulated signal. The quantities $\cos(\phi(t))$ and $\sin(\phi(t))$ are referred to as the in-phase and the quadrature baseband signals, respectively. Consider first MSK for which the phase signal is given by $$\phi(t) = \phi((k-1)T) + v_k \frac{\pi}{2T}(t - (k-1)T); \quad (k-1)T < t \leq kT. \quad (22)$$

After some thought and plotting the phase signal for a few values of the trellis-encoded sequence $\{c_i\}$, it should become apparent that the three mapping steps are performed to control the polarity of the MSK modulated signal such that the channel output symbol $r_k$ in the absence of noise is positive if $c_k=1$ and negative if $c_k=0$. In particular, for an even value of k, the mapping steps ensure that the in-phase baseband signal, $\cos(\phi(t))$, will be positive over the two-symbol interval $(k-1)T<t\leq(k+1)T$ if $c_k=1$, and negative if $c_k=0$. Similarly, for an odd value of k, the mapping steps ensure that the quadrature baseband signal, $\sin(\phi(t))$, will be positive over the two-symbol interval $(k-1)T<t\leq(k+1)T$ if $c_k=1$, and negative if $c_k=0$. This relationship between $c_k$ and the polarity of the baseband in-phase and quadrature components will make it easier for the data estimator to recover the data sequence.

Consider next the generation of the phase signal $\phi(t)$ for GMSK. In the continuous-time notation, the encoded sequence can be represented as $$v(t) = \sum_k v_k p_{ua}(t - (k-1)T) \qquad (23)$$

where $p_{ua}(t)$ is the unit-amplitude pulse such that $p_{ua}(t)=1$ for $0<t\leq T$ and equal to 0 elsewhere. FIG. 6 shows that phase signal $\phi(t)$ is generated by supplying the signal $v(t)$ to Gaussian filter 602 to generate a frequency signal $f(t)$ and supplying the frequency signal to integrator 604. Gaussian filter 602 has a transfer function given by $$G(f) = \frac{\pi}{2}\exp\left\{-\frac{\ln 2}{2}\left(\frac{f}{B}\right)^2\right\} \qquad (24)$$

where B is the one-sided 3-dB bandwidth. The product of the one-sided 3-dB bandwidth and the symbol duration, BT, is used as a parameter in specifying the GMSK modulation. For example, the European Global System for Mobile Communications (GSM) employs BT=0.3. A smaller value of BT yields a modulated signal that has a narrower spectrum but introduces more ISI. For example, using GMSK with BT=0.1 introduces much more ISI than using GMSK with BT=0.3 but cuts the signal bandwidth by approximately a factor of two.

With reference to FIG. 6, the frequency signal may be written as $$f(t) = \sum_k v_k p_{ug}(t - kT) \qquad (25)$$

where $p_{ug}(t)$ is the response of Gaussian filter 602 when the input is the unit-amplitude pulse $p_{ua}(t)$. The phase signal may be written as $$\phi(t) = \sum_k \left[v_k \int_{-\infty}^t p_{ug}(\tau - kT)d\tau\right] = \sum_k \left[v_k \int_{-\infty}^{t-kT} p_{ug}(x)dx\right] \qquad (26)$$

FIG. 7 compares the phase signals and the quadrature signals of MSK and GMSK for the case where the sequence $\{v_k\}=(+1,-1)$. Curve 702, representing the MSK phase signal, shows that the phase changes linearly by $\pi/2$ over a period of T, reaching the maximum value of $\pi/2$ at the end of the first symbol. Curve 712, representing the GMSK phase signal, shows that the phase changes more gradually than the MSK case and that the maximum does not reach $\pi/2$. Curve 704, representing the MSK quadrature signal, shows that the signal is zero outside the interval of 2T. Curve 714, representing the GMSK quadrature signal, shows that the signal extends beyond the interval of 2T. This GMSK signal extension in the time domain causes ISI. The ISI profile can be estimated by computing the autocorrelation function of the GMSK pulse such as curve 714. The autocorrelation values approximate the modulator's discrete-time transfer function, or, the ISI profile, which will be denoted as $f_i$, i=0,±1,±2, . . . . The sampling interval is equal to the symbol interval. It is customary to normalize the discrete-time transfer function of the modulation such that $f_0=1$. For BT=0.1, I have found that $f_1=f_{-1}=0.52$ and $f_2=f_{-2}=0.08$. The discrete-time transfer function of the modulation is shown in FIG. 8a as dots. Graph 802 shows the discrete-time transfer function for GMSK with BT=0.3 and graph 804 shows the discrete-time transfer function for GMSK with BT=0.1. Therefore, as stated above, using GMSK with BT=0.1 introduces much more ISI than using GMSK with BT=0.3.

MSK and GMSK are members of a class of modulation schemes called continuous phase modulation (CPM), see the article: "Continuous Phase Modulation," by C. Sundberg, IEEE Communications Magazine, vol. 24, No. 4, pp. 25–38, April 1986 and the article: "Multi-h Phase-Coded Modulation," by I. Sasase and S. Mori, IEEE Communications Magazine, pp. 46–56, December 1991. Those skilled in the art should recognize that the encoding and mapping methods described above are applicable to CPM.

I will now describe encoder 400 for two popular modulation schemes in magnetic recording, namely the class IV partial response (PR4) and the extended the extended class IV partial response (EPR4) schemes. The extension of the present invention to other partial response modulation should be obvious to those skilled in the art. For this embodiment of the present invention, trellis encoder 402 is a binary convolutional encoder. Mapper 404 employs two mapping steps. In the first mapping step, the trellis-encoded sequence $\{c_k\}$ is mapped into a sequence $\{V_k\}$ using antipodal mapping, i.e., set $V_k=+1$ if $c_k=1$, and set $V_k=-1$ if $c_k=0$. This step is identical to that described previously for MSK and GMSK. In the second mapping step, the sequence $\{V_k\}$ is mapped into the encoded sequence $\{v_k\}$ according to the chosen partial response modulation scheme. For PR4 modulation, which has a discrete-time transfer function of $1-D^2$, the encoded symbol for the k'th symbol interval is given by $$v_k = V_k - V_{k-2}. \qquad (27)$$

For EPR4 modulation, which has a discrete-time transfer function of $1+D-D^2-D^3$, the encoded symbol for the k'th symbol interval is $$v_k = V_k + V_{k-1} V_{k-2} - V_{k-3}. \qquad (28)$$

The discrete-time transfer function of the PR4 mapping is shown in FIG. 8b as graph 806 and that of the EPR4 modulator is shown as graph 808. It should be noted that the non-zero ISI components in the PR4 and EPR4 signals are postcursor and that there is no precursor ISI. This may be contrasted with the GMSK modulated signal, which has both non-zero precursor and postcursor ISI.

Figure 9A:
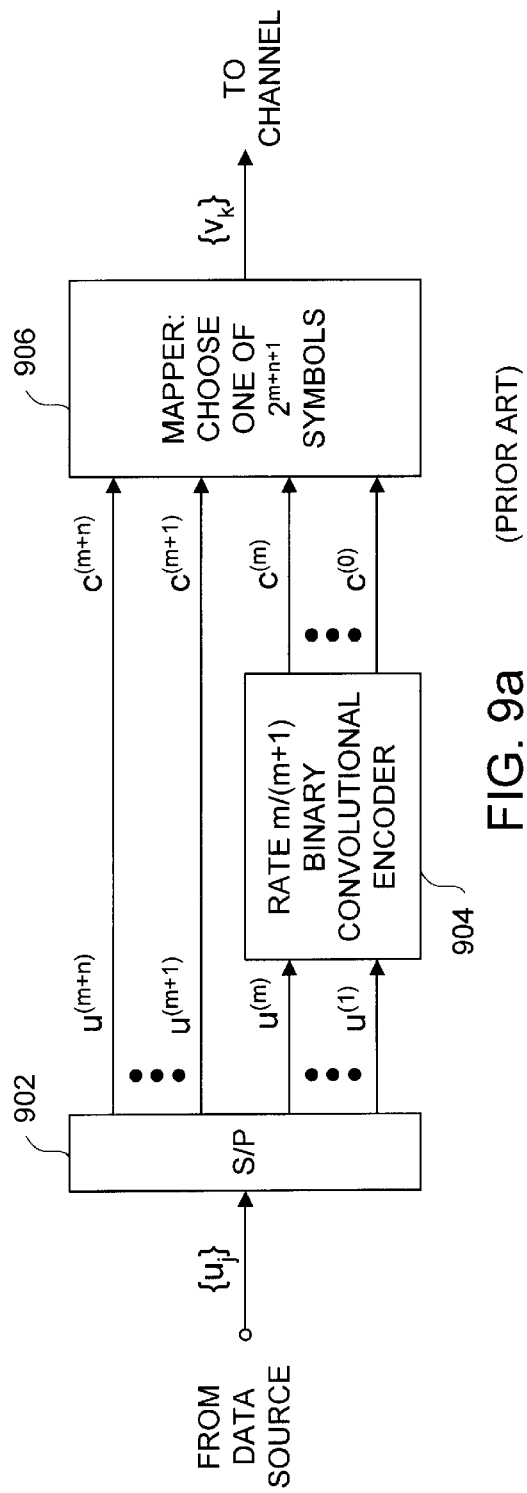
FIG. 9a is a block diagram of a rate (m+n)/(m+n+1) TCM encoder comprising a rate m/(m+1) binary convolutional encoder and a mapper for choosing a symbol from an alphabet with $2^{m+n+1}$ symbols.

In yet another embodiment of the present invention, trellis encoder 402 of encoder 400 is a trellis coded modulation (TCM) encoder, which should be familiar to those skilled in the art, and is described in the article: "Channel Coding with Multilevel/Phase Signals," by G. Ungerboeck, IEEE Transactions on Information Theory, vol. IT-28, No. 1, pp. 55–66, January 1982. A TCM encoder/mapper with a code rate of (m+n)/(m+n+1) is shown in FIG. 9a. The data sequence $\{u_j\}$ is supplied to S/P converter 902, which performs serial-to-parallel conversion by dividing the input sequence into groups of length (m+n) bits and presenting one group at a time at its parallel output ports. The first m bits in each group of (m+n) bits, denoted as $(u^{(1)}, u^{(2)}, \ldots, u^{(m+n)})$, are supplied to a rate m/(m+1) binary convolutional encoder 904, which encodes the m bits into (m+1) bits, denoted as $(c^{(0)}, c^{(1)}, \ldots, c^{(m)})$. The other n bits in each group of (m+n) bits of the data sequence are not encoded, i.e., $c^{(j)}=u^{(j)}$ for $j=m+1, \ldots, m+n$. The trellis-encoded vector $(c^{(0)}, c^{(1)}, \ldots, c^{(m+n)})$ is supplied to mapper 906, which selects a symbol based on the trellis-encoded vector from an alphabet containing $2^{m+n+1}$ symbols. The mapping used by mapper 906 is pre-defined by a process known as set partitioning, which is familiar to those skilled in the art and is described in the article by Ungerboeck cited above.

Figure 9B:
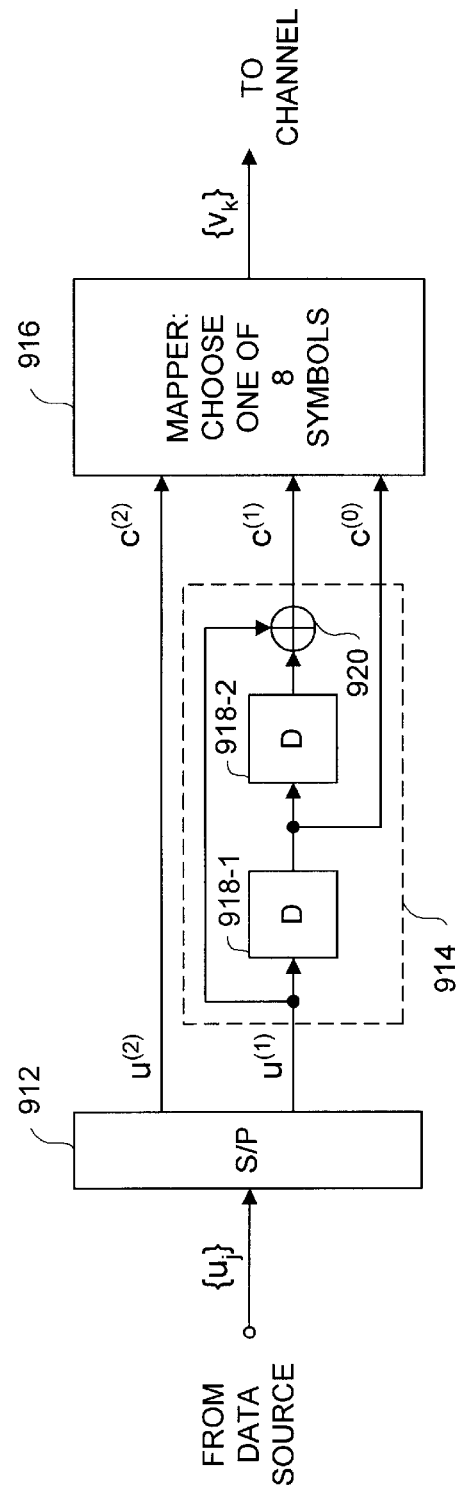
FIG. 9b is a block diagram of a rate 2/3, 4-state TCM encoder comprising a rate 1/2 binary convolutional encoder and a mapper for choosing a symbol from an alphabet with eight symbols.

I will now present an example of a TCM encoder that can be used with the present invention. FIG. 9b shows a rate 2/3, 4-state TCM encoder. The output of S/P converter 912 is supplied to convolutional encoder 914, which has delay elements 918-1 and 918-2 and modulo-2 adder 920. Convolutional encoder 914 has code generators $g^{(1)}=(0,1,0)$ and $g^{(2)}=(1,0,1)$. The trellis-encoded vector $(c^{(0)},c^{(1)},c^{(2)})$ is supplied to mapper 916, which selects a symbol based on the trellis-encoded vector from an alphabet containing eight symbols.

Figure 10:
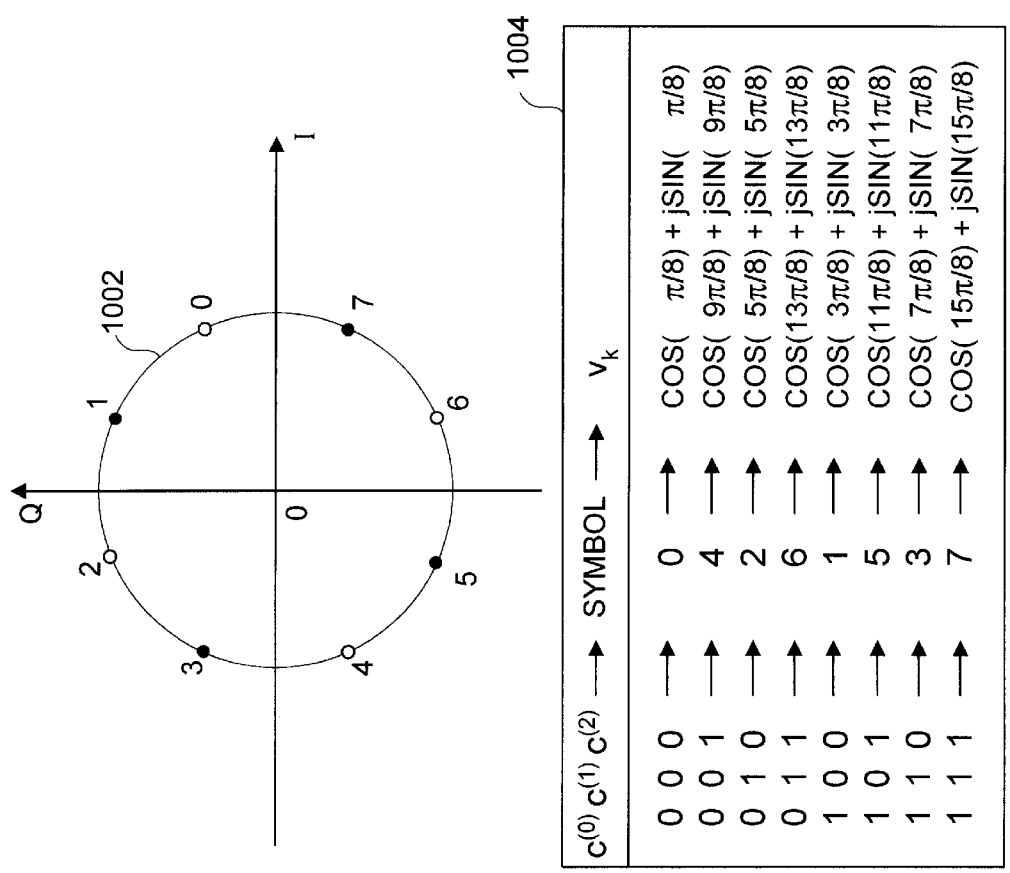
FIG. 10 shows an 8-PSK constellation partitioned into two sets and the mapping of the rate 2/3, 4-state TCM encoder output sequence into an 8-PSK symbol and the corresponding complex symbol $v_k$ of the encoded sequence $\{v_k\}$.

FIG. 10 shows an 8-PSK constellation partitioned into two sets and the mapping of the rate 2/3, 4-state TCM encoder output sequence into an 8-PSK symbol and the corresponding complex symbol $v_k$. The signal constellation has eight points on circle 1002 of radius one. The signal points shown as open circles and labeled as symbols 0, 2, 4, and 6 are in one set while the those shown as filled-in dots and labeled as symbols 1, 3, 5, and 7 are in another set. To illustrate the mapping of the trellis-encoded vector into a symbol, let $(c^{(0)},c^{(1)},c^{(2)})=(0,1,1)$. The bit $c^{(0)}$ chooses one of the two sets: if $c^{(0)}=0$, then the set $\{0,2,4,6\}$ is chosen; if $c^{(0)}=1$, then the set $\{1,3,5,7\}$ is Since, for this example, $c^{(0)}=0$, the set $\{0,2,4,6\}$ is chosen. This set of four symbols is further partitioned into two sets of two symbols each and the bit $c^{(1)}$ chooses between the two sets. In particular, if $c^{(1)}=0$, then the set $\{0,4\}$ is chosen; otherwise the set $\{2,6\}$ is chosen. As shown in FIG. 10, the two symbols in each of these two sets are 180° apart and achieve the maximum Euclidean distance between two points on a circle. Thus, set partitioning maximizes the Euclidean distance among the signal points within a set. Returning to the example, since $c^{(1)}=1$, the set $\{2,6\}$ is chosen. Finally, $c^{(2)}=1$ selects symbol 6 from the set. Hence, the trellis encoder vector (0,1,1) is mapped into symbol 6. The complete set of mapping is shown in table 1004 in FIG. 10. The encoder output symbol $v_k$ is a complex number with an in-phase (I) component and a quadrature (Q) component. For example, the trellis-encoded vector (0,0,0) is mapped into symbol 0, which has a complex representation of $\cos(\pi/8)+j\sin(\pi/8)$.

Figure 11:
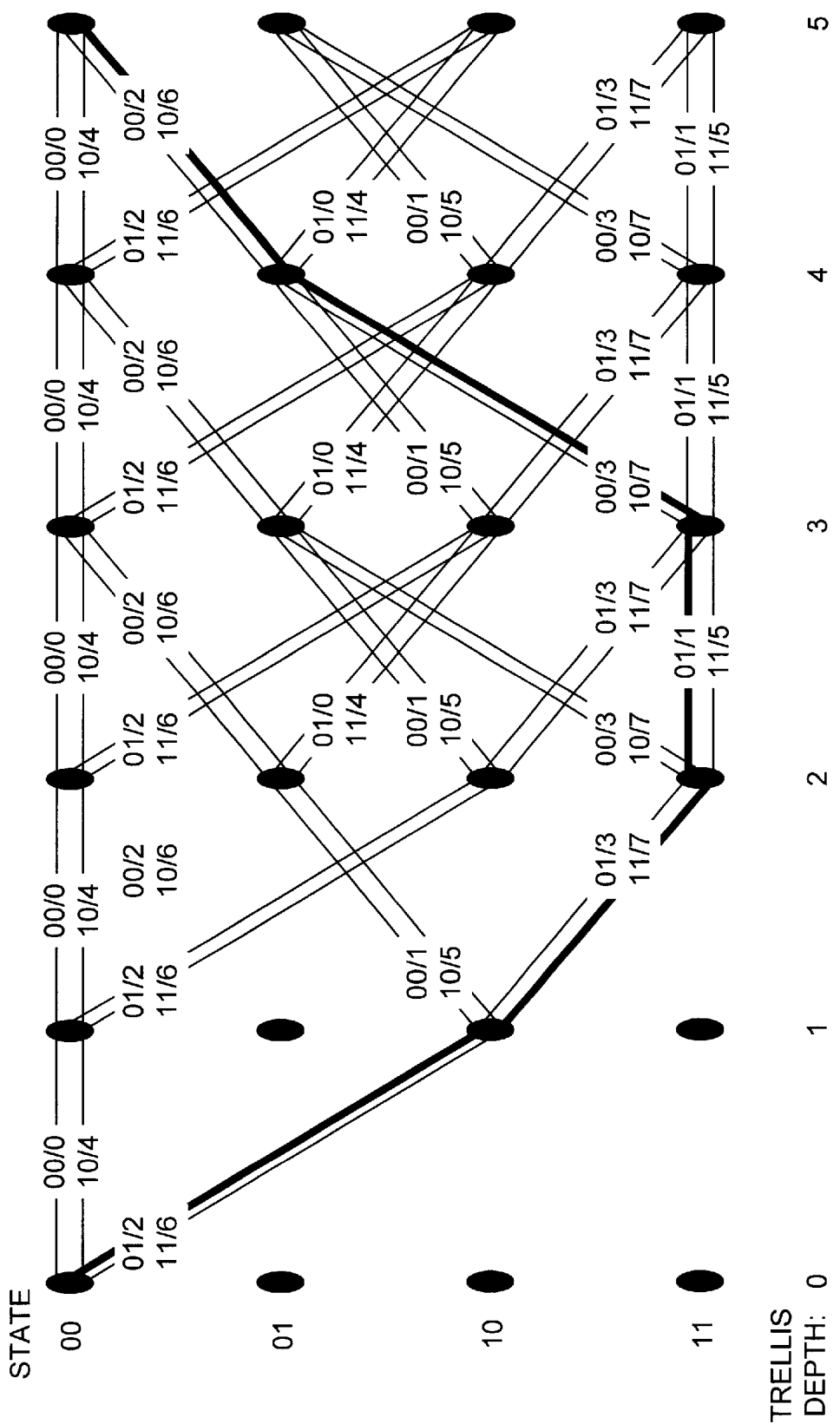
FIG. 11 is a trellis diagram of the rate 2/3, 4-state TCM used as an example of TCM coding in one embodiment of the present invention, showing the input/output of the trellis branches and, with darken line segments, showing the encoded path for a data sequence of $\{u_j\}=(10,11,10,01,01)$.

FIG. 11 is a trellis diagram of the rate 2/3, 4-state TCM code discussed above. A branch on the trellis is labeled $u^{(2)}u^{(1)}$/symbol. Note that the input bits are written in the reverse order, with the newest bit on the right. For example, if the data sequence is $\{u_j\}=(1,0)$, then $u^{(2)}u^{(1)}=(0,1)$. There is a pair of parallel branches connecting each pair of states. The input bit $u^{(1)}$ determines the next state and $u^{(2)}$ determines which of the two parallel branches is to be chosen. For example, suppose the current state is 00. If $u^{(1)}=0$, the next state is 00; if $u^{(1)}=1$, the next state is 10. If $u^{(2)}=0$, the upper branch of the two parallel branches is chosen; if $u^{(2)}=1$, the lower branch is chosen. FIG. 11 shows, with a darken path, the encoded path for an input sequence of $\{u_j\}=(10,11,10,01,01)$. The encoded sequence is $\{v_k\}=(2,7,1,\overline{7},6)$.

Those skilled in the art should recognize that the preceding TCM example can easily be generalized, by using the arrangement shown in FIG. 9a, to support a PSK constellation with $2^n$ symbols, for n greater than 3. They should also recognize that same arrangement can be used to support quadrature amplitude modulation (QAM). Set partitioning of TCM to support QAM is discussed in the article by Ungerboeck cited above.

Table 1 presents the exemplary encoding embodiments of the present invention. In summary, trellis encoding is performed on the data sequence $\{u_j\}$ to provide a trellis-encoded sequence $\{c_k\}$, which is mapped into an encoded sequence $\{v_k\}$ for use as input to a channel, which includes a modulator.

TABLE 1

Summary of the encoding embodiments of the present invention

| Trellis Encoding | Mapping | Modulation |
| --- | --- | --- |
| Binary convolutional encode $\{u_j\}$ to provide $\{c_i\}$. | Convert $\{c_i\}$ to $\{v_k\}$ using antipodal mapping. | BPSK |
| Binary convolutional encode $\{u_j\}$ to provide $\{c_i\}$. | Convert $\{c_k\}$ to $\{v_k\}$ using antipodal mapping. | QPSK |
| Binary convolutional encode $\{u_j\}$ to provide $\{c_i\}$. | 1. Convert $\{c_i\}$ to $\{V_k\}$ using antipodal mapping.<br>2. Invert every other pair of symbol in $\{V_k\}$ to provide $\{\overline{v}_k\}$ according to eq. (19); and<br>3. Differentially encode $\{\overline{v}_k\}$ to provide $\{v_k\}$ according to eq. (20). | MSK or GMSK |
| Binary convolutional encode $\{u_j\}$ to provide $\{c_i\}$. | 1. Convert $\{c_i\}$ to $\{V_k\}$ using antipodal mapping;<br>2. Map $\{V_k\}$ into $\{v_k\}$ according to eq. (27). | PR4 |
| Binary convolutional encode $\{u_j\}$ to provide $\{c_i\}$. | 1. Convert $\{c_i\}$ to $\{V_k\}$ using antipodal mapping.<br>2. Map $\{V_k\}$ into $\{v_k\}$ according to eq. (28). | EPR4 |
| TCM encode $\{u_j\}$ to provide $\{c_i\}$. | Convert $\{c_i\}$ to $\{v_k\}$ according to TCM set partitioning. | PSK or QAM |

Figure 12:
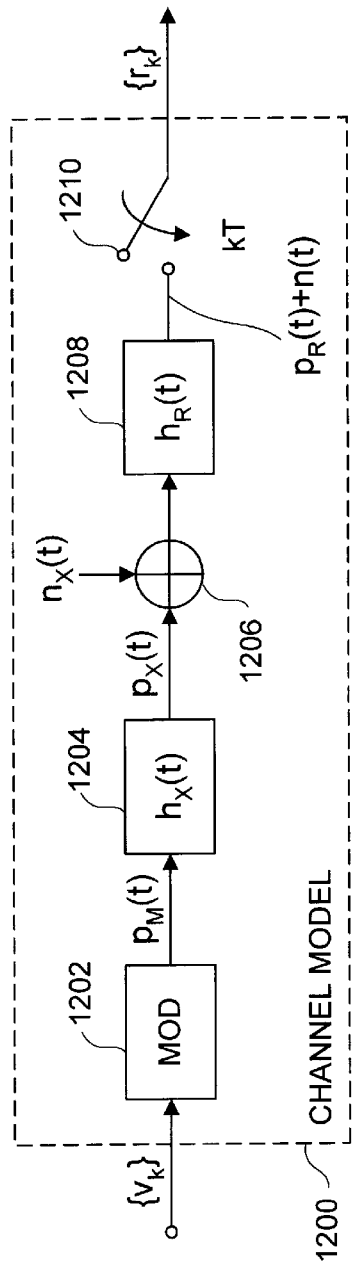
FIG. 12 is a block diagram of a channel model.

Quantities called templates will be a part of the data estimator embodiments of the present invention. A template is a function of two or three vector arguments and is the response of a noiseless channel model with a truncated ISI profile when the arguments of the templates are applied to the noiseless channel model. A template represents the statistical average values of the channel output samples after certain processing has been performed, as explained below. In the data estimator, templates are compared with processed channel output samples to provide a reliability metric. The results of these comparisons are used to aid data recovery. I will define the templates and show how they can be calculated or estimated. I will start with channel model 1200 shown in FIG. 12. The model is a complex baseband model, i.e., the signals are at the baseband frequency and they are in general complex, having real and imaginary parts. The encoded sequence $\{v_k\}$ is supplied to modulator (MOD) 1202 to provide a complex baseband modulated signal $p_M(t)$. The modulated signal $p_M(t)$ is supplied to block 1204, which has an impulse response of $h_x(t)$, to provide a signal $p_x(t)$. In the case of a data communications channel, block 1204 models the response of the transmitter and the communications medium. In the case of a data storage channel, block 1204 models the data recorder and the recording medium. From basic systems theory, it is seen that $$p_x(t)=p_M(t)\otimes h_x(t) \qquad (29)$$

where $\otimes$ stands for the convolution operation. The signal $p_x(t)$ is supplied to adder 1206. The other input to adder 1206 is a noise process $n_x(t)$. The output of adder 1206 is supplied to block 1208, which has an impulse response of $h_R(t)$, to provide the signal $p_R(t)+n(t)$, where $$p_R(t)=p_x(t)\otimes h_R(t) \qquad (30)$$

and $$n(t)=n_x(t)\otimes h_R(t) \qquad (31)$$

are the filtered signal and the filtered noise, respectively. In the case of a data communications channel, block 1208 models the response of the receiver and the matched filter. In the case of a data storage channel, block 1208 models the data reader. Sampler 1210 samples the output of block 1208 once every T seconds to generate the channel output sequence $\{r_k\}$, where T is the duration of a symbol. It proves convenient to represent $r_k$ as the sum of a signal component and a noise component:

$$r_k = s_k + n_k \qquad (32)$$

where, $$s_k = p_R(kT) \qquad (33)$$

and $$n_k = n(kT). \qquad (34)$$

The noise process n(t) is usually modeled as a zero-mean random process. Therefore, from equation (32), the signal component $s_k$ is the statistical average of the channel output sample $r_k$. Strictly speaking, the statistical average is a conditional statistical average where the condition is the application of a specific sequence to the channel input. This point would become apparent in the following when we define the templates as statistical averages.

The above discussion shows that, when a given encoded sequence $\{v_k\}$ is supplied to channel model 1200, the signal component $\{s_k\}$ of the channel output sequence $\{r_k\}$ can be uniquely computed from the characteristics of modulator (MOD) 1202 and the impulse responses $h_x(t)$ and $h_R(t)$ of blocks 1204 and 1208, respectively. The above-described procedure works for either linear or non-linear modulation schemes. The modulation schemes MSK and GMSK are non-linear. When the modulation scheme is linear, such as BPSK, QPSK, M-ary PSK, and QAM, the channel output sequence $\{r_k\}$ may be expressed as a linear combination of the encoded sequence $\{v_k\}$. This is done in equation (1) where the coefficients $h_i$, $i = -L_1, \ldots, 0, \ldots, L_2$ represent the channel impulse response (CIR). More specifically, $h_i = h(iT)$ where h(t) is the continuous-time impulse response of the channel, which is equal to the convolution the impulse response of modulator (MOD) 1202 with the impulse responses $h_x(t)$ and $h_R(t)$ of blocks 1204 and 1208, respectively. For linear modulation, the signal component $\{s_k\}$ of the channel output sequence $\{r_k\}$ is given by $$s_k = \sum_{i=-L_1}^{-1} h_i v_{k-i} + h_0 v_k + \sum_{i=1}^{L_2} h_i v_{k-i} \qquad (35)$$

Figure 13:
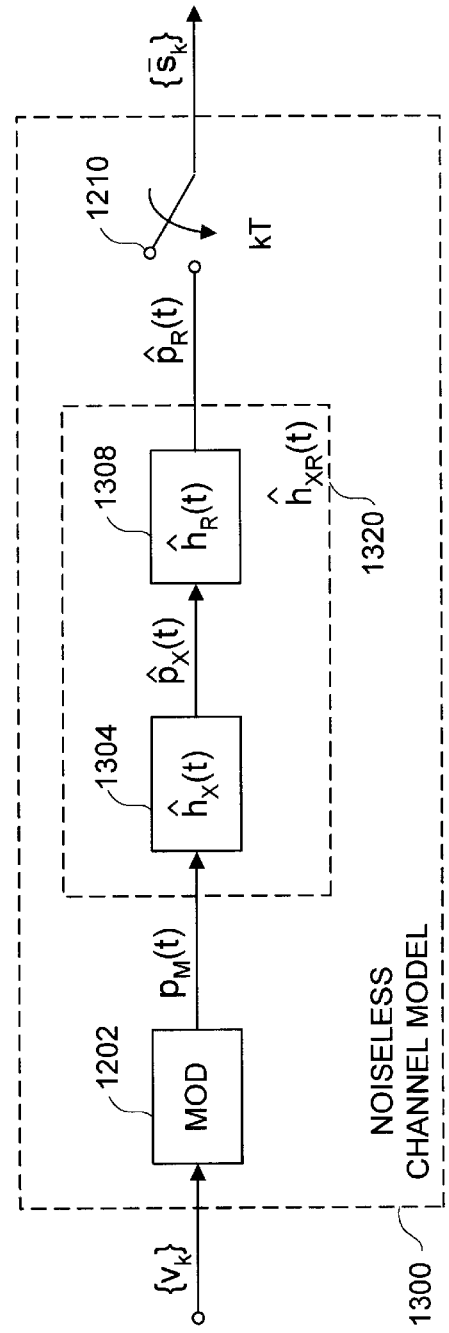
FIG. 13 is a block diagram of a noiseless channel model.

In general, not all of the characteristics and impulse responses of the channel are known a priori. If the signal component $\{s_k\}$ of the channel output is to be computed, one must first estimate the unknown characteristics of the channel. FIG. 13 shows a block diagram of noiseless channel model 1300, which is the same as channel model 1200 with the following exception: (i) the noise process $n_x(t)$ and adder 1206 are absent; and (ii) the impulse responses $h_x(t)$ and $h_R(t)$ of blocks 1204 and 1208 are replaced by impulse response estimates $\hat{h}_x(t)$ and $\hat{h}_R(t)$ of blocks 1304 and 1308, respectively. In this exemplary description of the present invention, I have assumed that the characteristics of modulator (MOD) 1202 are known a priori. This assumption should not be considered restrictive. In an application where the characteristics of the modulator can only be estimated, the calculation of the complex baseband modulated signal $p_M(t)$ can be made based on the estimated characteristics of the modulator. Applying basic systems theory to the noiseless channel model of FIG. 13 yields $$\hat{p}_x(t) = p_M(t) \otimes \hat{h}_x(t) \qquad (36)$$

and $$\hat{p}_R(t) = \hat{p}_x(t) \otimes \hat{h}_R(t). \qquad (37)$$

These two equations may be combined to yield $$\hat{p}_R(t) = p_M(t) \otimes \hat{h}_{XR}(t) \qquad (38)$$

Here, $$\hat{h}_{XR}(t) = \hat{h}_x(t) \otimes \hat{h}_R(t) \qquad (39)$$

is the impulse response of block 1320, which is the cascade of the blocks 1304 and 1308. The signal output of the noiseless channel model is $$\bar{s}_k = \hat{p}_R(kT). \qquad (40)$$

In summary, the signal sequence $\{\bar{s}_k\}$ in response to the encoded sequence $\{v_k\}$ being supplied to the input of noiseless channel model 1300 may be computed as follows: (i) compute the baseband modulated signal $p_M(t)$ for the chosen modulation scheme; (ii) compute $\hat{p}_R(t)$ using equation (38); and (iii) compute $\bar{s}_k$ using equation (40).

In the above procedure for calculating the signal sequence $\{\bar{s}_k\}$, the equations have been presented in the continuous-time domain. Those skilled in the art will recognize that the continuous-time baseband modulated signal $p_M(t)$ and the impulse response $\hat{h}_{XR}(t)$ may be replaced by their equivalent discrete-time functions so that the calculation may be carried out by means of digital signal processing. I will illustrate this by describing a computer program that I have developed for simulating one embodiment of the present invention where the modulation is GMSK. In the computer program, the discrete-time calculations are performed at the rate of four times per symbol period T, i.e., the sampling period $T_s = T/4$. The discrete-time equivalent of the frequency signal given by equation (25) is evaluated at the sampling instants $t = t_1 = iT_s$, $i = 1, 2, \ldots$, to yield f(i). The integrals in equation (26) are replaced by summations to evaluate the discrete-time phase signal $\phi(i)$ at the sampling instants. The discrete-time phase signal $\phi(i)$ is used in the discrete-time equivalent of equation (21) to calculate the discrete-time complex baseband signal $p_M(i)$. For the computer program that I have developed, the impulse response of the matched filter, denoted as $h_{MF}(i)$, is equal to the discrete-time equivalent of the quadrature signal for a GMSK modulator when the encoded sequence is $\{v_k\} = (+1, -1)$. An example of a continuous-time quadrature signal for GMSK is shown as curve 714 in FIG. 7. For the case where the only ISI is that introduced by the modulation, the estimated impulse response $\hat{h}_{XR}(t)$ of equation (39) would just be the impulse response of the matched filter, or, in discrete-time notation, $\hat{h}_{XR}(i) = h_{MF}(i)$. Hence, the discrete-time channel output signal may be computed using the discrete-time equivalent of equation (38): $\hat{p}_R(i) = p_M(i) \otimes \hat{h}_{XR}(i) = p_M(i) \otimes h_{MF}(i)$. The output of the noiseless channel model, given by equation (40), is $\hat{p}_R(k)$ where the parameter k is such that $kT_s$ is equal to a boundary of a symbol interval, i.e., $kT_s$ is a multiple of T so that the matched filter is sampled when the signal component is at its maximum level.

Calculating the signal sequence $\{\bar{s}_k\}$ is simpler when the channel is linear since the signal component $\bar{s}_k$ may be expressed as a linear combination of the encoded sequence {$v_k$}. Let $\bar{h}(t)$ be the estimated impulse response of the channel, which is equal to the convolution of the impulse response of modulator (MOD) 1202 with the estimated impulse responses $\bar{h}_x(t)$ and $\bar{h}_R(t)$ of blocks 1304 and 1308, respectively. Let $\bar{h}_i = \bar{h}(iT)$, then the sequence {$\bar{h}_i$} represents the discrete-time impulse response, or, the ISI profile, of noiseless channel model 1300. For a linear channel, the signal component $\bar{s}_k$ is given by $$\bar{s}_k = \sum_{i=-L_1}^{-1} \hat{h}_i v_{k-i} + \hat{h}_0 v_k + \sum_{i=1}^{L_2} \hat{h}_i v_{k-i}. \tag{41}$$

Since the channel with ISI can spread the input signal in time, the channel output usually has a longer duration than the channel input. Suppose an encoded sequence {$v_k$} is a sequence of zeroes except at time i, i.e., $v_k = 0$ for $k \neq i$. If this sequence is supplied to noiseless channel model 1300, then the output sequence is ( ..., $\hat{h}_{-1} v_i, \hat{h}_0 v_i, \hat{h}_1 v_i, ...$ ). I will adopt the indexing convention that $\bar{s}_i = \bar{h}_0 v_i$ and refer to $\bar{s}_i$ as the primary response of noiseless channel model 1300 to channel input $v_i$.

I will now define the templates, in particular the single-sided template $\hat{q}(\cdot,\cdot)$, which is a function of two arguments. The arguments, which can be either vectors or scalars, assume values from the alphabet $A_v$ of the encoded sequence {$v_k$}. Let the arguments of the templates be x and y, where $x=(x_1, x_2, ..., x_{L_x})$ and $y=(y_1, y_2, ..., y_{L_y})$ are vectors of length $L_x$ and $L_y$ respectively, with elements taken from the alphabet $A_v$ of the encoded sequence {$v_k$}. For these vector arguments, the template is equal to $\hat{q}(x,y)$. By definition, $\hat{q}(x,y)$ is a vector with the same number of elements as the second vector argument y.

Figure 14:
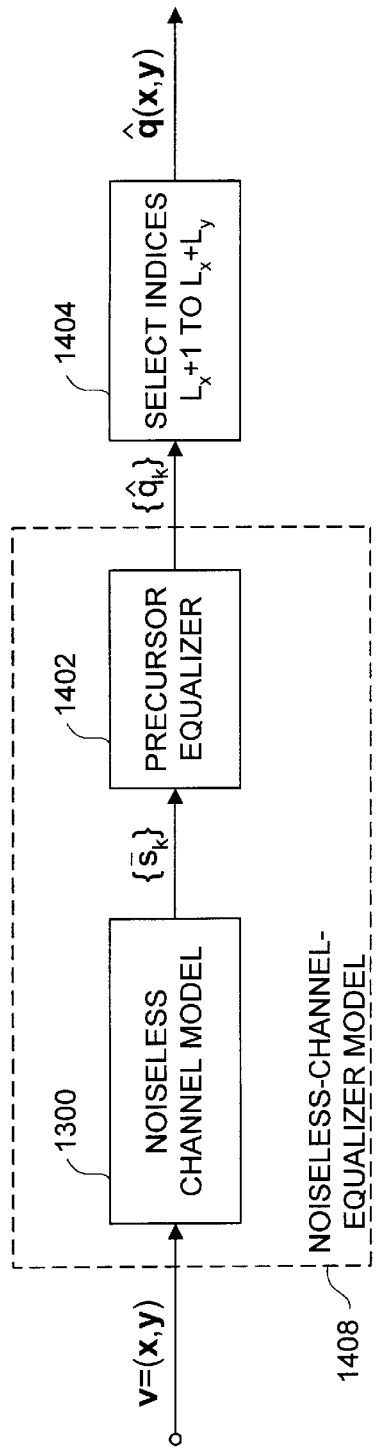
FIG. 14 is a block diagram illustrating the calculation of the templates $\hat{q}(x,y)$ in one embodiment of the present invention.

I will use FIG. 14 to motivate the definition of templates for the present invention. The vector arguments x and y of the template $\hat{q}(x,y)$ represent the input to noiseless channel model 1300. In this case, the encoded sequence {$v_k$} is expressed as a vector v, where $v=(x,y)=(x_1, x_2, ..., x_{L_x}, y_1, y_2, ..., y_{L_y})$. The signal sequence {$\bar{s}_k$}, representing the output of noiseless channel model 1300, can be computed using the method presented above. The primary response of noiseless channel model 1300 to the encoded symbol $y_1$ is $\bar{s}_{L_x+1}$ since $y_1$ is the $(L_x+1)$'th encoded symbol to be supplied to the channel. With reference to FIG. 14, the signal sequence {$\bar{s}_k$} is supplied to precursor equalizer 1402, which removes substantially all of the precursor ISI and possibly some of the postcursor ISI in its input sequence to provide an output sequence {$\hat{q}_k$}. The sequence {$\hat{q}_k$} is supplied to block 1404, which selects from its input sequence those elements with indices $(L_x+1)$ to $(L_x+L_y)$ to provide the template $\hat{q}(x,y) = (\hat{q}_{L_x+1}, ..., \hat{q}_{L_x+L_y})$. Since $\hat{q}(x,y)$ is computed using a channel model without noise, the template approximates the statistical averages for channel model 1200, for which noise is modeled as a zero-mean random process. Since channel model 1200 is in turn a model of channel 300, it follows that, when the encoded vector $v=(x,y)$ is applied to channel 300, the template $\hat{q}(x,y)$ approximates statistical averages of the channel output samples after the samples have been processed by an equalizer that removes the precursor ISI and possibly some of the postcursor ISI.

I will now show that templates may be computed from a truncated ISI profile obtained by setting selected components of the ISI profile of the channel to zero. Let {$\tilde{h}_i$} represent the discrete-time system impulse response of noiseless-channel-equalizer model 1408 shown in FIG. 14. Block 1408 is made up of noiseless channel model 1300 and precursor equalizer 1402. According to the present invention, the sequence {$\hat{q}_k$} is substantially free of precursor ISI but may contain some of all of the postcursor ISI. In other words, the ISI profile for the sequence {$\hat{q}_k$} may be represented as $$\tilde{h}_i \approx \begin{cases} 0; & \text{for } i < 0 \text{ and } i > L_x \\ \tilde{h}_i; & \text{for } i = 0, 1, ..., L_x \end{cases}, \tag{42}$$

where {$\hat{h}_i$} is the ISI profile of noiseless channel model 1300. If $L_x = L_2$, none of the postcursor ISI is equalized. If $L_x < L_2$, some of the postcursor ISI is equalized. The discrete-time impulse response {$\tilde{h}_i$} is therefore a truncated ISI profile obtained by setting the precursor and possibly some postcursor components of the ISI profile {$\hat{h}_i$} to zero. For a linear channel, the desired sample for the k'th symbol interval at the output of precursor equalizer 1402 may be computed according to $$\hat{q}_k = \sum_{i=-L_1}^{L_2} \tilde{h}_i v_{k-i} \tag{43}$$

$$\approx \hat{h}_0 v_k + \sum_{i=1}^{L_x} \hat{h}_i v_{k-i}.$$

It follows that the template $\hat{q}(\cdot,\cdot)$ may be computed from a truncated ISI profile.

To complete the discussion on calculating single-sided templates, I will describe the structure of precursor equalizer 1402. For the present invention, block 1402 is a transversal filter with $N_1$ precursor taps and $N_2$ postcursor taps. The total number of equalizer taps is $N=N_1+N_2+1$. The number of equalizer taps is set to be sufficiently large so that the precursor ISI and selected postcursor ISI components can be equalized. If the vector of equalizer tap weights is $w=(w_{-N_1}, ..., w_0, ..., w_{N_2})^T$ and the signal vector being advantageously processed by the equalizer is $\bar{s}_k = (\bar{s}_{k+N_1}, ..., \bar{s}_k, ..., \bar{s}_{k-N_2})^T$, then the output sample of precursor equalizer 1402 for the k'th symbol interval would be $$\bar{q}_k = w^H \bar{s}_k. \tag{44}$$

The equalizer tap weights required to provide an output $\bar{q}_k$ that approximates the desired output $\hat{q}_k$ can be calculated using the solution to the Wiener-Hopf equation, see the book: *Adaptive Filter Theory, Third Edition*, by S. Haykin, Prentice-Hall, Inc., 1996, pp. 194–206. The vector of the required equalizer tap weights is given by the following equation, which is well known to those skilled in the art:

$$w = R^{-1} p \tag{45}$$

where $R^{-1}$ is the inverse of the N×N autocorrelation matrix R, which is given by $$R = E\{\bar{s}_k \bar{s}_k^H\} \tag{46}$$

where E is the statistical averaging operator, also known as the expectation operator. The quantity p is a N×1 cross-correlation column vector:

$$p = E\{\bar{s}_k \hat{q}_k\}. \tag{47}$$

Figure 15:
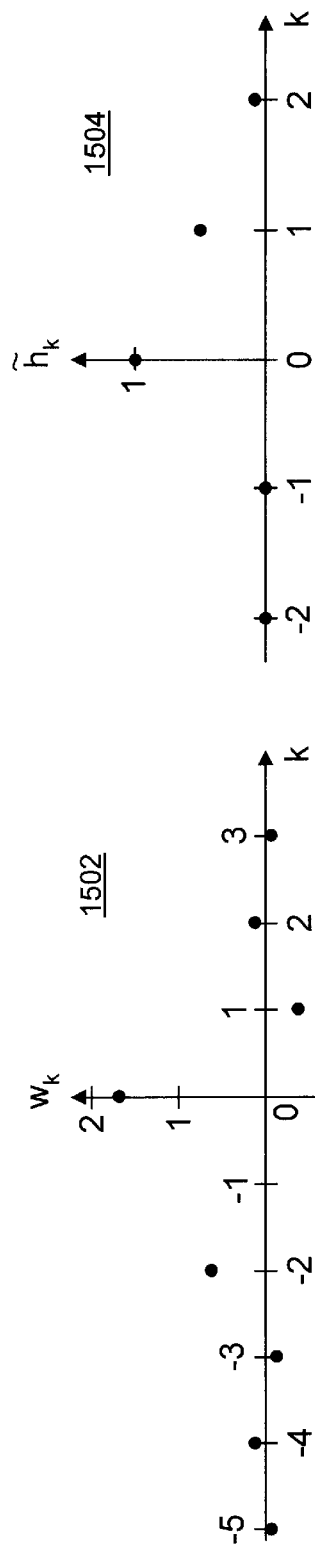
FIG. 15 shows a graph of the precursor equalizer tap weights used to remove substantially all of the precursor ISI for the GMSK modulation with BT=0.1 and a graph of the discrete-time impulse response at the output of the precursor equalizer.

For a non-linear modulation such as GMSK, I have found by means of computer simulation that good performance can be achieved by using the tap weights calculated using a linear model as described above. More specifically, the desired output $\hat{q}_k$ is computed using the linear model of equation (43). As an example on the application of the Wiener-Hopf solution to GMSK, suppose all of the ISI is introduced by the modulator, i.e., $h_i = f_i$ for all values of i, where $f_i$ is the i'th coefficient of the discrete-time transfer function of the modulator. Suppose the modulation is GMSK with BT=0.1 so that the discrete-time transfer function is given by graph 804 of FIG. 8a. Consider a precursor equalizer with five precursor taps, one center tap, and three postcursor taps. The equalizer tap weights computed according to equation (45) are shown as graph 1502 of FIG. 15. The discrete-time impulse response of the noiseless-channel-equalizer model 1408 is shown in FIG. 15 as graph 1504, which shows that the precursor ISI has been substantially removed by the precursor equalizer and the postcursor ISI has been left unequalized.

In summary, the single-sided template $\hat{q}(\bullet,\bullet)$ is a function of two arguments and is a vector with the same number of elements as the second vector argument. For vector arguments x and y, the single-sided template $\hat{q}(x,y)$ is the response of a noiseless channel model with a truncated ISI profile when vector y is applied to the channel preceded by vector x. The truncated ISI profile has zero precursor ISI and up to $L_x$ non-zero postcursor ISI components, where $L_x$ is the length of the first vector argument. The templates may be computed using equation (43) with the encoded sequence $\{v_k\}$ set to be the vector v, where v=(x,y). For non-linear channels, the templates may be approximated using the linear model of equation (43) or they may be more accurately computed by using the arrangement illustrated in FIG. 14.

Some embodiments of the present invention make use of the double-sided templates $\hat{s}(\bullet,\bullet,\bullet)$, which are a function of three arguments. For vector arguments x, y, and z, the double-sided template is equal to $\hat{s}(x,y,z)$, where x and y are defined above and $z=(z_1,z_2,\ldots,z_{L_z})$ is a vector of length $L_z$ with elements taken from the alphabet $A_v$ of the encoded sequence $\{v_k\}$. The double-sided template $\hat{s}(x,y,z)$ is the response of a noiseless channel model with a truncated ISI profile when vector y is applied to the channel preceded by vector x and followed by vector z. The truncated ISI profile has non-zero precursor and postcursor ISI:

$$\tilde{h}_i \approx \begin{cases} 0; & \text{for } i < -L_z \text{ and } i > L_x \\ \hat{h}_i; & \text{for } i = -L_z, \ldots, -1, 0, 1, \ldots, L_x \end{cases} \quad (48)$$

The components of the double-sided templates may be computed according to $$\hat{s}_k \approx \sum_{i=-L_z}^{l} \hat{h}_i v_{k-i} + \hat{h}_0 v_k + \sum_{i=1}^{L_x} \hat{h}_i v_{k-i}. \quad (49)$$

The single-sided templates $\hat{q}(\bullet,\bullet)$ and the double-sided templates $\hat{s}(\bullet,\bullet,\bullet)$ differ in the truncated ISI profiles used to generate the templates. In the case of single-sided templates the truncated ISI profile has no non-zero precursor ISI whereas in the case of the double-sided templates the truncated ISI profile may have non-zero precursor ISI.

In the preferred embodiments of the present invention, the parameters $L_x$ and $L_z$ are chosen to be sufficiently large such that the significant ISI components are not truncated. Truncating significant ISI components will increase the noise enhancement in the data recovery process and lead to a lower data estimation reliability. On the other hand, reducing the parameters $L_x$ and $L_z$ will decrease the amount of computation needed in the data estimation process. Hence, there is a tradeoff of performance and complexity.

In the preceding discussion I have used the same vector argument, namely x, for the first arguments of the single-sided templates $\hat{q}(\bullet,\bullet)$ and the double-sided templates $\hat{s}(\bullet,\bullet,\bullet)$. This has been done to simplify the discussion and should not be considered a restriction on the present invention. The present invention provides for the use of vector arguments of different lengths for the first arguments of the two types of templates. For reasons that will become apparent later, the second arguments of the two types of templates have the same lengths.

I will now examine the storage requirement of the templates. Recall that the arguments x, y, and z of the templates $\hat{s}(x,y,z)$ and $\hat{q}(x,y)$ are vectors of length $L_x$, $L_y$ and $L_z$, respectively, with elements taken from the alphabet $A_v$ of the encoded sequence $\{v_k\}$. If the alphabet $A_v$ has a size of M, then the number of templates $\hat{s}(x,y,z)$ and $\hat{q}(x,y)$ is $M^{L_x+L_y+L_z}$ and $M^{L_x+L_y}$, respectively. The number of templates $\hat{q}(x,y)$ that needs to be stored may be reduced by a factor of $M^{L_y-1}$ by storing the scalar templates $\hat{q}(x,y)$, where y can assume any value in the alphabet $A_v$, and constructing the vector templates $\hat{q}(x,y)$ from the scalar templates. To describe this method, it proves useful to consider (x,y) as a single vector with a length of $L_x+L_y$. The first element of (x,y) is $x_1$; the $L_x$'th element is $x_{L_x}$; the $(L_x+1)$'th element is $y_1$; and the last or $(L_x+L_y)$'th element is $y_{L_y}$. Let $x_i$, $i=0,1,2,\ldots,L_y-1$, be a vector of $L_x$ consecutive elements taken from the vector (x,y) such that the last element of $x_i$ is the $(L_x+i)$'th element of (x,y). For example, $x_0=x$, $x_1=(x_2,x_3,\ldots,x_{L_x},y_1)$, and $x_2=(x_3,x_4,\ldots,x_{L_x},y_1,y_2)$, and so on. With this representation, the $L_y$ elements of the vector template $\hat{q}(x,y)$ can be approximated as: $\hat{q}(x_0,y_1), \hat{q}(x_1,y_2), \ldots, \hat{q}(x_{L_y-1},y_{L_y})$. The approximation is accurate since the truncated ISI profile for calculating single-sided templates has at most $L_x$ postcursor ISI components. Hence, the vector $\hat{q}(x,y)$ may be constructed from the scalar templates $\hat{q}(x,y)$. The number of vector templates $\hat{q}(x,y)$ is $M^{L_x+L_y}$ while the number of scalar templates $\hat{q}(x,y)$ is $M^{L_x+1}$. The preferred method is to store the scalar templates instead of the vector templates, so that the storage requirement is reduced by a factor of $M^{L_y-1}$.

A similar method may be used to construct the vector templates $\hat{s}(x,y,z)$ from the scalar templates $\hat{s}(x,y,z)$. Consider (x,y,z) as a single vector with a length of $L_x+L_y+L_z$: the first element of (x,y,z) is $x_1$ the $L_x$'th element is $x_{L_x}$; the $(L_x+1)$'th element is $y_1$; the $(L_x+L_y)$'th element is $y_{L_y}$; the $(L_x+L_y+1)$'th element is $z_1$; and the last or $(L_x+L_y+L_z)$'th element is $z_{L_z}$. Let vector $x_i$, $i=0,1,2,\ldots,L_y-1$, be a vector of length $L_x$ constructed from the vector (x,y,z) such that the last element of $x_i$ is the $(L_x+i)$'th element of (x,y,z). Let $z_i$, $i=2,3,\ldots,L_y+1$, be a vector of length $L_z$ constructed from the vector (x,y,z) such that the first element of $z_i$ is the $(L_x+i)$'th element of (x,y,z). For example, $z_2=(y_2,y_3,\ldots)$, $z_3=(y_3,y_4,\ldots)$, and so on, and $z_{L_y+1}=z$. With this representation, the $L_y$ elements of $\hat{s}(x,y,z)$ can be approximated as: $\hat{s}(x_0,y_1,z_2), \hat{s}(x_1,y_2,z_3), \ldots, \hat{s}(x_{L_y-1},y_{L_y},z_{L_y+1})$. Note that $x_0=x$ and $z_{L_y+1}=z$. The approximation is accurate since the postcursor and precursor spans of the truncated ISI profile for calculating double-sided templates are at most $L_x$ and $L_z$, respectively. The reduction in the storage requirement if the scalar templates $\hat{s}(x,y,z)$ are stored instead of the vector templates $\hat{s}(x,y,z)$ is a factor of $M^{L_y-1}$.

The number of scalar templates $\hat{s}(x,y,z)$ and $\hat{q}(x,y)$ that need to be stored is $M^{L_x+1+L_z}$ and $M^{L_x+1}$, respectively. The number of templates is still substantial if M is moderately large. This may lead to a storage problem in some implementations. In one embodiment of the present invention the templates are pre-computed and preloaded into the data estimator. In another embodiment of the present invention, a template is computed when needed using truncated ISI profiles. The implementation choice may be based in part on the cost tradeoff of the hardware needed to store the pre-computed templates against the hardware/software needed to compute the templates. Usually, the storage of pre-computed templates is preferred if the alphabet size M is small, say, 2 or 4, and the ISI span is not too long. When the alphabet size is large or when the ISI span is long, it is more preferable to compute a template when it is needed. The storage of pre-computed templates is also more desirable for a non-linear modulation such as GMSK since the template computation is more involved than linear modulations.

Figure 16:
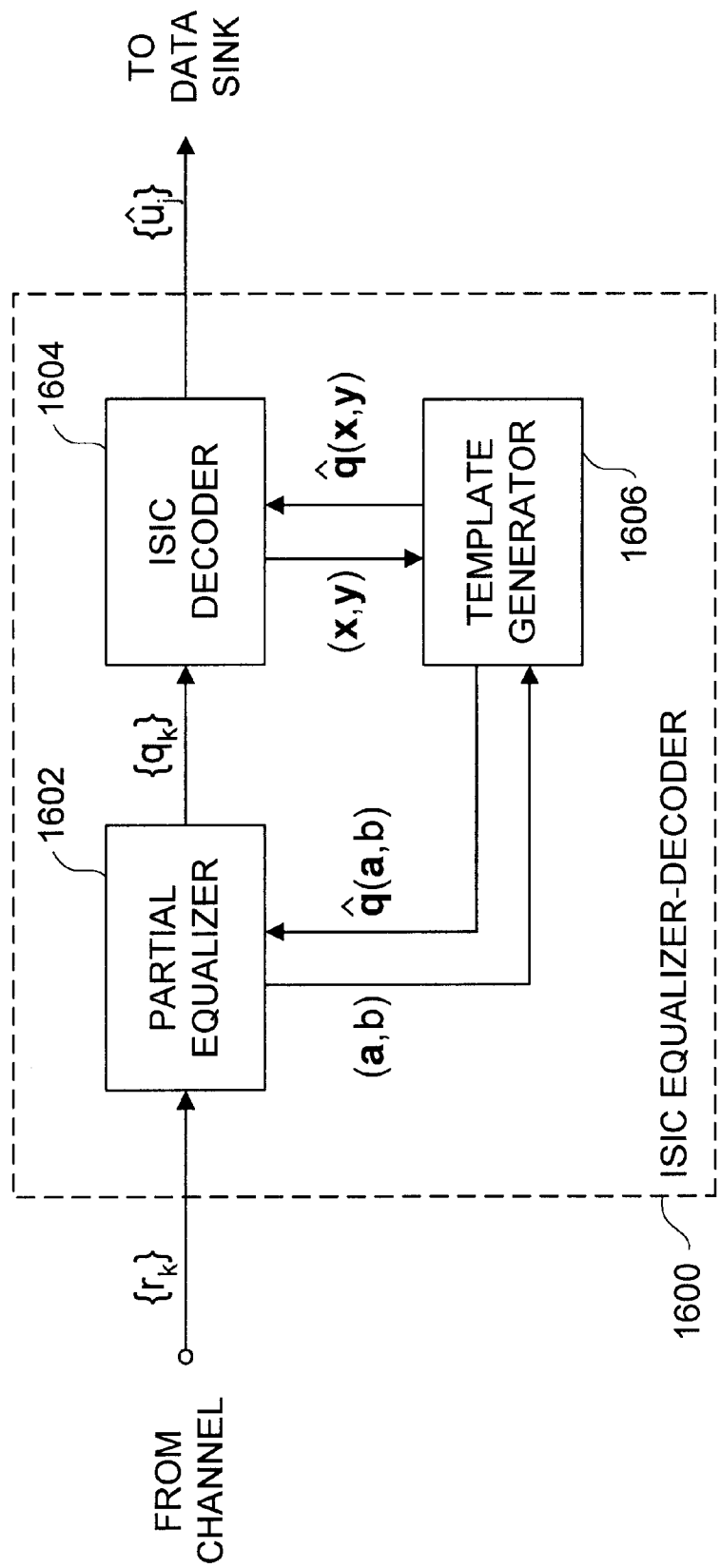
FIG. 16 shows a block diagram of an ISIC equalizer-decoder in one embodiment of the present invention comprising a partial equalizer, a template generator, and an ISIC decoder.

I will now describe how the templates are used in the present invention. FIG. 16 shows a block diagram of a data estimator in one embodiment of the present invention comprising ISIC equalizer-decoder 1600. The channel output sequence $\{r_k\}$ is supplied to partial equalizer 1602 to provide a partially equalized sequence $\{q_k\}$, which is supplied to ISIC decoder 1604 to provide an estimated data sequence $\{\hat{u}_j\}$, where $\hat{u}_j$ represents an estimate of $u_j$. Template generator 1606 supplies single-sided templates $\hat{q}(\cdot,\cdot)$ to partial equalizer 1602 and ISIC decoder 1604. Template generator 1606, after receiving the vector pair (x,y) from ISIC decoder 1604, supplies template $\hat{q}(x,y)$ to the ISIC decoder. Similarly, template generator 1606, after receiving the vector (a,b) from partial equalizer 1602, supplies template $\hat{q}(a,b)$ to the partial equalizer. The method with which ISIC decoder 1604 determines the vector pair (x,y) and how it uses the template $\hat{q}(x,y)$ and the method with which partial equalizer 1602 determines the vector (a,b) and how it uses the template $\hat{q}(a,b)$ are described later.

In one embodiment of the present invention the templates are pre-computed and preloaded into template generator 1606. In another embodiment of the present invention, a template is computed when needed from a set of coefficients representing a truncated ISI profile.

Partial equalizer 1602 removes substantially all of the precursor ISI from the channel output sequence $\{r_k\}$ so that its output sequence $\{q_k\}$ is substantially free of precursor ISI and leaves at least some of the postcursor ISI unequalized. Precursor equalizer 1402, which is a part of noiseless-channel-equalizer model 1408 discussed above, is a model of partial equalizer 1602. In contrast to partial equalizer 1602, a linear equalizer or a decision-feedback equalizer performs full equalization to remove both the precursor and postcursor ISI. By performing partial equalization instead of full equalization, the arrangement of the present invention reduces the amount of noise enhancement, thus achieving desirable result that the data estimation can be more reliable.

In one embodiment of the present invention, partial equalizer 1602 is implemented using a transversal filter and the equalizer tap weights are preloaded. These preloaded equalizer tap weights may be computed using the Wiener-Hopf equation and based on the estimated channel impulse response, as described above. More specifically, the pre-loaded equalizer tap weights may be determined in accordance with equation (45). This embodiment is preferred if the channel is substantially time invariant and that the estimated channel impulse response is substantially accurate.

In another embodiment of the present invention, partial equalizer 1602 adapts its equalizer tap weights. This embodiment is preferred if the channel is time varying or if an accurate estimate of the channel impulse response is unavailable a priori. In one embodiment of the present invention, the adaptation of the equalizer tap weights takes place during the reception of a training signal. The encoded symbols transmitted during the training portion of the signal are assumed known to partial equalizer 1602. Let $\{v_k\}^{TR}$ denote the training portion of the encoded sequence $\{v_k\}$. The training sequence $\{v_k\}^{TR}$ is known to the data estimator and a replica of the sequence is stored in partial equalizer 1602. Let the number of precursor and postcursor tap weights be $N_1$ and $N_2$, respectively. The numbers $N_1$ and $N_2$ are chosen to be sufficiently large to allow the partial equalizer to equalize the precursor ISI and selected postcursor ISI components. Let the tap weights be denoted as $w_i$, then the partial equalizer output for the k'th symbol interval is given by equation (2), which is rewritten in expanded form below:

$$q_k = w^*_{N_2} r_{k-N_2} + \ldots + w^*_1 r_{k-1} + w^*_0 r_k + w^*_{-1} r_{k+1} + \ldots + w^*_{-N_1} r_{k+N_1} \quad (50)$$

Let a be the vector of $L_x$ encoded symbols corresponding to the $L_x$ channel output samples immediately preceding $r_k$, i.e., $$a(v_{k-L_x}, v_{k-L_x+1}, \ldots, v_{k-1}). \quad (51)$$

Let b be the encoded symbol corresponding to channel output sample $r_k$, i.e., $$b = v_k. \quad (52)$$

Partial equalizer 1602 supplies the pair (a,b) to template generator 1606, which, as illustrated in FIG. 16, responds by supplying the template $\hat{q}(a,b)$ to the partial equalizer. The template $\hat{q}(a,b)$ is used by partial equalizer 1602 as the desired value of the equalizer output sample $q_k$ to calculate the error signal:

$$e_k = \hat{q}(a,b) - q_k. \quad (53)$$

The error signal is used to update the tap weights. An adaptation algorithm that can be used is the LMS algorithm described by equation (5).

Figure 17:
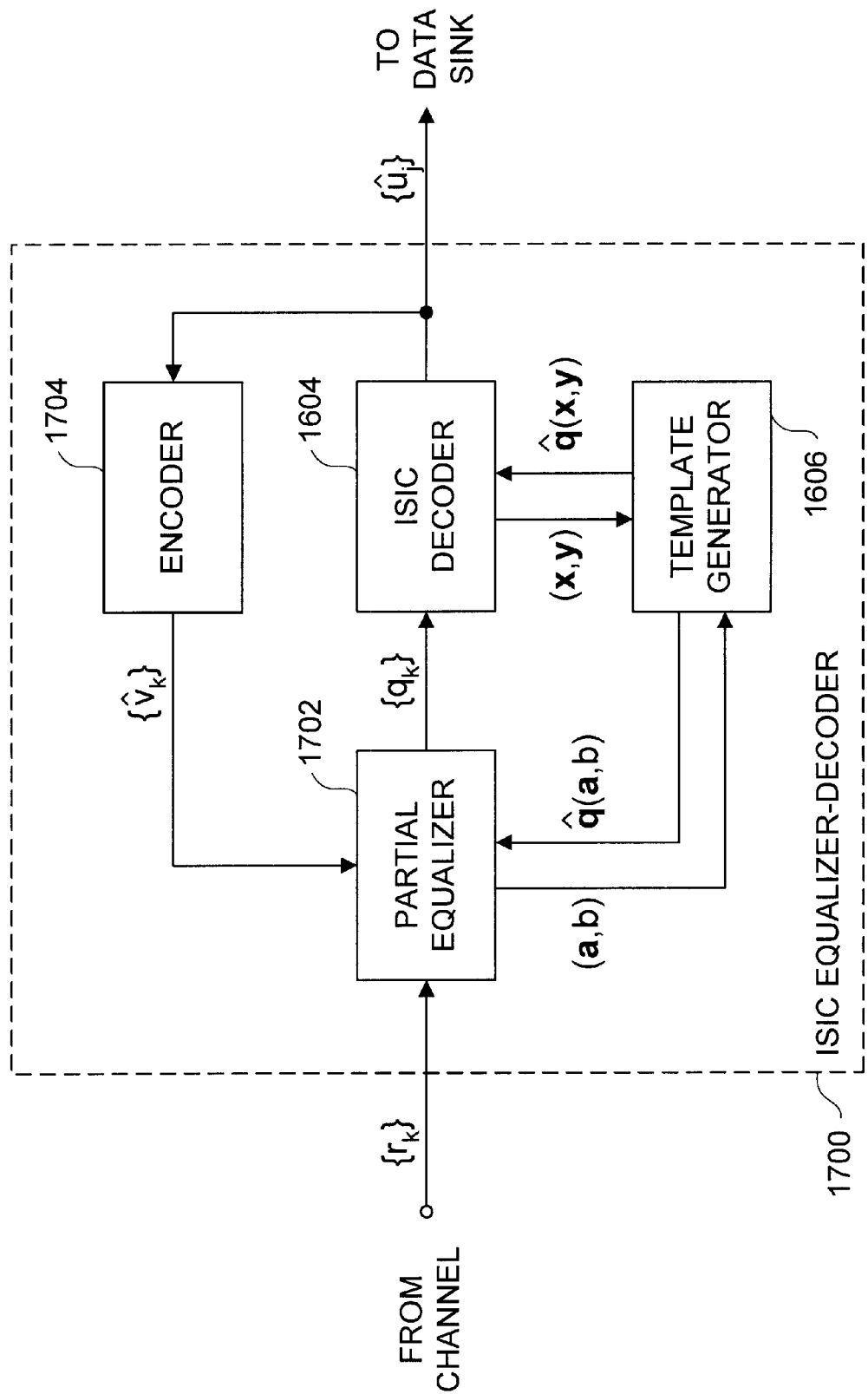
FIG. 17 shows a block diagram of an ISIC equalizer-decoder in another embodiment of the present invention where $\{\hat{v}_k\}$, an estimate of encoded sequence used by the partial equalizer for tap weight adaptation, is derived from the output sequence of the ISIC decoder.

In applications where the channel is time invariant (but with an unknown impulse response) or varying very slowly, the tap weights may be adapted only during the reception of the initial training signal and re-training signal inserted periodically into the data signal. In applications where it is unacceptable to send periodic re-training signals and tap weight adaptation is needed to track a slowly varying channel, the preferred embodiment of the present invention is to employ decision-directed adaptation using the estimated data sequence $\{\hat{u}_j\}$. FIG. 17 shows a data estimator comprising ISIC equalizer-decoder 1700, which employs decision-directed adaptation during data recovery based on the output of ISIC decoder 1604. During reception of training sequences, the adaptation of partial equalizer 1702 is identical to that of partial equalizer 1602. During data reception, partial equalizer 1702 employs decision-directed adaptation. The estimated data sequence $\{\hat{u}_j\}$ is supplied to encoder 1704 to provide the re-encoded sequence $\{\hat{v}_k\}$, which is an estimated of the encoded sequence $\{v_k\}$. Encoder 1704 performs the same steps as encoder 400. In other words, encoder 1704 and encoder 400 provide identical output sequences when supplied with identical input sequences. The re-encoded sequence $\{\hat{v}_k\}$ is supplied to partial equalizer 1702, which calculates the vector a and the scalar b of the arguments of the template $\hat{q}(a,b)$ according to $$a = (\hat{v}_{k-L_x}, \hat{v}_{k-L_x+1}, \ldots, \hat{v}_{k-1}) \quad (54)$$

and, $$b = \hat{v}_k. \quad (55)$$

The calculation of the error signal and the weight adaptation follow the same steps described above for adaptation during reception of training signals. When using decision-directed adaptation, partial equalizer 1702 includes a delay on the adaptation equal to the combined delay of ISIC decoder 1604 and encoder 1704.

The re-encoded sequence $\{\hat{v}_k\}$ is used by partial equalizer 1702 to adapt its tap weights but is not used to generate its output. Hence, the partial equalizer is a linear feedforward equalizer, not a decision feedback equalizer. Errors in the re-encoded sequence $\{\hat{v}_k\}$ can degrade the tap weight adaptation. However, the degradation can be reduced by slowing down the rate of adaptation, i.e., by using a smaller value for the time constant $\mu$ in equation (5). In contrast, a decision feedback equalizer cannot significantly reduce the effects of decision errors by decreasing the adaptation rate since the decisions are a part of the equalizer output. Therefore, the partial equalizers of the present invention do not suffer from error-propagation like that exhibited in decision feedback equalizers.

In applications such as mobile communications the channel may be varying too rapidly for the delay in adaptation introduced by ISIC decoder 1604 and encoder 1704 to be acceptable, it would be necessary either to send a re-training signal more frequently or to employ a means to generate the symbol estimate $\hat{v}_k$ with a reduced delay. In yet another embodiment of the present invention, a data estimator comprises ISIC equalizer-decoder 1800 shown in FIG. 18. ISIC equalizer-decoder 1800 includes full equalizer 1810 and slicer 1820. These two blocks are employed to generate symbol estimates with a reduced delay. Full equalizer 1810 removes both the precursor and postcursor ISI in the channel output sequence $\{r_k\}$. It is a linear equalizer and can be implemented using a transversal filter with a sufficient number of taps to cover the precursor and postcursor ISI spans. Full equalizer 1810 can also be implemented as a decision feedback equalizer. When implemented as a decision feedback equalizer, full equalizer 1810 will suffer from error propagation. However, the error propagation does not directly affect the data recovery since the output of the full equalizer is used only in adapting tap weights. The effects of the error propagation can be reduced by slowing down the rate of adaptation on full equalizer 1810 and partial equalizer 1802. Referring back to FIG. 18, slicer 1820 makes a symbol decision on each sample provided by full equalizer 1810 to provide the slicer-estimated sequence $\{\hat{v}_k\}$. Slicer 1820 employs maximum likelihood demodulation: the slicer output $\hat{v}_k$ is set to be the symbol from the alphabet $A_v$ of encoded symbols that is closest in Euclidean distance to the slicer input sample. Full equalizer 1810 and slicer 1820 are familiar to those skilled in the art. Note that I have chosen to use the same notation, $\{\hat{v}_k\}$, to denote the re-encoded sequence, which is the output of encoder 1704, and the slicer-estimated sequence, which is the output of slicer 1820. The choice seems logical since these sequences represent estimates of the encoded sequence $\{v_k\}$.

Figure 18:
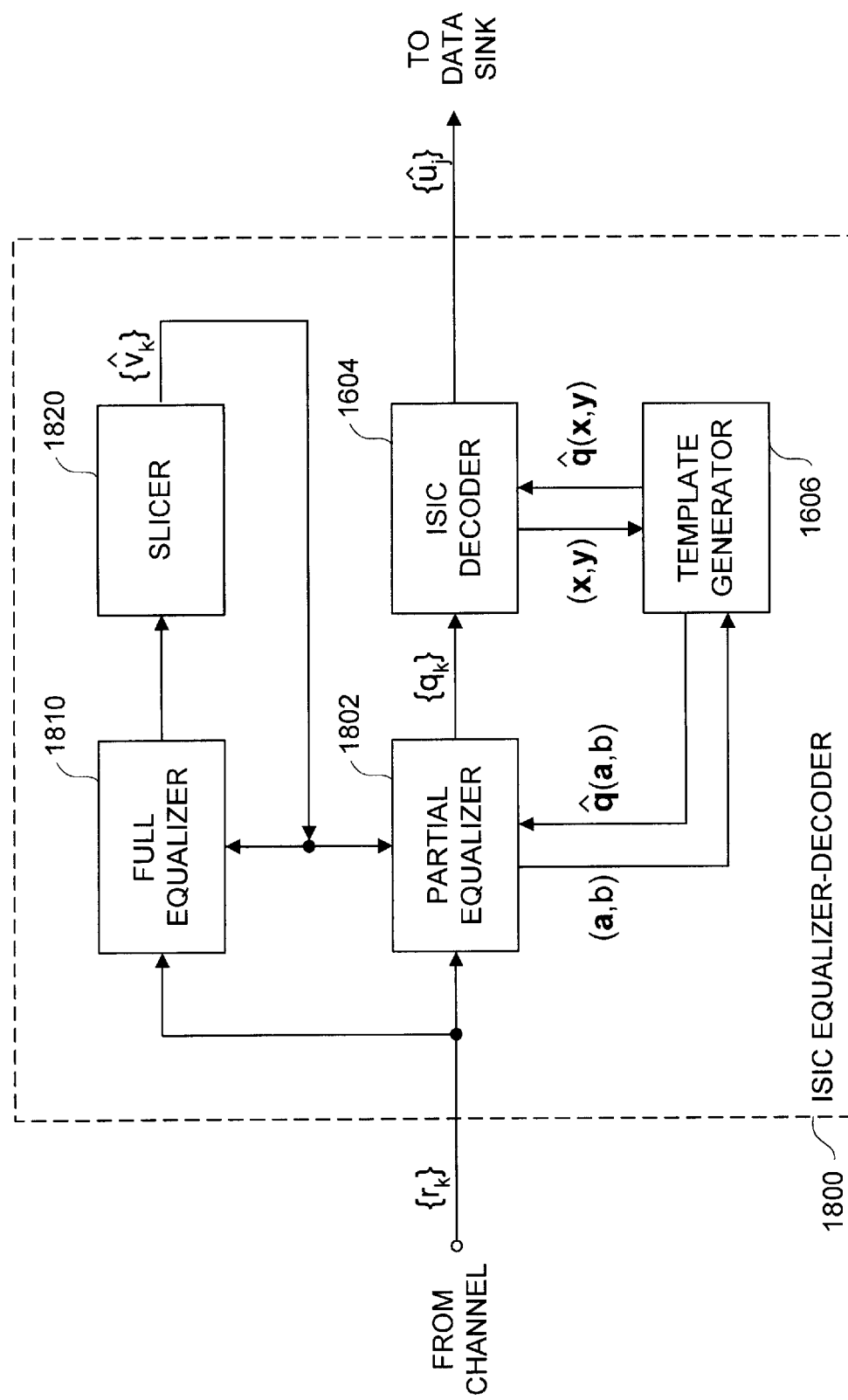
FIG. 18 shows a block diagram of an ISIC equalizer-decoder in yet another embodiment of the present invention where $\{\hat{v}_k\}$, an estimate of encoded sequence used by the partial equalizer for tap weight adaptation, is derived using a full equalizer and a slicer.

With reference to FIG. 18, the slicer-estimated sequence $\{\hat{v}_k\}$ is supplied to both full equalizer 1810 and partial equalizer 1802 for use in adapting the respective equalizer tap weights. For full equalizer 1810, the error signal is computed as $$e_k = \hat{v}_k - q_k. \quad (56)$$

For partial equalizer 1802, the adaptation is identical to that of partial equalizer 1602 during reception of training sequences. During data recovery, partial equalizer 1802 employs decision-directed adaptation. The error signal is computed according to equation (53) and the pair (a, b) needed to specify the arguments of the template $\hat{q}(a,b)$ is computed according to equations (54) and (55).

The three embodiments of the present invention for data estimator shown in FIGS. 16, 17, and 18, comprising ISIC equalizer-decoders 1600, 1700, and 1800, respectively, differ in the methods used to adapt the tap weights of partial equalizers 1602, 1702, and 1802. These three data estimators have the same the ISIC decoder, block 1604, and the same template generator, block 1606.

In this exemplary description of the present invention, the partial equalizer is assumed to operate at the rate of one sample per symbol. Such an equalizer is generally referred to as a symbol-spaced equalizer. Those skilled in the art should realize that the partial equalizer might employ fractional tap spacing. See the article: "Fractionally-Spaced Equalization: An Improved Digital Transversal Equalizer," by R. Gitlin and S. Weinstein, The Bell System Technical Journal, Vol. 60, No. 2, pp. 275–296, February 1981. For example, the equalizer taps may be spaced at one half of the symbol duration. In that case, the channel output sequence $\{r_k\}$ will be at twice the symbol rate so that there will be two channel output samples for each symbol interval and the samples are evenly spaced.

Figure 19:
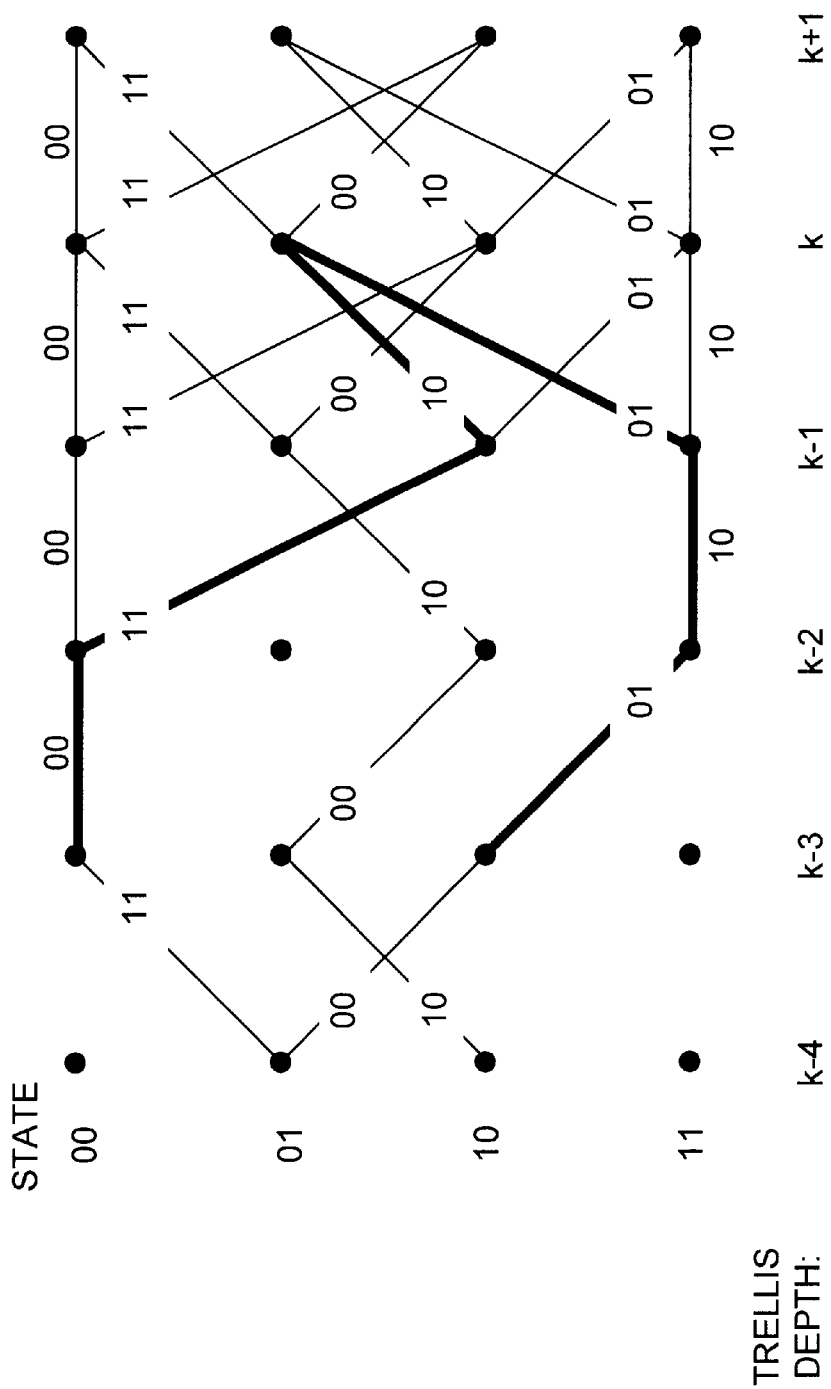
FIG. 19 is a decoding trellis, derived from FIG. 5, for a constraint length 3, rate 1/2 binary convolutional code, with the trellis branches labeled by encoder output bits.
Figure 20:
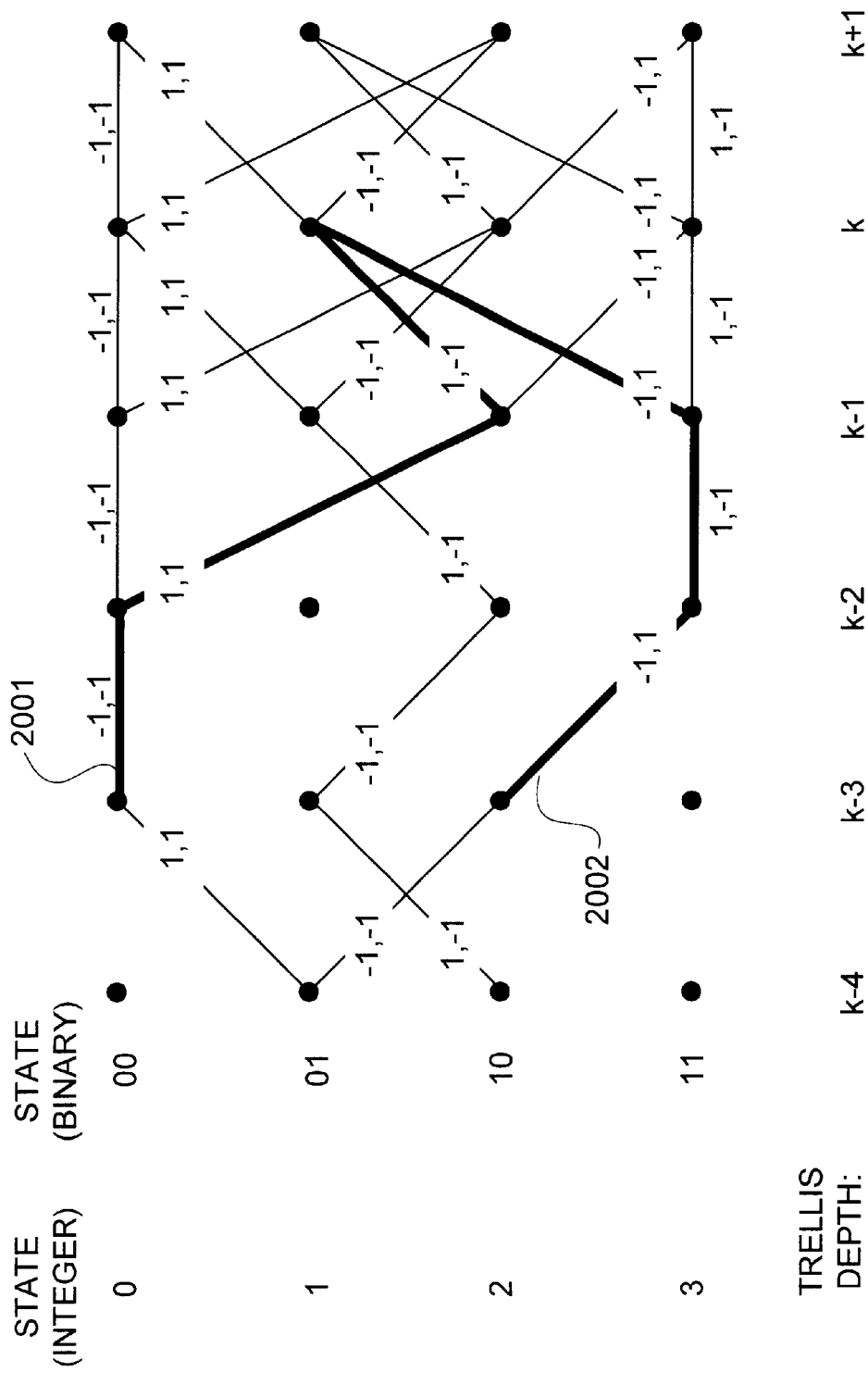
FIG. 20 is a decoding trellis for a constraint length 3, rate 1/2 binary convolutional code, with the branches labeled by the encoded symbols $v_k$ of the encoded sequence $\{v_k\}$.

I will now describe ISIC decoder 1604, which advantageously processes the partially equalized sequence $\{q_k\}$ to provide the estimated data sequence $\{\hat{u}_j\}$. The ISIC decoder simultaneously performs trellis decoding and compensation of the postcursor ISI. ISIC decoder 1604 has the same number of trellis states as a trellis decoder that those skilled in the art would normally use to decode an ISI-free trellis-encoded signal. In other words, the presence of ISI at the input to ISIC decoder 1604 has no effect on the required number of trellis states, which is uniquely determined by the trellis code used in trellis encoder 402. I will illustrate the ISIC decoding algorithm by using trellis diagrams for the constraint length 3, rate 1/2 code, whose encoding trellis is shown in FIG. 5. FIG. 19 is a decoding trellis derived from FIG. 5. For simplicity, the trellis branches in FIG. 19 show only the encoder output bits while suppressing the input bits. FIG. 20 is a decoding trellis derived from FIG. 19 with the branches labeled by the encoded symbols $v^{(1)}v^{(2)}$ at the output of mapper 404 instead of the encoded bits $c^{(1)}c^{(2)}$ at the output of trellis encoder 402. The mapping of trellis-encoded bit c to encoded symbol v used to derive FIG. 20 from FIG. 19 is antipodal mapping: set v=1 if c=1; and set v=−1 if c=0.

FIG. 20 shows that at trellis depth (k−1) there are four paths, known as survivor paths, one terminating at each of the four states. Associated with each survivor path is a path metric, $P_{k-1}(S)$, where S is an integer representing the state where the path terminates. A state with a binary representation of 10, for example, has an integer representation S=2. Both the binary and integer representations are shown in FIG. 20. At trellis depth k, the ISIC decoder must choose for each of the states a survivor path from the two paths converging at that state. Suppose S is the state for which a survivor path is to be selected at trellis depth k. The selection of the survivor path is performed according to these steps: (i) calculate the branch metrics $B_1(S)$ and $B_2(S)$ for the two branches terminating at state S; (ii) calculate the temporary path metrics $P_k^{(1)}(S)=P_{k-1}(S_1)+B_1(S)$ and $P_k^{(2)}(S)=P_{k-1}(S_2)+B_2(S)$, where $S_1$ and $S_2$ are the states where the paths terminate at trellis depth (k−1); (iii) select path 1 as the survivor path if $P_k^{(1)}(S)<P_k^{(2)}(S)$ and set $P_k(S)=P_k^{(1)}(S)$; otherwise select path 2 as the survivor path and set $P_k(S)=P_k^{(2)}(S)$. For paths 2001 and 2002, shown in FIG. 20 with some branches darkened, the state under discussion at trellis depth k is S=1; the state at trellis depth (k−1) is $S_1$=2 for path 2001 and $S_2$=3 for path 2002.

The length of each survivor path is $D_M$ branches. As is well known to those skilled in the art, $D_M$ is usually set to be four or five times the constraint length of the trellis code. Each survivor path keeps track of the path metric and the $L_x$ encoded symbols associated with the past branches. In addition, associated with each survivor path is the information that identifies the data bit or bits for each branch of the survivor path. After a survivor path has been selected for each of the trellis states at trellis depth k, ISIC decoder 1604 identifies the path with the smallest path metric, and adds the data bits corresponding oldest branch of the smallest-path-metric path to the estimated data sequence $\{\hat{u}_j\}$. The data bit information associated with the old branch of each survivor path is then discarded and the data bit information is advantageously updated with the data bit information for the newest branch of each survivor path. ISIC decoder 1604 is now ready to perform the processing to advance from trellis depth k to trellis depth (k+1).

According to one embodiment of the present invention, ISIC decoder 1604 computes the branch metrics using the single-sided templates $\hat{q}(\bullet,\bullet)$. In describing a decoding trellis at trellis depth k, it is customary to refer to the branches terminating at the states at trellis depth k as the current branches and those terminating at the states at trellis depths (k−1), (k−2), and so on as past branches. The vector y of the vector argument of the single-sided template $\hat{q}(x,y)$ is the vector of encoded symbols associated with the current branch and the vector x is the vector of the symbols associated with the past branches connected to that particular current branch. If the trellis code is a rate $n_u/n_c$ binary convolutional code, the vector y has a length $L_y = n_c$, since each branch has $n_c$ encoded symbols, and $y=(v^{(1)},v(2),\ldots,v^{(n_c)})$. If the trellis code is a TCM code, each branch has one encoded symbol, hence the vector y has a length of one, i.e., it is a scalar. The length of the vector x could be any integer value $L_x$ but the preferred embodiment is to set $L_x$, which defines the span of the postcursor ISI in the truncated ISI profile, to be sufficiently large such that the significant postcursor ISI components of the channel are not truncated. A length smaller than the postcursor ISI span of the channel can be used for $L_x$ but this would lead to the truncation of some significant postcursor ISI components of the channel and result in reduced data estimation reliability. For the exemplary trellis shown in FIG. 20, the branches corresponding to the vector pair (x,y) are shown darkened for paths 2001 and 2002. In this example, the length of the vector x is set to be four encoded symbols. For path 2001, $x=x_1=(-1,-1,1,1)$ and $y=y_1(1,-1)$; and for path 2002, $x=x_2=(-1,1,1,-1)$ and $y=y_2=(-1,1)$. Let the vector q denote the output of the partially equalized sequence $\{q_k\}$ for the transition from trellis depth (k−1) to trellis depth k. The branch metric is equal the squared Euclidean distance between $\hat{q}(x,y)$ and q:

$$B=|\hat{q}(x,y)-q|^2. \quad (57)$$

Suppose $\hat{q}(x,y)-q=d=(d_1,d_2,\ldots,d_{L_y})$ then $B=|d|^2=|d_1|^2+|d_2|^2+\ldots+|d_{L_y}|^2$. For the example shown in FIG. 20, the branch metrics are:

$$B_1(S)=|\hat{q}(x_1,y_1)-q|^2 \quad (58)$$

and, $$B_2(S)=|\hat{q}(x_2,y_2)-q|^2. \quad (58)$$

Those skilled in the art should recognize that the above-described ISIC decoding algorithm is the same as the classical Viterbi algorithm for decoding a trellis-encoded signal with the exception that the branch metric is computed differently for the present invention. Those skilled in the art should also realize that an approximation to the branch metric might be used to reduce the implementation complexity, possibly at the expense of degraded data estimation. For example, the branch metric $B=|d_1|+|d_2|+\ldots+|d_{L_y}|$ may be used, where the vector $(d_1,d_2,\ldots,d_{L_y})=d=\hat{q}(x,y)-q$. This branch metric does not require a squaring operation and is therefore simpler to implement than the squared Euclidean distance metric.

The three embodiments of the present invention for ISIC equalizer-decoders shown in FIGS. 16, 17, and 18, as blocks 1600, 1700, and 1800, respectively, employ a set of fixed single-sided templates $\hat{q}(\bullet,\bullet)$. Due to the time-varying behavior of some channels or inaccurate channel modeling, the actual channel impulse response can be different from the truncated ISI profile used to compute the templates $\hat{q}(\bullet,\bullet)$. In that case, partial equalizers 1602, 1702, and 1802 will remove the residual postcursor ISI not accounted for by $\hat{q}(\bullet,\bullet)$. This could lead to a substantial increase in noise enhancement if the residual postcursor ISI that the partial equalizer has to remove is substantial. In that case, an improvement in data estimation reliability can be realized if the templates $\hat{q}(\bullet,\bullet)$ are advantageously updated to include the residual postcursor ISI. In order to update the templates, it is necessary to estimate the ISI profile of the channel.

Figure 21:
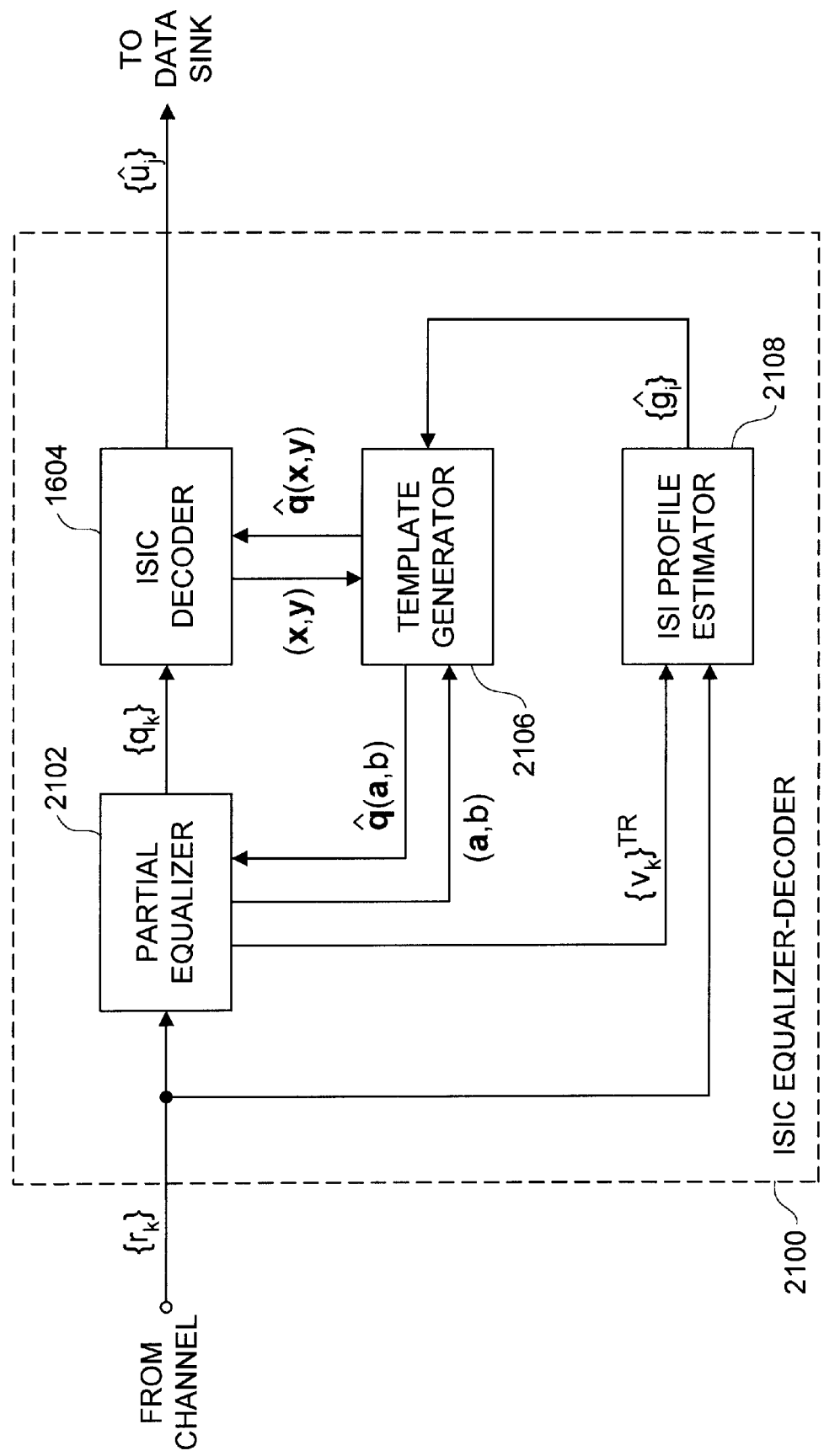
FIG. 21 shows a block diagram of an ISIC equalizer-decoder in one embodiment of the present invention where an ISI profile estimator is employed and, for adaptation, the ISI profile estimator makes use of a replica of the training sequence $\{v_k\}^{TR}$.

FIG. 21 shows a block diagram of ISIC equalizer-decoder 2100 in one embodiment of the present invention. ISIC equalizer-decoder 2100 differs from ISIC equalizer-decoder 1600 in the following manner: (i) template generator 2106 has the capability to update the templates while template generator 1606 does not; (ii) there is an additional block: ISI profile estimator 2108; and (iii) partial equalizer 2102 supplies to ISI profile estimator 2108 a sequence $\{v_k\}^{TR}$, which is a replica of the training portion of encoded sequence $\{v_k\}$, while partial equalizer 1602 does not provide $\{v_k\}^{TR}$ as an output. ISI profile estimator 2108 is used to estimate the ISI profile of the channel. With reference to FIG. 21, the estimated ISI profile is specified by the sequence of coefficients $\{\hat{g}_i\}$, which is supplied to template generator 2106.

In one exemplary embodiment of the present invention, ISI profile estimator 2108 employs a transversal filter with $N_x$ postcursor taps and $N_z$ precursor taps for a total of $(N_x+N_z+1)$ taps. The parameters $N_x$ and $N_z$ are set equal to the expected spans of the postcursor and precursor ISI, respectively. The tap weights of the transversal filter are $\{\hat{g}_i\}$, $i=-N_z,\ldots,0,\ldots,N_x$. As stated above, the tap weights $\{\hat{g}_i\}$ are the estimates of the ISI profile and supplied to template generator 2106 by ISI profile estimator 2108. The estimation technique employed by ISI profile estimator 2108 is similar to the channel estimation algorithm described in the book: *Digital Communications*, by J. Proakis, McGraw-Hill, 1983, pp. 410–412.

The estimator input sequence $\{\tilde{s}_k\}$ for the transversal filter's tapped delay line is set to be the replica of the training portion of encoded sequence $\{v_k\}$ provided by partial equalizer 1602, i.e., $\tilde{s}_k = v_k$. ISI profile estimator 2108 multiplies the estimator input symbols $\{\tilde{s}_k\}$ by the estimator tap weights $\{\hat{g}_i\}$ and adds the resulting products to provide an estimated channel output sample:

$$\tilde{r}_k = \sum_{i=-N_z}^{N_x} \hat{g}_i \tilde{s}_{k-i} \quad (60)$$

ISI profile estimator 2108 computes an error signal by subtracting the estimated channel output sample $\tilde{r}_k$ from the channel output sample $r_k$:

$$\tilde{e}_k = r_k - \tilde{r}_k. \tag{61}$$

The error signal is used to update the tap weights. Let the $(N_x+N_z+1)$-by-one column vector $\hat{g}=(\hat{g}_{-N_z},\ldots,\hat{g}_0,\ldots,\hat{g}_{N_x})^T$ be the tap weight vector and denote the tap weight vector at time k as $\hat{g}_k$. A similar notation is used for the vector of estimator input symbols: $\tilde{s}_k=(\tilde{s}_{k+N_z},\ldots,\tilde{s}_k,\ldots,\tilde{s}_{k-N_x})^T$. Note that the vector $\tilde{s}_k$ has the elements written in the reverse time order, with the newest sample listed first. With this representation, the estimated channel output sample can be written as $$\tilde{r}_k \hat{g}_k^T \tilde{s}_k. \tag{62}$$

The tap weight vector $\tilde{g}_{k+1}$ for use in the next symbol interval to process estimator input sequence $\{\tilde{s}_k\}$ is computed from the current tap weight vector $\hat{g}_k$ according to $$\hat{g}_{k+1} = \hat{g}_k + \beta \tilde{s}_k \cdot \tilde{e}_k \tag{63}$$

where β is an adaptation time constant that controls the rate of adaptation, chosen to work with the expected rate of change of the channel.

ISI profile estimator 2108 supplies the tap weights $\{\hat{g}_i\}$ as the estimated ISI profile to template generator 2106 for use in updating the templates. Template generator 2106 uses the estimated ISI profile as the channel estimate $\{\hat{h}_i\}$, i.e., $\hat{h}_i = \hat{g}_i$, which is truncated according to equation (42) to provide the truncated ISI profile $\{\tilde{h}_i\}$ for use in generating updated single-sided templates.

Updating the templates can be computationally demanding. If the channel varies slowly, it is not necessary to update the templates every symbol period. In one embodiment of the present invention, template generator 2106 computes the difference between the estimated ISI profile $\{\hat{g}_i\}$ and the current channel estimate $\{\hat{h}_i\}$ and compares the difference to two preset thresholds to determine if it is necessary to update the templates. An update of the templates is determined to be necessary if one or both of the following conditions are met:

$$|\hat{h}_0 - \hat{g}_0|^2 > \lambda_0 \tag{64}$$

$$\left[\sum_{i=-N_z}^{-1} |\hat{h}_i - \hat{g}_i|^2 + \sum_{i=1}^{N_x} |\hat{h}_i - \hat{g}_i|^2\right] > \lambda_1 \tag{65}$$

where $\lambda_0$ and $\lambda_1$ are two preset thresholds. The first condition states that the tap weight $\hat{g}_0$ deviates more than the allowed amount $\lambda_0$ from the current estimate of the channel gain on the desired signal. The second condition states that the residual ISI components have a total power exceeding the allowed amount $\lambda_1$. If template generator 2106 has determined that an update of the templates is necessary, it proceeds to perform the update.

Figure 22:
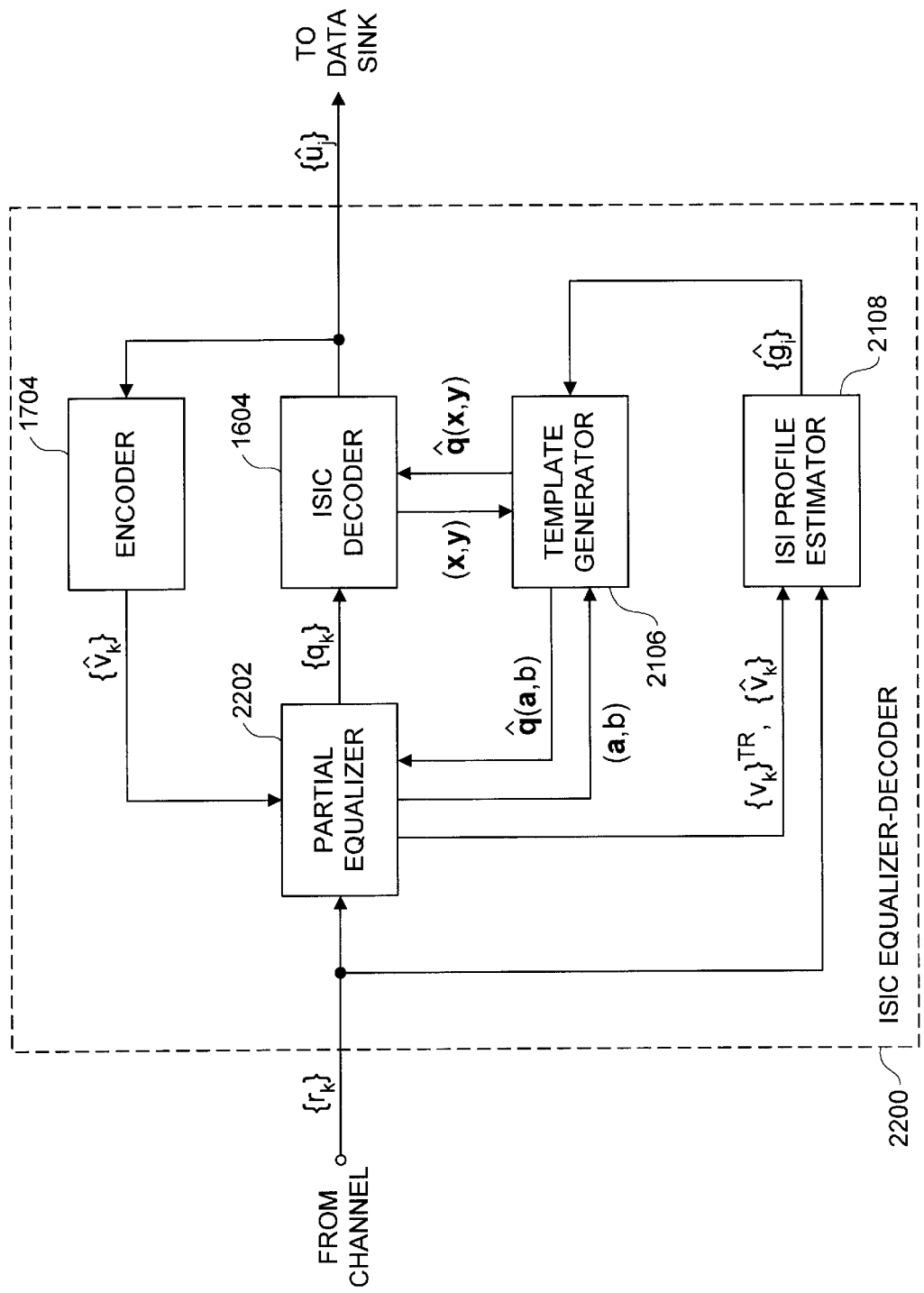
FIG. 22 shows a block diagram of an ISIC equalizer-decoder in another embodiment of the present invention where the ISI profile estimator, for adaptation, makes use of a replica of the training sequence $\{v_k\}^{TR}$ and an estimate $\{\hat{v}_k\}$ derived from the output sequence of the ISIC decoder.

FIG. 22 shows a block diagram of ISIC equalizer-decoder 2200 in one embodiment of the present invention. ISIC equalizer-decoder 2200 differs from ISIC equalizer-decoder 2100 in that the former employs decision-directed ISI profile estimation as well as estimation based on known training signals whereas the latter employs only estimation based on known training signals. ISIC equalizer-decoder 2200 uses the same arrangement as ISIC equalizer-decoder 1700 for obtaining the re-encoded sequence $\{\hat{v}_k\}$. Partial equalizer 2202 supplies to ISI profile estimator 2108 the sequence $\{v_k\}^{TR}$, a replica of the training portion of the encoded sequence $\{v_k\}$, during reception of the training signals and the estimated encoded sequence $\{\hat{v}_k\}$ during data reception. During reception of the training signals, ISIC equalizer-decoder 2200 operates in the same way as ISIC equalizer-decoder 2100. Specifically, ISIC equalizer-decoder 2200 sets the estimator input sequence $\{\tilde{s}_k\}$ to be the replica of the training portion of encoded sequence $\{v_k\}$, i.e., $\tilde{s}_k = v_k$. During reception of data signals, ISIC equalizer-decoder 2200 sets the estimator input sequence $\{\tilde{s}_k\}$ to be the re-encoded sequence $\{\hat{v}_k\}$ i.e., $\tilde{s}_k = \hat{v}_k$.

Figure 23:
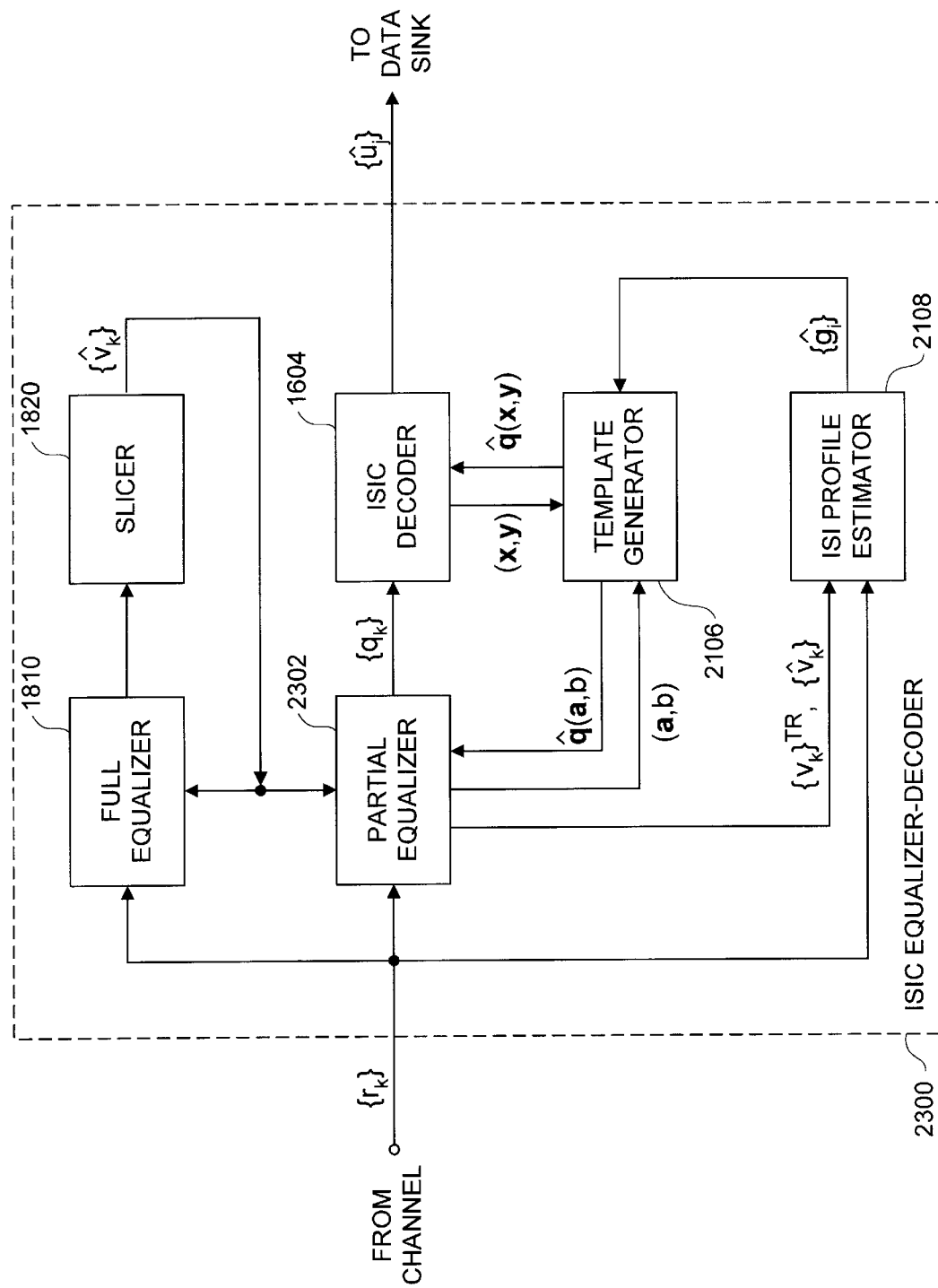
FIG. 23 shows a block diagram of an ISIC equalizer-decoder in yet another embodiment of the present invention where the ISI profile estimator, for adaptation, makes use of a replica of the training sequence $\{v_k\}^{TR}$ and an estimate $\{\hat{v}_k\}$ derived using a full equalizer and a slicer.

ISIC equalizer-decoder 2100 is the preferred embodiment for applications where the channel's impulse response is varying very slowly so that the tap weights may be adapted only during the reception of the initial training signal and re-training signal inserted periodically into the data signal. In applications where it is unacceptable to send periodic re-training signals and tap weight adaptation is needed to track a slowly varying channel, the preferred embodiment of the present invention is ISIC equalizer-decoder 2200. In applications such as mobile communications, the channel may be varying too rapidly for the delay introduced by ISIC decoder 1604 and encoder 1704 to be acceptable, the preferred embodiment of the present invention is ISIC equalizer-decoder 2300 shown in FIG. 23. ISIC equalizer-decoder 2300 includes full equalizer 1810 and slicer 1820 to derive the slicer-estimated sequence $\{\hat{v}_k\}$ at a reduced delay in an arrangement identical to that used by ISIC equalizer-decoder 1800. ISIC equalizer-decoder 2300 differs from ISIC equalizer-decoder 2200 in the method for generating the sequence $\{\hat{v}_k\}$ and that partial equalizer 2302 has an interface with slicer 1820 while partial equalizer 2202 has an interface with encoder 1704.

Table 2 summarizes the exemplary ISIC equalizer-decoder embodiments of the present invention to illustrate the similarities and differences in the partial equalizer adaptation, ISI profile estimation, and template updating among the embodiments.

TABLE 2

Summary of the ISIC equalizer-decoder embodiments of the present invention

| Block | Partial Equalizer Adaptation | ISI Profile Estimation | Template Updating |
|---|---|---|---|
| 1600 | Based on training sequence only. | None | None |
| 1700 | Based on training sequence and re-encoded sequence. | None | None |
| 1800 | Based on training sequence and slicer-estimated sequence. | None | None |
| 2100 | Based on training sequence only. | Based on training sequence only. | Yes |
| 2200 | Based on training sequence and re-encoded sequence. | Based on training sequence and re-encoded sequence. | Yes |
| 2300 | Based on training sequence and slicer-estimated sequence. | Based on training sequence and slicer-estimated sequence. | Yes |

FIG. 24 shows ISIC equalizer-decoder 2400 that will be used in the embodiments of the present invention to be described next. ISIC equalizer-decoder 2400 is one of the six ISIC equalizer-decoder embodiments described above: block 1600 of FIG. 16, block 1700 of FIG. 17, block 1800 of FIG. 18, block 2100 of FIG. 21, block 2200 of FIG. 22, and block 2300 of FIG. 23. In the embodiments of the present invention to be described next, the template generator will supply both the single-sided templates $\hat{q}(\cdot,\cdot)$ and the double-sided templates $\hat{s}(\cdot,\cdot,\cdot)$. When used with these embodiments, template generators 1606 and 2106 will be able to provide both types of templates as needed. The inputs and outputs of ISIC equalizer-decoder 2400 are shown in FIG. 24. The vectors (a,b,c), (x,y,z), and (x,y) are inputs to template generators 1606 and 2106, which respond with the templates $\hat{s}(a,b,c)$, $\hat{s}(x,y,z)$, and $\hat{q}(x,y)$. The sequence $\{r_k\}$ is the channel output sequence described previously. The sequence $\{\hat{U}_j\}$ is the output sequence $\{\hat{u}_j\}$ of ISIC decoder 1604 renamed to signify that the estimated-data-sequence output of ISIC equalizer-decoder 2400 will not be supplied directly to the data sink. The training sequence $\{v_k\}^{TR}$ is an output of partial equalizers 1602, 1702, 1802, 2102, 2202, or 2302 and the estimated sequence $\{\hat{v}_k\}$ is another output of partial equalizers 1702, 1802, 2202, or 2302.

FIG. 25 shows a block diagram of one embodiment of a data estimator of the present invention. The sequence $\{\hat{U}_j\}$ represents the output sequence of ISIC decoder 1604, which is a block within ISIC equalizer-decoder 2400. For the arrangement shown in FIG. 25, the sequence $\{\hat{U}_j\}$ will be referred to as a sequence of interim data decisions to signify that $\hat{U}_j$ will be used as a tentative data estimate. The sequence of interim data decisions $\{\hat{U}_j\}$ is supplied to decision-directed (DD) ISIC decoder 2514 as an aid to the decoding. Double-sided partial equalizer 2512 advantageously processes the channel output sequence $\{r_k\}$ to provide a double-sided-partially-equalized sequence $\{Q_k\}$. In one embodiment of the present invention, double-sided partial equalizer 2512 is a transversal filter configured to equalize only some of the ISI, leaving the rest of the precursor and postcursor ISI unequalized. In particular, double-sided partial equalizer 2512 removes only the ISI components of the channel not accounted for by the templates $\hat{s}(\bullet,\bullet,\bullet)$. These are the ISI components that have been set to zero in computing the truncated ISI profile. Let the number of precursor and postcursor equalizer taps of double-sided partial equalizer 2512 be $M_1$ and $M_2$, respectively. The parameters $M_1$ and $M_2$ are chosen to be sufficiently large to enable the double-sided equalizer to remove the ISI components not accounted for by the templates $\hat{s}(\bullet,\bullet,\bullet)$. Let the equalizer tap weights be represented by the vector $W=(W_{-M_1}, \ldots, W_0, \ldots, W_{M_2})^T$, which has $(M_1+M_2+1)$ elements. Denote the tap weight vector at time k as $W_k$. A similar notation is used on the equalizer input, thus $r_k=(r_{k+M_1}, \ldots, r_k, \ldots, r_{k-M_2})^T$. With this representation, the output of double-sided partial equalizer 2512 can be written as $$Q_k = W_k^H r_k. \quad (66)$$

Like the partial equalizer, the double-sided partial equalizer may have fixed or adaptive tap weights. The choice depends on the time-varying characteristics of the channel, as discussed above. To adapt the equalizer tap weights, double-sided partial equalizer 2512 computes the vector (a,b,c) for each symbol interval. During reception of the training symbols, double-sided partial equalizer 2512 computes the vector a and the scalar b according to equations (51) and (52), respectively, and computes the vector c according to $$c=(v_{k+1}, v_{k+2}, \ldots, v_{k+L_2}). \quad (67)$$

During data reception, double-sided partial equalizer 2512 computes the vector a and the scalar b according to equations (54) and (55), respectively, and the vector c according to $$c=(\hat{v}_{k+1}, \hat{v}_{k+2}, \ldots, v_{k+L_2}). \quad (68)$$

The vector (a,b,c) is supplied to ISIC equalizer-decoder 2400, which returns with the template $\hat{s}(a,b,c)$. In the next step, double-sided partial equalizer 2512 computes an error signal according to $$e_k = \hat{s}(a,b,c) - Q_k. \quad (69)$$

The error signal is used to update the tap weights. An adaptation algorithm that can be used is the LMS algorithm:

$$W_{k+1} = W_k + \alpha r_k e^*_k \quad (70)$$

where $\alpha$ is an adaptation time constant. Note that if the templates $\hat{s}(\bullet,\bullet,\bullet)$ perfectly account for the all of the ISI profile of the channel, the equalizer tap weights will converge to $W_0=1$ and $W_i=0$ for $i\neq 0$. If the channel has an impulse response that differs from the truncated ISI profile used to compute the templates, some or all of the $W_i$ for $i\neq 0$ will be non-zero. Since double-sided partial equalizer 2512 removes only the ISI components not accounted for by the templates $\hat{s}(\bullet,\bullet,\bullet)$, the noise enhancement introduced by the equalizer is smaller than that introduced by the partial equalizer of ISIC equalizer-decoder 2400. In other words, the amount of equalizer-added noise in the double-sided-partially-equalized sequence $\{Q_k\}$ is smaller than that in the single-sided-partially-equalized sequence $\{q_k\}$. For this reason, it is expected that the data sequence estimated by decoding the sequence $\{Q_k\}$ should be more reliable than that estimated by decoding $\{q_k\}$. With reference to FIG. 25, it is expected that $\{\hat{u}_j\}$, the data sequence estimated by DD-ISIC decoder 2514, is more reliable than $\{\hat{U}_j\}$, the data sequence estimated by ISIC decoder 1604 within ISIC equalizer-decoder 2400. My computer simulation results have confirmed this hypothesis.

DD-ISIC decoder 2514 simultaneously decodes the trellis-encoded signal and removes the precursor and postcursor ISI. Like ISIC decoder 1604, DD-ISIC decoder 2514 has the same number of decoder states as a trellis decoder that those skilled in the art would normally use to decode an ISI-free trellis-encoded signal. In other words, the presence of precursor and postcursor ISI at the input the DD-ISIC decoder 2514 has no effect on the required number of trellis states, which is uniquely determined by the trellis code used in trellis encoder 402. DD-ISIC decoder 2514 makes uses of the double-sided templates $\hat{s}(\bullet,\bullet,\bullet)$. In contrast, ISIC decoder 1604 uses the single-sided templates $\hat{q}(\bullet,\bullet)$. DD-ISIC decoder 2514 calculates the vector arguments x and y using the same method used by ISIC decoder 1604, and calculates the vector argument z by using the sequence of interim data decisions $\{\hat{U}_j\}$ supplied by ISIC equalizer-decoder 2400.

Figure 26:
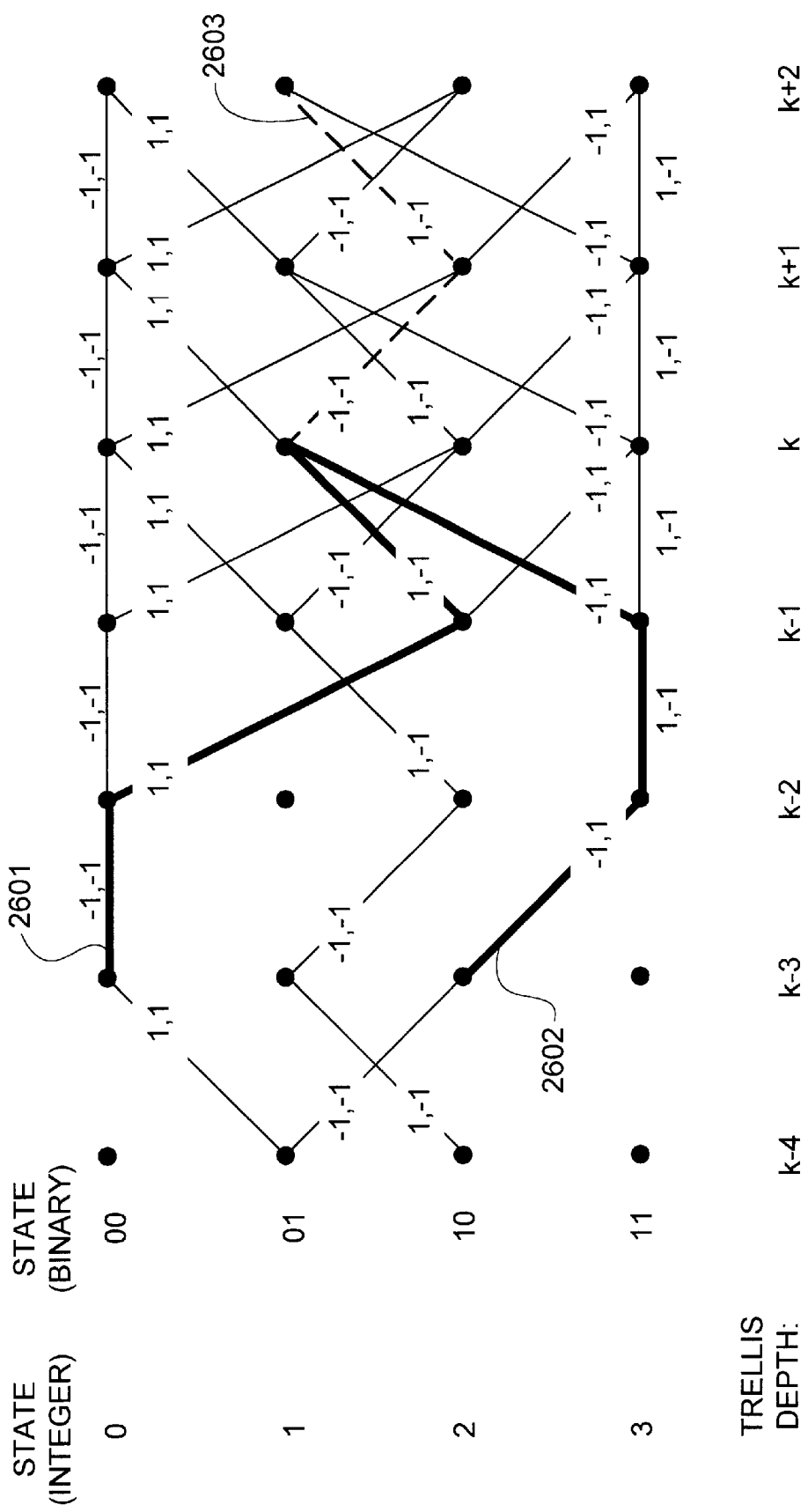
FIG. 26 shows a decoding trellis for a constraint length 3, rate 1/2 binary convolutional code used to explain the operation of the DD-ISIC decoding algorithm.

I will illustrate the DD-ISIC decoding algorithm by using trellis diagrams for the constraint length 3, rate 1/2 code, whose encoding trellis is shown in FIG. 5. FIG. 26 is a decoding trellis showing four survivor paths at trellis depth (k−1), one terminating at each of the four states. Associated with each survivor path is a path metric. Let $P_{k-1}(S)$, where S is an integer representing the state where the path terminates. At trellis depth k, DD-ISIC decoder 2514 must choose for each of the states a survivor path from the two paths converging at that state. Suppose S is the state for which a survivor path is to be selected at trellis depth k. The selection of survivor path is performed according to these steps: (i) calculate the branch metrics $B_1(S)$ and $B_2(S)$ for the two branches terminating at state S; (ii) calculate the temporary path metrics $P_k^{(1)}(S)=P_{k-1}(S_1)+B_1(S)$ and $P_k^{(2)}(S)=P_{k-1}(S_2)+B_2(S)$, where $S_1$ and $S_2$ are the termination states of the paths at trellis depth (k−1); (iii) select path 1 as the survivor path if $P_k^{(1)}(S)<P_k^{(2)}(S)$ and set $P_k(S)=P_k^{(1)}(S)$; otherwise select path 2 as the survivor path and set $P_k(S)=P_k^{(2)}(S)$. For paths 2601 and 2602, shown in FIG. 26 with some branches darkened, the state under discussion at trellis depth k is S=1 and the state at trellis depth (k−1) is $S_1=2$ for path 2601 and $S_2=3$ for path 2602. The algorithm is similar to that for ISIC decoder 1604. The difference is the method used to calculate the branch metrics $B_1(S)$ and $B_2(S)$.

According to one embodiment of the present invention, DD-ISIC decoder 2514 computes the branch metrics using the double-sided templates ŝ(x,y,z). For the vector argument (x,y,z), the vector x, of length $L_x$, is the vector of encoded symbols associated with the past branches, the vector y, of length $L_y$, is the vector of encoded symbols associated with the current branch, and the vector z, of length $L_z$, is the vector of encoded symbols associated with the future branches. Here, a future branch is a branch in the trellis extending beyond the current trellis depth. For the example shown in FIG. 26, $L_x=L_z=4$. Since the decoder is for a rate 1/2 binary convolutional code, $L_y=2$. The vectors x and y are computed using the same method as used by ISIC decoder 1604. For path 2601 in FIG. 26, x=$x_1$=(−1,−1,1,1) and y=$y_1$=(1,−1); and for path 2602, x=$x_2$=(−1,1,1,−1) and y=$y_2$=(−1,1). The vector z is calculated based on the interim data decisions {$Û_j$}. DD-ISIC decoder 2514 assumes that {$Û_j$} is identical to the data sequence {$u_j$}. For the example shown in FIG. 26, it is assumed that $Û_{k+1}=1$ and $Û_{k+2}=0$. An input bit of 1 for the (k+1)'th bit interval, i.e., $Û_{k+1}=1$, takes the decoding trellis from state 1 at trellis depth k to state 2 at trellis depth (k+1), and an input bit of 0 for the (k+2)'th bit interval, i.e., $Û_{k+2}=0$, takes the state back to state 1 at trellis depth (k+2). This path segment, labeled 2603, is shown in the figure as two dashed lines. The output symbols for path segment 2603 is z=(−1,−1,1,−1). DD-ISIC decoder 2514 supplies the vectors arguments ($x_1,y_1,z$) and ($x_2,y_2,z$) to ISIC equalizer-decoder 2400, which returns the templates ŝ($x_1,y_1,z$) and ŝ($x_2,y_2,z$). These templates are used by DD-ISIC decoder 2514 to compute the branch metrics for paths 2601 and 2602 according to $$B_1(S)=|ŝ(x_1,y_1,z)-Q|^2 \quad (71)$$

and, $$B_2(S)=|ŝ(x_2,y_2,z)-Q|^2 \quad (72)$$

where Q is the vector of double-sided-partially-equalized symbols for the transition from trellis depth (k−1) to trellis depth k. The rest of the decoding uses the same method as that used by ISIC decoder 1604.

Figure 27:
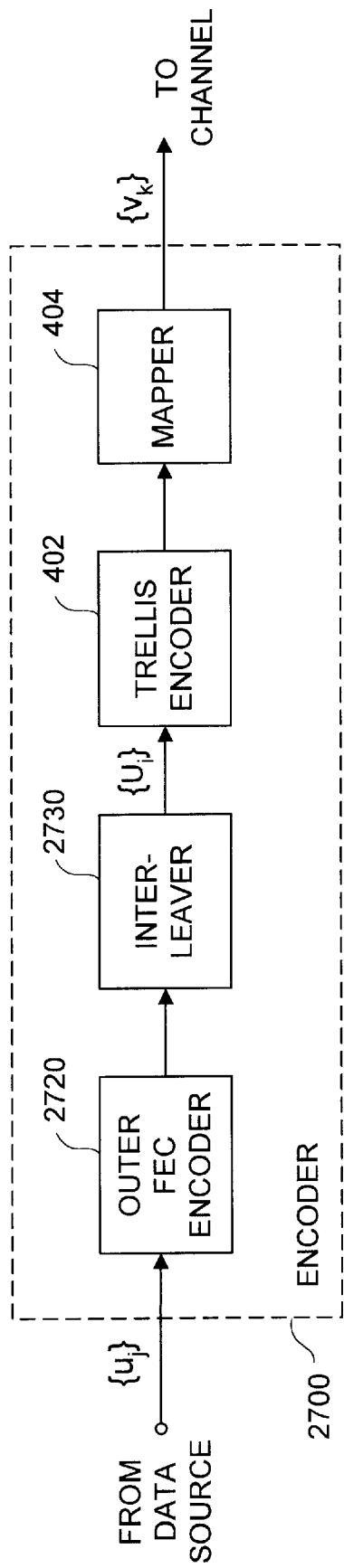
FIG. 27 is a block diagram of an encoder employing concatenated coding in one embodiment of the present invention.

I will now describe one embodiment of the present invention that employs concatenated coding. Well known to those skilled in the art as a technique for improving the data estimation reliability, concatenated coding employs two FEC codes in cascade. FIG. 27 shows encoder 2700 which implements concatenated coding. The data sequence {$u_j$} is supplied to outer FEC encoder 2720, which can be either a block encoder or a trellis encoder. In one embodiment of the present invention, outer FEC encoder 2720 employs a Reed-Solomon (RS) code, which is well known to those skilled in the art.

RS encoding and decoding work with code symbols that are m-bit words. A common code symbol length is m=8, which I will assume for an exemplary embodiment. The code block length n of a RS code is related to m by the relationship: n=$2^m$−1. For 8-bit code symbols, n=255 so that there are 255 code symbols, or 2040 bits, in a code block. Another parameter needed to define a RS code is k, which is the number of m-bit data symbols being encoded into n code symbols. This is generally referred to as an (n,k) RS code. The rate of the code is k/n. The code is capable of correcting t=(n−k)/2 code symbol errors. For example, a (255, 245) RS code has a code rate of about 0.96 and is capable of correcting up to five code symbol errors in a code block.

Referring back to FIG. 27, the output bit sequence of outer FEC encoder 2720 is supplied to interleaver 2730 to provide the interleaved bit sequence {$U_i$}. The interleaved bit sequence is supplied to trellis encoder 402, whose output is supplied to mapper 404 to provide the encoded sequence {$v_k$}. Trellis encoder 402 and mapper 404 have been described above in detail. Interleaver 2730 provides an output sequence by permuting the s order of the elements of the input sequence. Interleaver types include block interleavers, convolutional interleavers, and pseudo-random interleavers, see the book: *Principles of Digital Communication and Coding*, by A. Viterbi and J. Omura, McGraw-Hill, 1979, pg. 111 and pp. 114–116, and U.S. Pat. No. 4,547,887, "Pseudo-Random Convolutional Interleaving," issued to S. Mui on Oct. 15, 1985. For this exemplary embodiment, I will use a block interleaver. Interleaving, coupled with deinterleaving in the data estimator, is employed to break up the error bursts created by the channel and clusters of errors typically found at the output of trellis decoders. Error bursts at the output of trellis decoders are mostly a few bits long. An error burst will most likely affect one or two 8-bit code symbols. Therefore, to break up error bursts at the output of a trellis decoder, an interleaver size of 2×n code symbols should be sufficient. Channel fading considerations may increase the size of the interleaver needed. ISI can also lengthen the error bursts. A larger interleaver could improve the data recovery reliability but will also increase the delay in providing the estimated data to the data sink. Such a tradeoff is familiar to those skilled in the art.

Suppose the interleaver size is J×n code symbols. Interleaver 2730 divides the input sequence into super-blocks each containing J code blocks. The interleaver writes the code symbols sequentially into memory location 1 through J×n, i.e., the code symbols from a first code block of a super-block are put into memory locations 1, 2, . . . , n, where each memory location holds m bits (for the current example, m=8), and the code symbols from the second code block of the super-block are put into memory locations n+1, n+2, . . . , 2n, and so on, so that the code symbols from the last code block of the super-block are put into memory locations (J−1)n+1, (J−1)n+2, . . . , J×n. The output of interleaver 2730 is the sequence of code symbols from memory locations 1, n+1, . . . , (J−1)n+1, 2, n+2, . . . , (J−1)n+2, . . . , n, 2×n, . . . , J×n. The process repeats for the next super-block of J code blocks.

For an interleaver size of 2×n code symbols, for example, each super-block is composed of two code blocks. Interleaver 2730 writes the code symbols from a first code block into memory location 1, 2, . . . , n, and the code symbols from the second code block into memory location n+1, n+2, . . . , 2n; and the interleaver output is the sequence of code symbols from memory locations 1, n+1, 2, n+2, . . . , i, n+i, . . . , n, and 2×n. The process repeats for the next super-block of two code blocks.

Figure 28:
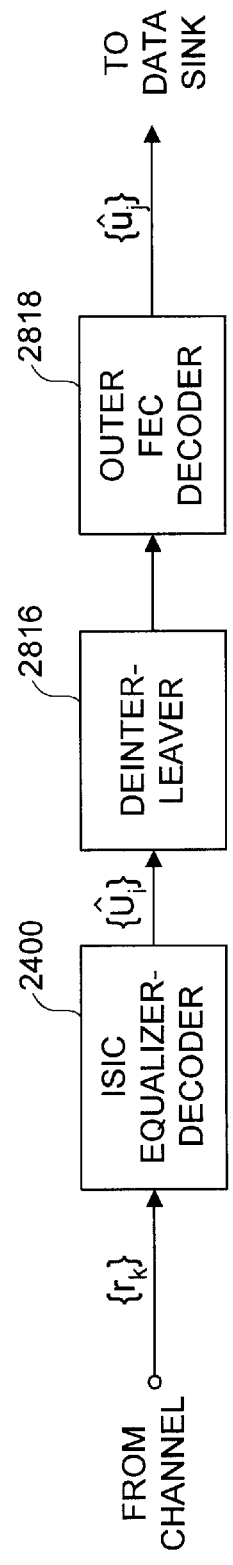
FIG. 28 is a block diagram of a data estimator in one embodiment of the present invention for recovering the data having been encoded by the encoder of FIG. 27.

FIG. 28 shows a block diagram of a data estimator of one embodiment of the present invention for recovering the data that has been encoded by encoder 2700 and sent over a channel. The channel output sequence {$r_k$} is supplied to ISIC equalizer-decoder 2400 to provide an output sequence {$Û_j$}, which is supplied to deinterleaver 2816, whose output sequence is decoded by outer FEC decoder 2818 to provide the estimated data sequence {$û_j$}, which is supplied to the data sink. With reference to FIGS. 27 and 28, $\{\hat{U}_i\}$ is an estimate of the outer-FEC-encoded sequence $\{U_i\}$ and $\{\hat{u}_j\}$ is an estimate of the data sequence $\{u_j\}$. The use of different indices i and j signifies that the sequences are of different lengths. Deinterleaver 2816 puts the bits into the right order by first dividing the estimated sequence of outer-FEC-encoded symbols $\{\hat{U}_i\}$ into super-blocks each containing J RS code blocks. Next, the deinterleaver groups the bits into m-bit code symbols and writes the code symbols sequentially into memory locations 1 through J×n. Finally, deinterleaver 2816 generates an output sequence by reading from the memory in the following order: 1, J+1, 2J+1, ..., (n−1)J+1 to form the first code block of the super-block. The second code block of the super-block is formed by reading the memory in the following order: 2, J+2, 2J+2, ..., (n−1)J+2. The last or the J'th code block of the super-block is formed by reading the memory in the following order: J, 2×J, 3×J, ..., n×J. The deinterleaved sequence is supplied to outer FEC decoder 2818, which decodes each code block of n code symbols to provide k data symbols to form a part of the estimated data sequence $\{\hat{u}_j\}$. For the current embodiment of the present invention, outer FEC decoder 2818 is a RS decoder. The theory and implementation of RS decoders are well known to those skilled in the art.

Figure 29:
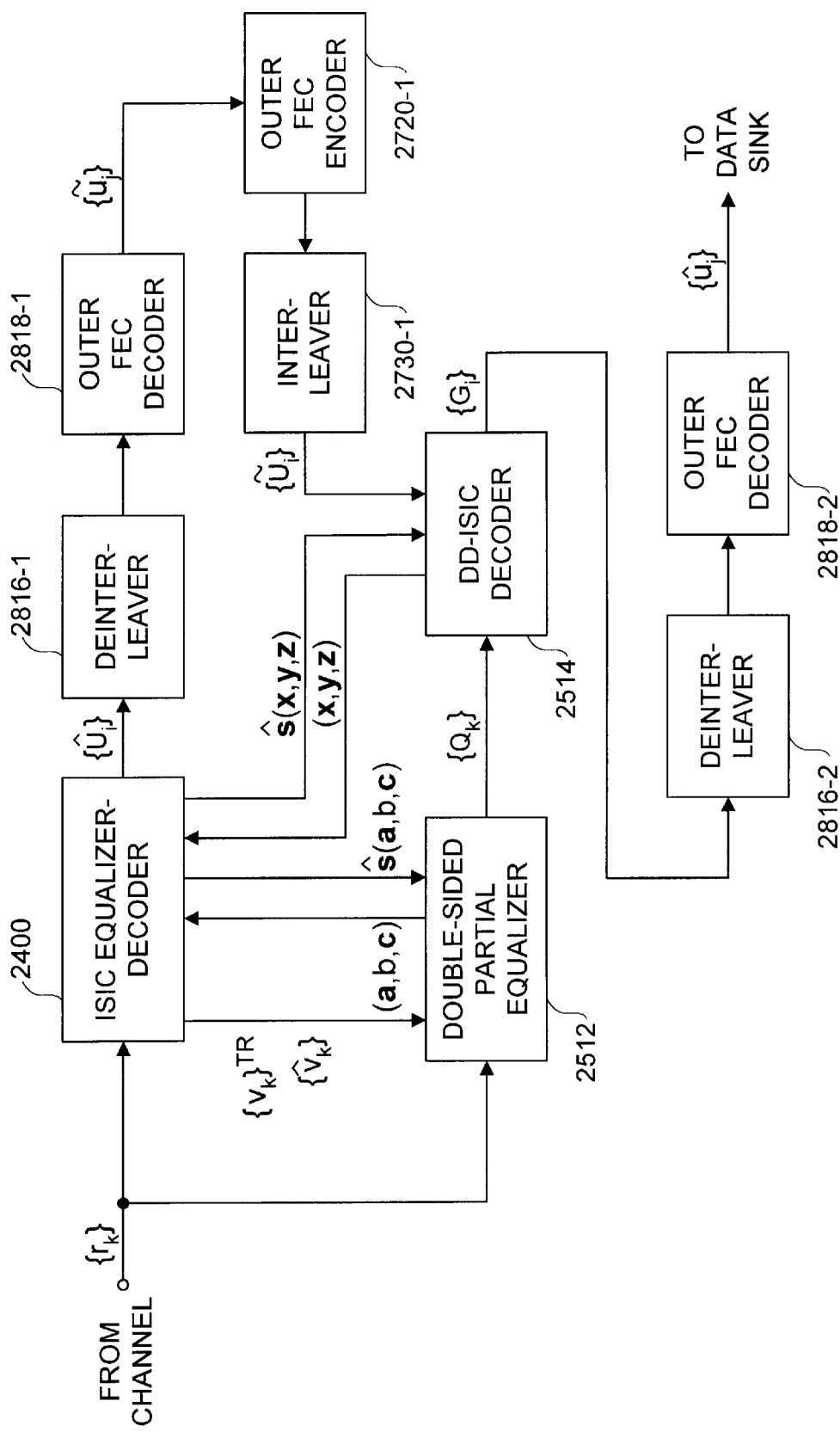
FIG. 29 is a block diagram of a data estimator in another embodiment of the present invention for recovering the data having been encoded by the encoder of FIG. 27 using a DD-ISIC decoder with the interim data decisions estimated by an outer FEC decoder.

Referring back to FIG. 25, errors in the sequence of interim data decisions $\{\hat{U}_j\}$ will cause DD-ISIC decoder 2514 to calculate an incorrect vector z, which in turn will lead to the use of incorrect templates $\hat{s}(x,y,z)$ in the branch metrics calculation, resulting in a reduction in the data estimation reliability. I will describe later two other embodiments of the present invention for improving the accuracy of the sequence supplied to DD-ISIC decoder 2514 for use as the interim data decisions. FIG. 29 shows a block diagram of a data estimator of yet another embodiment of the present invention for recovering the data that has been encoded by encoder 2700 and sent over a channel. Deinterleavers 2816-1 and 2816-2 are replicas of deinterleaver 2816, outer FEC decoders 2818-1 and 2818-2 are replicas of outer FEC decoder 2818, outer FEC encoder 2720-1 is a replica of outer FEC encoder 2720, and interleaver 2730-1 is a replica of interleaver 2730. The channel output sequence $\{r_k\}$ is supplied to ISIC equalizer-decoder 2400, whose output sequence $\{\hat{U}_i\}$ is advantageously processed by a cascade of deinterleaver 2816-1 and outer FEC decoder 2818-1 to provide the sequence $\{\tilde{U}_j\}$. The sequence $\{\tilde{U}_j\}$ is advantageously processed by a cascade of outer FEC encoder 2720-1 and interleaver 2730-1 to provide the sequence of interim data decisions $\{\tilde{U}_i\}$, which is supplied to DD-ISIC decoder 2514 for use as the interim data decisions in the calculation of the vector z in the argument of the double-sided template $\hat{s}(x,y,z)$, as described above. The output of DD-ISIC decoder 2514, denoted as $\{G_i\}$ in FIG. 29, is advantageously processed by a cascade of deinterleaver 2816-2 and outer FEC decoder 2818-2 to provide the estimated data sequence $\{\hat{u}_j\}$. Due to the use of concatenated coding in the arrangement shown in FIG. 29, the sequence of interim data decisions $\{\tilde{U}_i\}$ is more reliable than the sequence of interim data decisions $\{\hat{U}_j\}$ of FIG. 25. The use of a more reliable sequence of interim data decisions will improve the performance of DD-ISIC decoder 2514.

A characteristic of RS decoding is that whenever there is a decoding error, i.e. whenever the decoded code block is not a perfect replica of the encoded code block, the decoded sequence usually has more code symbol errors than the input sequence to the decoder. As noted above, the performance of DD-ISIC decoder 2514 is degraded by errors in the interim data decisions used in the computation of the vector z in the argument of the double-sided template $\hat{s}(x,y,z)$. It is therefore desirable to be able to detect RS decoding errors and reduce the effect of such errors on the performance of DD-ISIC decoder 2514. I will now describe a method to detect RS decoding errors in order to improve the reliability of the interim data decisions supplied to DD-ISIC decoder 2514. This method uses an error-detecting code in addition to the concatenation of forward-error-correction codes.

Figure 30:
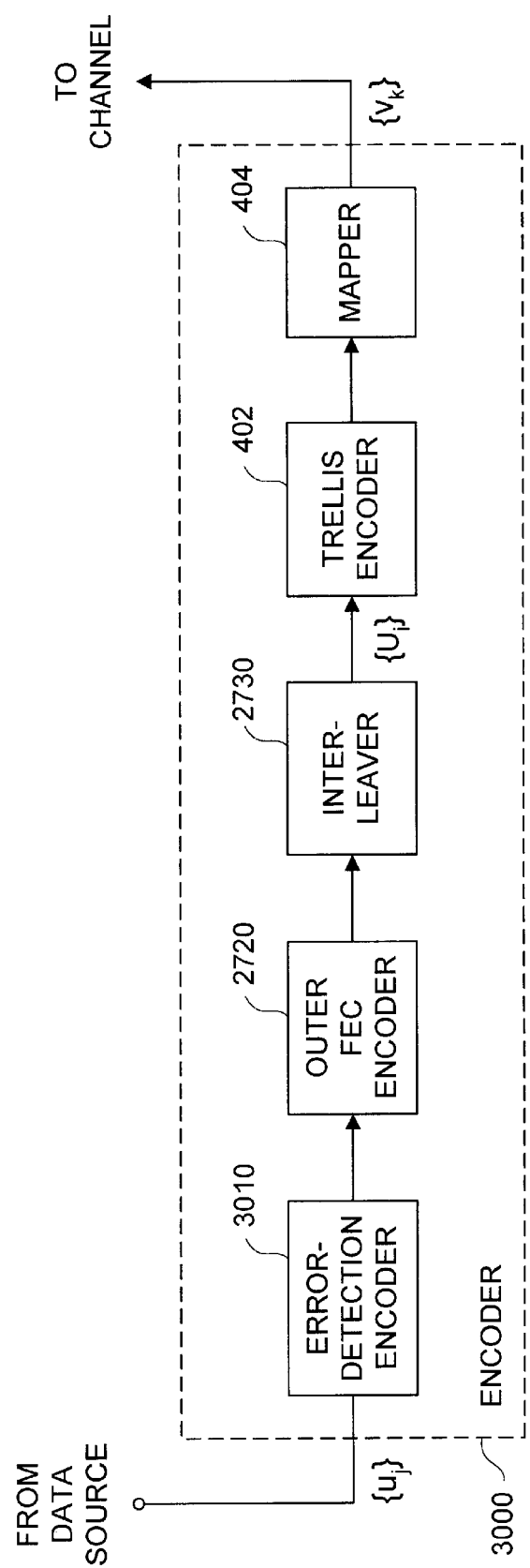
FIG. 30 is a block diagram of an encoder employing concatenated coding and error-detection in yet another embodiment of the present invention.

FIG. 30 is a block diagram of encoder 3000 of one embodiment of the present invention that employs error detection. The data sequence $\{u_j\}$ is supplied to error-detection encoder 3010. The output of the error-detection encoder is advantageously processed by the cascade of outer FEC encoder 2720, interleaver 2730, trellis encoder 402, and mapper 404, using the same method described above for encoder 2700. Error-detection encoder 3010 encodes the input sequence using a block code. In particular, the error-detection encoder employs an $(n_1,k_1)$ error-detection code to encode $k_1$ data symbols into $n_1$ code symbols by generating and appending $(n_1-k_1)$ parity-check symbols to the $k_1$ data symbols. This type of error-detection coding is called systematic coding where the encoded block consists of the data symbols and the parity-check symbols. For systematic codes, calculating the parity-check symbols from the observed data symbols and comparing the calculated parity-check symbols to the observed parity-check symbols will detect errors. The theory of error-detection codes is well known to those skilled in the art.

In one embodiment of the present invention, the error-detection code is an $(n_1,k_1)$ RS code or a shortened RS code. As described above, outer FEC encoder 2720 employs an (n,k) RS code in one embodiment of the present invention. Both $(n_1,k_1)$ and (n,k) RS codes have the same code symbol length m, where m and n are related by $n=2^m-1$. It is convenient to choose $n_1$ such that it is either equal to k or a sub-multiple of k. If $n_1=k$, then error-detection encoder 3010 encodes a block of $k_1$ code symbols into k code symbols, which are then encoded by outer FEC encoder 2720 into n code symbols. In such an arrangement, the error-detection code is used to detect a decoding error in the outer FEC decoder. If $n_1=k/N$, where N is an integer such that k is a multiple of N, then outer FEC encoder 2720 encodes every group of N code blocks provided by error-detection encoder 3010 into a RS code block of length n. In this arrangement, the error-correction code is capable of detecting errors in segments within a decoded code block of the outer FEC decoder. In the first arrangement, when an error is detected at the output of the outer FEC decoder, the entire decoded code block will have to be marked erroneous. In the second arrangement, only those segments with errors need to be marked erroneous.

Figure 31:
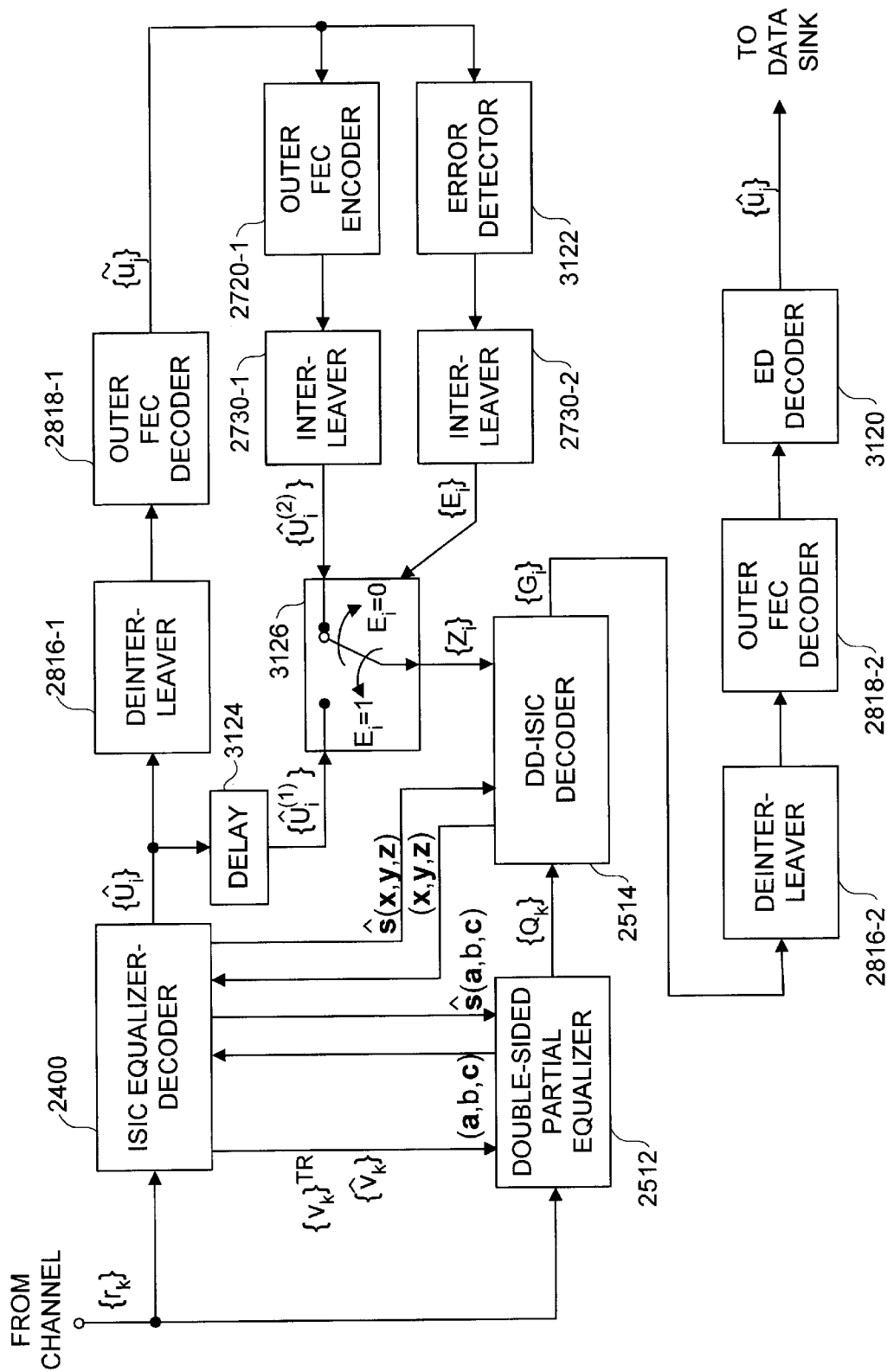
FIG. 31 is a block diagram of a data estimator in one embodiment of the present invention for recovering the data having been encoded by the encoder of FIG. 30.

FIG. 31 is a block diagram of a data estimator of one embodiment of the present invention that employs error detection to improve the reliability of the interim data decisions supplied to DD-ISIC decoder 2514. In this arrangement, two candidate sequences of interim data decisions are generated and the error-detection code is employed to provide the information needed to select the interim data decisions for the DD-ISIC decoder from the two candidate sequences. With reference to FIG. 31, the output sequence $\{\hat{U}_i\}$ of ISIC equalizer-decoder 2400 is supplied to delay block 3124 to provide the first candidate sequence of interim data decisions $\{\hat{U}_i^{(1)}\}$. A cascade of deinterleaver 2816-1 and outer FEC decoder 2818-1 advantageously processes the output sequence $\{\hat{U}_i\}$ of ISIC equalizer-decoder 2400 to provide the tentative outer-FEC-decoded sequence $\{\tilde{u}_i\}$, which is supplied to a cascade of outer FEC encoder 2720-1 and interleaver 2730-1 to provide the second candidate sequence of interim data decisions $\{\hat{U}_i^{(2)}\}$ and, in parallel, to a cascade of error detector 3122 and interleaver 2730-2 to provide the error indicator sequence $\{E_i\}$. Error detector 3122 performs error detection on the tentative outer-FEC-decoded sequence $\{\tilde{u}_j\}$ to determine if a code block of $n_1$ code symbols contains errors. A code block is said to be erroneous is it has been determined by error detector 3122 to contain errors. Every symbol of an erroneous code block is marked as erroneous although in general only some of the symbols are in error. Thus, the error indicator $E_i=1$ if $\hat{U}_i^{(2)}$ of the second candidate sequence of interim data decisions is from an erroneous code block; otherwise $E_i=0$.

The delay introduced by block 3124 is preferably set to be the combined processing delay of blocks 2816-1, 2818-1, 2720-1, and 2730-1 such that the two candidate sequences of interim data decisions $\{\hat{U}_i^{(1)}\}$ and $\{\hat{U}_i^{(2)}\}$ are lined up at the input ports of selector 3126. Selector 3126 selects the interim data decisions from the two candidate sequences based on the information provided by the error indicator sequence $\{E_i\}$. In particular, the sequence of interim data decisions $\{Z_i\}$ to be supplied to DD-ISIC decoder 2514 is computed according to $$Z_i = \begin{cases} \hat{U}_i^{(1)}, & \text{if } E_i = 1 \\ \hat{U}_i^{(2)}, & \text{if } E_i = 0 \end{cases} \quad (73)$$

DD-ISIC decoder 2514 uses $\{Z_i\}$ as the interim data decisions to compute the vector z by assuming that $\{Z_i\}$ is a perfect estimate of the sequence $\{U_i\}$, which is shown in FIG. 30 as the input to trellis decoder 402.

The output of DD-ISIC decoder 2514, denoted as $\{G_i\}$ in FIG. 31, is supplied to deinterleaver 2816-2, whose output is supplied to outer FEC decoder 2818-2. ED decoder 3120, where ED stands for error-detection, removes the error-detection parity check code symbols from the output of outer FEC decoder 2818-2 to provide the estimated data sequence $\{\hat{u}_j\}$.

I have described above several embodiments of the present invention. These embodiments provide different levels of reliability in data estimation. A higher reliability is achieved by the more complex embodiments. Some embodiments are better suited for applications where the impulse response of the channel is time varying while others, possibly less complex, embodiments are more suitable for time-invariant or very-slowly-varying channels. Those skilled in art should be able to choose the embodiments that are most suitable for their applications.

The number of trellis states of the ISIC and the DD-ISIC decoders of the present invention is dependent only on the trellis code employed and independent on the ISI span. Hence, the intersymbol interference compensation methods of the present invention are less complex than maximum likelihood sequence estimation and delayed decision feedback sequence estimation. By using a partial equalizer to remove only the precursor ISI, the noise enhancement and noise colorization effects are reduced. Use of the double-sided partial equalizer further reduces these undesirable effects. The methods of the present invention do not employ decision feedback equalization to provide data estimates and are therefore not subject to the error-propagation effects of decision feedback equalizers. Some embodiments of the present invention provide for the use of decision feedback equalization but only as a means to aid the adaptation of the partial equalizer, the double-sided partial equalizer, and the ISI profile estimator. In such a use of decision feedback equalization the error propagation effects can be made insignificant by slowing down the rate of adaptation. The present invention does not employ precoding, hence it can be used to support constant-envelope signaling as well as non-constant envelope signaling.

The above-described exemplary embodiments are intended to be illustrative in all respects, rather than restrictive, of the present invention. Those skilled in the art will be able to devise various arrangements, which, although not explicitly described herein, embody the principles of the invention, and thus are within its spirit and scope as defined by the following claims.

What is claimed is:

1. A method of intersymbol interference compensation (ISIC) for preparing a plurality of data symbols for use as input to a channel and recovering said plurality of data symbols from a plurality of channel output samples for use by a data sink, said method comprising the steps of
    encoding said plurality of data symbols to provide encoded symbols for use as input to said channel, said step of encoding further including the steps of
        (a) trellis encoding said plurality of data symbols using a trellis code to provide trellis-encoded symbols; and
        (b) mapping said trellis-encoded symbols to provide said encoded symbols such that said encoded symbols assume values from a predetermined alphabet; and
    performing data recovery on said plurality of channel output samples to provide estimated data symbols for use by said data sink, said step of performing data recovery further including the steps of
        (a) partially equalizing said plurality of channel output samples to provide partially equalized samples using a partial equalizer, thereby equalizing substantially all of the precursor intersymbol interference (ISI) and at most some of the postcursor ISI in said plurality of channel output samples;
        (b) generating a set of single-sided templates based on a noiseless channel model having a truncated ISI profile, wherein each single-sided template $\hat{q}(\bullet,\bullet)$ is a function of two vector arguments having elements taken from said predetermined alphabet; and
        (c) ISIC decoding said partially equalized samples to provide said estimated data symbols, said step of ISIC decoding further including the step of computing a branch metric for each current branch of a decoder trellis of said trellis code based on the partially equalized samples associated with said current branch and the single-sided template $\hat{q}(x,y)$ with vector argument x being the vector of a predetermined number of symbols associated with the past branches connected to said current branch and vector argument y being the vector of symbols associated with said current branch; and the step of using said branch metric in a trellis decoding algorithm.

2. A method as recited in claim 1 wherein said trellis code is a binary convolutional code.

3. A method as recited in claim 1 wherein said trellis code is a trellis coded modulation (TCM) code.

4. A method as recited in claim 1 wherein the single-sided template $\hat{q}(x,y)$ is equal to the output of said noiseless channel model in response to applying vector argument y to said noiseless channel model preceded by vector argument x, and wherein said truncated ISI profile has substantially zero precursor ISI and up to L non-zero postcursor ISI components with L being the length of said vector argument x.

5. A method as recited in claim 1 wherein said partial equalizer employs preloaded equalizer tap weights, and wherein said set of single-sided templates is preloaded.

6. A method as recited in claim 1 wherein said set of single-sided templates is computed from a set of preloaded coefficients representing said truncated ISI profile.

7. A method as recited in claim 1 further includes the step of updating said partial equalizer comprising the steps of calculating a first error signal by subtracting the current one of said partially equalized samples from the single-sided template $\hat{q}(a,b)$ with vector argument b being an estimate of current one of said encoded symbols and vector argument a being an estimate of said predetermined number of ones of said encoded symbols preceding said current one of said encoded symbols; and applying said first error signal to a first adaptive algorithm to adjust said partial equalizer such that said first error signal is reduced.

8. A method as recited in claim 7 further includes the steps of inserting training symbols into said encoded symbols; and using said training symbols to determine the vector arguments a and b employed in said step of calculating a first error signal.

9. A method as recited in claim 7 further includes the steps of re-encoding said estimated data symbols using said trellis code to provide re-encoded symbols; and using said re-encoded symbols to determine the vector arguments a and b employed in said step of calculating a first error signal.

10. A method as recited in claim 7 further includes the steps of fully equalizing said plurality of channel output samples to provide fully equalized samples using a full equalizer, thereby equalizing substantially all of the precursor and postcursor ISI in said plurality of channel output samples;

applying said fully equalized samples to a slicer to provide slicer-estimated symbols; and using said slicer-estimated symbols to determine the vector arguments a and b employed in said step of calculating a first error signal.

11. A method as recited in claim 1 further includes the step of updating templates comprising the steps of estimating an ISI profile using an estimator comprising the steps of
  (a) multiplying a plurality of estimator input symbols by the estimator tap weights of said estimator to provide products;
  (b) summing said products to provide an estimated channel output sample;
  (c) subtracting said estimated channel output sample from the current one of said plurality of channel output samples to provide a second error signal;
  (d) applying said second error signal to a second adaptive algorithm to provide updated estimator tap weights such that said second error signal is reduced; and
  (e) replacing the estimator tap weights with said updated estimator tap weights; and updating the single-sided templates comprising the steps of
  (a) truncating said updated estimator tap weights to provide an updated-truncated ISI profile such that said updated-truncated ISI profile contains substantially zero precursor ISI and up to L non-zero postcursor ISI components with L being the length of said vector argument x;
  (b) replacing said truncated ISI profile with said updated-truncated ISI profile; and
  (c) using said updated-truncated ISI profile to update the single-sided templates.

12. A method as recited in claim 11 further includes the steps of inserting training symbols into said encoded symbols; and using said training symbols as said plurality of estimator input symbols.

13. A method as recited in claim 11 further includes the steps of re-encoding said estimated data symbols using said trellis code to provide re-encoded symbols; and using said re-encoded symbols as said plurality of estimator input symbols.

14. A method as recited in claim 11 further includes the steps of fully equalizing said plurality of channel output samples to provide fully equalized samples using a full equalizer, thereby equalizing substantially all of the precursor and postcursor ISI in said plurality of channel output samples;

applying said fully equalized samples to a slicer to provide slicer-estimated symbols; and using said slicer-estimated symbols as said plurality of estimator input symbols.

15. A method as recited in claim 1 wherein said branch metric is set to be the square of the magnitude of the difference of said single-sided template $\hat{q}(x,y)$ and the partially equalized samples associated with said current branch.

16. A method of intersymbol interference compensation for preparing a plurality of data symbols for use as input to a channel and recovering said plurality of data symbols from a plurality of channel output samples for use by a data sink, said method comprising the steps of encoding said plurality of data symbols to provide encoded symbols for use as input to said channel, said step of encoding further including the steps of
  (a) trellis encoding said plurality of data symbols using a trellis code to provide trellis-encoded symbols; and
  (b) mapping said trellis-encoded symbols to provide said encoded symbols such that said encoded symbols assume values from a predetermined alphabet; and performing data recovery on said plurality of channel output samples to provide estimated data symbols for use by said data sink, said step of performing data recovery further including the steps of
  (a) partially equalizing said plurality of channel output samples to provide partially equalized samples using a partial equalizer, thereby equalizing substantially all of the precursor ISI and at most some of the postcursor ISI in said plurality of channel output samples;
  (b) generating a set of single-sided templates based on a first noiseless channel model having a first truncated ISI profile, wherein each single-sided template $\hat{q}(\bullet,\bullet)$ is a function of two vector arguments having elements taken from said predetermined alphabet;
  (c) ISIC decoding said partially equalized samples to provide interim data decisions, said step of ISIC decoding further including the step of computing a first branch metric for each first current branch of a first decoder trellis of said trellis code based on the partially equalized samples associated with said first current branch and the single-sided template $\hat{q}(x_1,y_1)$ with vector argument $x_1$ being the vector of a first predetermined number of symbols associated with the past branches connected to said first current branch and vector argument $y_1$ being the vector of symbols associated with said first current branch; and the step of using said first branch metric in a first trellis decoding algorithm;

(d) applying double-sided partial equalization to said plurality of channel output samples to provide double-sided partially equalized samples using a double-sided partial equalizer, thereby equalizing at most some of the precursor and postcursor ISI in said plurality of channel output samples;

(e) generating a set of double-sided templates based on a second noiseless channel model having a second truncated ISI profile, wherein each double-sided template $\hat{s}(\bullet,\bullet,\bullet)$ is a function of three vector arguments having elements taken from said predetermined alphabet; and (f) decision-directed-ISIC decoding said double-sided partially equalized samples to provide said estimated data symbols, said step of decision-directed-ISIC decoding further including the step of computing a second branch metric for each second current branch of a second decoder trellis of said trellis code based on the double-sided partially equalized samples associated with said second current branch and the double-sided template $\hat{s}(x_2,y_2,z_2)$ with vector argument $x_2$ being the vector of a second predetermined number of symbols associated with the past branches connected to said second current branch and vector argument $y_2$ being the vector of symbols associated with said second current branch and vector argument $z_2$ being the vector of a third predetermined number of symbols determined using said interim data decisions to be associated with the future branches connected to said second current branch; and the step of using said second branch metric in a second trellis decoding algorithm.

17. A method as recited in claim 16 wherein the single-sided template $\hat{q}(x_1,y_1)$ is equal to the output of said first noiseless channel model in response to applying vector argument $y_1$ to said first noiseless channel model preceded by vector argument $x_1$, wherein said first truncated ISI profile has substantially zero precursor ISI and up to $L_1$ non-zero postcursor ISI components with $L_1$ being the length of said vector argument x, wherein the double-sided template $\hat{s}(x_2,y_2,z_2)$ is equal to the output of said second noiseless channel model in response to applying vector argument $y_2$ to said second noiseless channel model preceded by vector argument $x_2$ and followed by vector argument $z_2$, and wherein said second truncated ISI profile has up to $L_2$ predetermined number of non-zero postcursor ISI components and up to $L_3$ non-zero precursor ISI components with $L_2$ being the length of said vector argument $x_2$ and $L_3$ being the length of said vector argument $Z_2$.

18. A method as recited in claim 16 wherein said partial equalizer employs preloaded partial equalizer tap weights, wherein said double-sided partial equalizer employs preloaded double-sided partial equalizer tap weights, wherein said set of single-sided templates is preloaded, and wherein said set of double-sided templates is preloaded.

19. A method as recited in claim 16 wherein said set of single-sided templates is computed from a first set of preloaded coefficients representing said first truncated ISI profile, and wherein said set of double-sided templates is computed from a second set of preloaded coefficients representing said second truncated ISI profile.

20. A method as recited in claim 16 further comprising the steps of updating said partial equalizer including the steps of
  (a) calculating a first error signal by subtracting the current one of said partially equalized samples from the single-sided template $\hat{q}(a_1,b_1)$ with vector argument $b_1$ being an estimate of current one of said encoded symbols and vector argument $a_1$ being an estimate of said first predetermined number of ones of said encoded symbols preceding said current one of said encoded symbols; and
  (b) applying said first error signal to a first adaptive algorithm to adjust said partial equalizer such that said first error signal is reduced; and updating said double-sided partial equalizer including the steps of
  (a) calculating a second error signal by subtracting the current one of said double-sided partially equalized samples from the double-sided template $\hat{s}(a_2,b_2,c_2)$ with vector argument $b_2$ being an estimate of current one of said encoded symbols and vector argument $a_2$ being an estimate of said second predetermined number of ones of said encoded symbols preceding said current one of said encoded symbols and vector argument $c_2$ being an estimate of said third predetermined number of ones of said encoded symbols following said current one of said encoded symbols; and
  (b) applying said second error signal to a second adaptive algorithm to adjust said double-sided equalizer such that said second error signal is reduced.

21. A method as recited in claim 16 further comprising the steps of updating templates comprising the steps of estimating an ISI profile using an estimator comprising the steps of
  (a) multiplying a plurality of estimator input symbols by the estimator tap weights of said estimator to provide products;
  (b) summing said products to provide an estimated channel output sample;
  (c) subtracting said estimated channel output sample from the current one of said plurality of channel output samples to provide a third error signal;
  (d) applying said third error signal to a third adaptive algorithm to provide updated estimator tap weights such that said third error signal is reduced; and
  (e) replacing the estimator tap weights with said updated estimator tap weights; and updating the single-sided templates comprising the steps of
  (a) truncating said updated estimator tap weights to provide a first updated-truncated ISI profile such that said first updated-truncated ISI profile contains substantially zero precursor ISI and up to $L_1$ non-zero postcursor ISI components with $L_1$ being the length of said vector argument x.
  (b) replacing said first truncated ISI profile with said first updated-truncated ISI profile; and
  (c) using said first updated-truncated ISI profile to update the single-sided templates; and updating the double-sided templates comprising the steps of (a) truncating said updated estimator tap weights to provide a second updated-truncated ISI profile such that said second updated-truncated ISI profile contains up to $L_2$ non-zero postcursor ISI components and up to $L_3$ non-zero precursor ISI components with $L_2$ being the length of said vector argument $x_2$ and $L_3$ being the length of said vector argument $Z_2$.

(b) replacing said second truncated ISI profile with said second updated-truncated ISI profile; and (c) using said second updated-truncated ISI profile to update the double-sided templates.

22. A method of intersymbol interference compensation for preparing a plurality of data symbols for use as input to a channel and recovering said plurality of data symbols from a plurality of channel output samples for use by a data sink, said method comprising the steps of encoding said plurality of data symbols to provide encoded symbols for use as input to said channel, said step of encoding further including the steps of (a) outer-FEC encoding said plurality of data symbols using an outer FEC code to provide outer-FEC-encoded symbols;

(b) interleaving said outer-FEC-encoded symbols to provide interleaved symbols;

(c) trellis encoding said interleaved symbols using a trellis code to provide trellis-encoded symbols; and (d) mapping said trellis-encoded symbols to provide said encoded symbols such that said encoded symbols assume values from a predetermined alphabet; and performing data recovery on said plurality of channel output samples to provide estimated data symbols for use by said data sink, said step of performing data recovery further including the steps of (a) partially equalizing said plurality of channel output samples to provide partially equalized samples using a partial equalizer, thereby equalizing substantially all of the precursor ISI and at most some of the postcursor ISI in said plurality of channel output samples;

(b) generating a set of single-sided templates based on a first noiseless channel model having a first truncated ISI profile, wherein each single-sided template $\hat{q}(\bullet,\bullet)$ is a function of two vector arguments having elements taken from said predetermined alphabet;

(c) ISIC decoding said partially equalized samples to provide ISIC-decoded symbols, said step of ISIC decoding further including the step of computing a first branch metric for each first current branch of a first decoder trellis of said trellis code based on the partially equalized samples associated with said first current branch and the single-sided template $\hat{q}(x_1,y_1)$ with vector argument $x_1$ being the vector of a first predetermined number symbols associated with the past branches connected to said first current branch and vector argument $y_1$ being the vector of symbols associated with said first current branch; and the step of using said first branch metric in a first trellis decoding algorithm;

(d) processing said ISIC-decoded symbols to provide interim data decisions;

(e) applying double-sided partial equalization to said plurality of channel output samples to provide double-sided partially equalized samples using a double-sided partial equalizer, thereby equalizing at most some of the precursor and postcursor ISI in said plurality of channel output samples;

(f) generating a set of double-sided templates based on a second noiseless channel model having a second truncated ISI profile, wherein each double-sided template $\hat{s}(\bullet,\bullet,\bullet)$ is a function of three vector arguments having elements taken from said predetermined alphabet;

(g) decision-directed-ISIC decoding said double-sided partially equalized samples to provide DD-ISIC decoded symbols, said step of decision-directed-ISIC decoding further including the step of computing a second branch metric for each second current branch of a second decoder trellis of said trellis code based on the double-sided partially equalized samples associated with said second current branch and the double-sided template $\hat{s}(x_2,y_2,z_2)$ with vector argument $x_2$ being the vector of a second predetermined number of symbols associated with the past branches connected to said second current branch and vector argument $y_2$ being the vector of symbols associated with said second current branch and vector argument $z_2$ being the vector of a third predetermined number of symbols determined using said interim data decisions to be associated with the future branches connected to said second current branch; and the step of using said second branch metric in a second trellis decoding algorithm;

(h) deinterleaving said DD-ISIC decoded symbols to provide deinterleaved symbols; and (i) outer-FEC decoding said deinterleaved symbols based on said outer FEC code to provide said estimated data symbols.

23. A method as recited in claim 22 wherein said step of processing said ISIC-decoded symbols to provide said interim data decisions includes the steps of deinterleaving said ISIC-decoded symbols to provide deinterleaved ISIC-decoded symbols;

outer-FEC decoding said deinterleaved ISIC-decoded symbols based on said outer FEC code to provide outer-FEC-decoded-and-ISIC-decoded symbols;

outer-FEC re-encoding said outer-FEC-decoded-and-ISIC-decoded symbols based on said outer FEC code to provide re-encoded symbols; and interleaving said re-encoded symbols to provide said interim data decisions.

24. A method as recited in claim 22 wherein said outer FEC code is a Reed-Solomon (RS) code.

25. A method as recited in claim 22 wherein said step of interleaving employs a block interleaver, and wherein said step of deinterleaving employs a block deinterleaver.

26. A method of intersymbol interference compensation for preparing a plurality of data symbols for use as input to a channel and recovering said plurality of data symbols from a plurality of channel output samples for use by a data sink, said method comprising the steps of encoding said plurality of data symbols to provide encoded symbols for use as input to said channel, said step of encoding further including the steps of (a) error-detection encoding said plurality of data symbols using an error-detection code to provide ED-encoded symbols;

(b) outer-FEC encoding said ED-encoded symbols using an outer FEC code to provide outer-FEC-encoded symbols;

(c) interleaving said outer-FEC-encoded symbols to provide interleaved symbols;

(d) trellis encoding said interleaved symbols using a trellis code to provide trellis-encoded symbols; and (e) mapping said trellis-encoded symbols to provide said encoded symbols such that said encoded symbols assume values from a predetermined alphabet; and performing data recovery on said plurality of channel output samples to provide estimated data symbols for use by said data sink, said step of performing data recovery further including the steps of (a) partially equalizing said plurality of channel output samples to provide partially equalized samples using a partial equalizer, thereby equalizing substantially all of the precursor ISI and at most some of the postcursor ISI in said plurality of channel output samples;

(b) generating a set of single-sided templates based on a first noiseless channel model having a first truncated ISI profile, wherein each single-sided template $\hat{q}(\bullet,\bullet)$ is a function of two vector arguments having elements taken from said predetermined alphabet;

(c) ISIC decoding said partially equalized samples to provide ISIC-decoded symbols, said step of ISIC decoding further including the step of computing a first branch metric for each first current branch of a first decoder trellis of said trellis code based on the partially equalized samples associated with said first current branch and the single-sided template $\hat{q}(x_1,y_1)$ with vector argument $x_1$ being the vector of a first predetermined number of symbols associated with the past branches connected to said first current branch and vector argument $y_1$ being the vector of symbols associated with said first current branch; and the step of using said first branch metric in a first trellis decoding algorithm;

(d) processing said ISIC-decoded symbols to provide interim data decisions;

(e) applying double-sided partial equalization to said plurality of channel output samples to provide double-sided partially equalized samples using a double-sided partial equalizer, thereby equalizing at most some of the precursor and postcursor ISI in said plurality of channel output samples;

(f) generating a set of double-sided templates based on a second noiseless channel model having a second truncated ISI profile, wherein each double-sided template $\hat{s}(\bullet,\bullet,\bullet)$ is a function of three vector arguments having elements taken from said predetermined alphabet;

(g) decision-directed-ISIC decoding said double-sided partially equalized samples to provide DD-ISIC decoded symbols, said step of decision-directed-ISIC decoding further including the step of computing a second branch metric for each second current branch of a second decoder trellis of said trellis code based on the double-sided partially equalized samples associated with said second current branch and the double-sided template $\hat{s}(x_2,y_2,z_2)$ with vector argument $x_2$ being the vector of a second predetermined number of symbols associated with the past branches connected to said second current branch and vector argument $y_2$ being the vector of symbols associated with said second current branch and vector argument $z_2$ being the vector of a third predetermined number of symbols determined using said interim data decisions to be associated with the future branches connected to said second current branch; and the step of using said second branch metric in a second trellis decoding algorithm;

(h) deinterleaving said DD-ISIC decoded symbols to provide deinterleaved symbols;

(i) outer-FEC decoding said deinterleaved symbols based on said outer FEC code to provide outer-FEC-decoded symbols; and (j) error-detection decoding said outer-FEC-decoded symbols based on said error-detection code to provide said estimated data symbols.

27. A method as recited in claim 26 wherein said step of processing said ISIC-decoded symbols to provide said interim data decisions includes the steps of delaying said ISIC-decoded symbols to provide first candidate interim data decisions;

generating second candidate interim data decisions including the steps of
(a) deinterleaving said ISIC-decoded symbols to provide deinterleaved ISIC-decoded symbols;
(b) outer-FEC decoding said deinterleaved ISIC-decoded symbols based on said outer FEC code to provide outer-FEC-decoded-and-ISIC-decoded symbols;
(c) outer-FEC re-encoding said outer-FEC-decoded-and-ISIC-decoded symbols based on said outer FEC code to provide re-encoded symbols; and
(d) interleaving said re-encoded symbols to provide said second candidate interim data decisions;

determining error indicators for said second candidate interim data decisions such that an error indicator value of 0 indicates that the corresponding one of said second candidate interim data decisions is error-free and an error indicator value of 1 indicates otherwise, said step of determining error indicators including the steps of
(a) performing error detection and error indicator generation on said outer-FEC-decoded-and-ISIC-decoded symbols based on said error-detection code to provide deinterleaved error indicators; and
(b) interleaving said deinterleaved error indicators to provide said error indicators; and selecting between said first candidate interim data decisions and said second candidate interim data decisions to provide said interim data decisions, wherein one of said interim data decisions is set to be one of said first candidate interim data decisions if the corresponding one of said error indicators is equal to 1, otherwise said one of said interim data decisions is set to be one of said second candidate interim data decisions.

28. A method as recited in claim 26 wherein said error-detection code is a Reed-Solomon (RS) code.

* * * * *